(12) United States Patent
Nakamura

(10) Patent No.: US 10,032,096 B2
(45) Date of Patent: Jul. 24, 2018

(54) TERMINAL AND METHOD TO ACCESS AN INTELLIGENT MODULE ADAPTED TO CONNECT TO A PRINTER, AND TO ACCESS A WEB SERVER IN WHICH A WEB APPLICATION IS MAINTAINED

(71) Applicant: Seiko Epson Corporation, Tokyo (JP)

(72) Inventor: Hideo Nakamura, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 13 days.

(21) Appl. No.: 15/004,146

(22) Filed: Jan. 22, 2016

(65) Prior Publication Data

US 2016/0142568 A1 May 19, 2016

Related U.S. Application Data

(63) Continuation of application No. 14/734,671, filed on Jun. 9, 2015, now Pat. No. 9,277,064, which is a (Continued)

(51) Int. Cl.
*H04N 1/00* (2006.01)
*G06K 15/02* (2006.01)
(Continued)

(52) U.S. Cl.
CPC ....... *G06K 15/1836* (2013.01); *G06F 3/1207* (2013.01); *G06F 3/1228* (2013.01);
(Continued)

(58) Field of Classification Search
None
See application file for complete search history.

(56) References Cited

U.S. PATENT DOCUMENTS 6,222,634 B1 4/2001 Dubbels et al.
6,327,045 B1 12/2001 Teng et al.
(Continued)

FOREIGN PATENT DOCUMENTS

| JP | 2004-005348 A | 1/2004 |
|---|---|---|
| JP | 2012-094088 A | 5/2012 |
| WO | 2012/108547 A2 | 8/2012 |

OTHER PUBLICATIONS

Geary, D. "Core HTML5 Canvas: Graphics, Animation, and Game Development." ISBN-13: 978-0-13-276161-0, published May 4, 2012 by Prentice Hall.
(Continued)

*Primary Examiner* — Mohammad Ghayour
*Assistant Examiner* — Pawandeep Dhingra
(74) *Attorney, Agent, or Firm* — Foley & Lardner LLP

(57) ABSTRACT

A terminal uses a web application to control a printer on a network. The web application includes an API that permits the terminal to send instruction and inquiries to the printer over the network. The terminal submits, to the API, the printer's IP address and instructions for defining a print document or printer commands. The API then sends the print document or printer commands to the printer in accordance with the IP address. In this manner, the terminal can request status updates without sending a print job to the printer. The terminal sets the printer's ID address, identifies a type of status event inquiry, and submits the inquiry to receive the printer's current status related to the identified status event. To submit a print job, the terminal creates a print document using the API, sets the printer's ID address, and sends the print document as a print job to be printed.

20 Claims, 85 Drawing Sheets

Related U.S. Application Data continuation of application No. 13/955,344, filed on Jul. 31, 2013, now Pat. No. 9,098,226.

(60) Provisional application No. 61/683,009, filed on Aug. 14, 2012.

(51) Int. Cl.
| | | |
|---|---|---|
| *G06F 3/12* | (2006.01) | |
| *G06F 9/54* | (2006.01) | |
| *H04L 29/08* | (2006.01) | |
| *H04N 1/405* | (2006.01) | |
| *G06F 9/455* | (2018.01) | |

(52) U.S. Cl.
CPC .......... *G06F 3/1229* (2013.01); *G06F 3/1231* (2013.01); *G06F 3/1237* (2013.01); *G06F 3/1246* (2013.01); *G06F 3/1288* (2013.01); *G06F 3/1289* (2013.01); *G06F 3/1295* (2013.01); *G06F 3/1298* (2013.01); *G06F 9/54* (2013.01); *G06K 15/1805* (2013.01); *G06K 15/1807* (2013.01); *H04L 67/02* (2013.01); *H04N 1/001* (2013.01); *H04N 1/00103* (2013.01); *H04N 1/00464* (2013.01); *H04N 1/405* (2013.01); *G06F 9/45512* (2013.01)

(56) References Cited

U.S. PATENT DOCUMENTS

| | | | |
|---|---|---|---|
| 6,862,711 B1 | 3/2005 | Bahrs et al. | |
| 6,906,811 B1 | 6/2005 | Teradaira et al. | |
| 7,424,509 B2 | 9/2008 | Simpson et al. | |
| 7,685,514 B1 | 3/2010 | Khatwani et al. | |
| 8,040,356 B2 * | 10/2011 | Stokes | G06F 3/04897 345/589 |
| 8,547,575 B2 * | 10/2013 | Mohammad | G06F 3/1206 358/1.13 |
| 2002/0054303 A1 * | 5/2002 | Matsuyama | H04N 1/00132 358/1.2 |
| 2002/0083438 A1 * | 6/2002 | So | H04N 7/165 725/31 |
| 2003/0081246 A1 | 5/2003 | Simpson et al. | |
| 2003/0137691 A1 | 7/2003 | Tanaka | |
| 2003/0225894 A1 * | 12/2003 | Ito | G06F 3/1204 709/227 |
| 2004/0012816 A1 | 1/2004 | Minowa | |
| 2004/0028045 A1 | 2/2004 | Cheng | |
| 2004/0080546 A1 | 4/2004 | Fritz | |
| 2004/0090643 A1 * | 5/2004 | Ochi | H04N 1/00204 358/1.13 |
| 2004/0130744 A1 * | 7/2004 | Wu | H04N 1/00278 358/1.15 |
| 2004/0239956 A1 * | 12/2004 | Araumi | H04L 29/06 358/1.1 |
| 2005/0002056 A1 | 1/2005 | Lee | |
| 2005/0012949 A1 | 1/2005 | Kitahara et al. | |
| 2005/0024671 A1 | 2/2005 | Abe | |
| 2005/0138117 A1 * | 6/2005 | Chaney | G06F 17/30864 709/203 |
| 2005/0193153 A1 | 9/2005 | Fukano et al. | |
| 2006/0178943 A1 | 8/2006 | Rollinson et al. | |
| 2006/0232619 A1 | 10/2006 | Otsuka et al. | |
| 2006/0268326 A1 * | 11/2006 | Cho | G06F 3/1204 358/1.15 |
| 2007/0100837 A1 | 5/2007 | Martin | |
| 2007/0152060 A1 | 7/2007 | Kiliccote | |
| 2008/0010389 A1 | 1/2008 | Iwata | |
| 2008/0010615 A1 | 1/2008 | Curtis et al. | |
| 2008/0123142 A1 | 5/2008 | Minowa | |
| 2009/0086261 A1 | 4/2009 | Irino | |
| 2009/0106456 A1 * | 4/2009 | Muller | G06F 9/545 710/5 |
| 2009/0231131 A1 | 9/2009 | Ono et al. | |
| 2009/0321513 A1 | 12/2009 | Alleshouse | |
| 2010/0167782 A1 | 7/2010 | Mahany et al. | |
| 2010/0225955 A1 | 9/2010 | Almen et al. | |
| 2010/0299588 A1 | 11/2010 | Dattilo et al. | |
| 2010/0309508 A1 | 12/2010 | Kamath et al. | |
| 2011/0013229 A1 | 1/2011 | Teradaira et al. | |
| 2011/0026073 A1 | 2/2011 | Wu | |
| 2011/0035625 A1 * | 2/2011 | Kanamori | G06F 11/0733 714/16 |
| 2011/0122443 A1 | 5/2011 | Otsuka et al. | |
| 2011/0255111 A1 | 10/2011 | Oba et al. | |
| 2011/0299110 A1 * | 12/2011 | Jazayeri | G06F 3/1204 358/1.15 |
| 2012/0026548 A1 | 2/2012 | Nakagawa | |
| 2012/0050795 A1 * | 3/2012 | Nakamura | G06F 3/1207 358/1.15 |
| 2012/0050799 A1 | 3/2012 | Towata | |
| 2012/0110066 A1 | 5/2012 | Furuta et al. | |
| 2012/0120437 A1 | 5/2012 | Nanaumi | |
| 2012/0194844 A1 | 8/2012 | Natori | |
| 2012/0278706 A1 | 11/2012 | Fuse | |
| 2012/0300249 A1 | 11/2012 | Shustef et al. | |
| 2012/0307293 A1 | 12/2012 | Natori | |
| 2012/0307294 A1 | 12/2012 | Matsuda | |
| 2013/0003106 A1 * | 1/2013 | Nishida | G06F 3/1222 358/1.14 |
| 2013/0003115 A1 | 1/2013 | Uchikawa | |
| 2013/0016396 A1 | 1/2013 | Ohara | |
| 2013/0028514 A1 | 1/2013 | Kihira | |
| 2013/0091536 A1 * | 4/2013 | Manjunath | G06F 21/629 726/1 |
| 2013/0107311 A1 * | 5/2013 | Eng | G06F 3/122 358/1.15 |
| 2013/0298005 A1 | 11/2013 | Mayhew et al. | |

OTHER PUBLICATIONS

Office Action dated Nov. 2, 2017 in related U.S. Appl. No. 15/280,363.

* cited by examiner

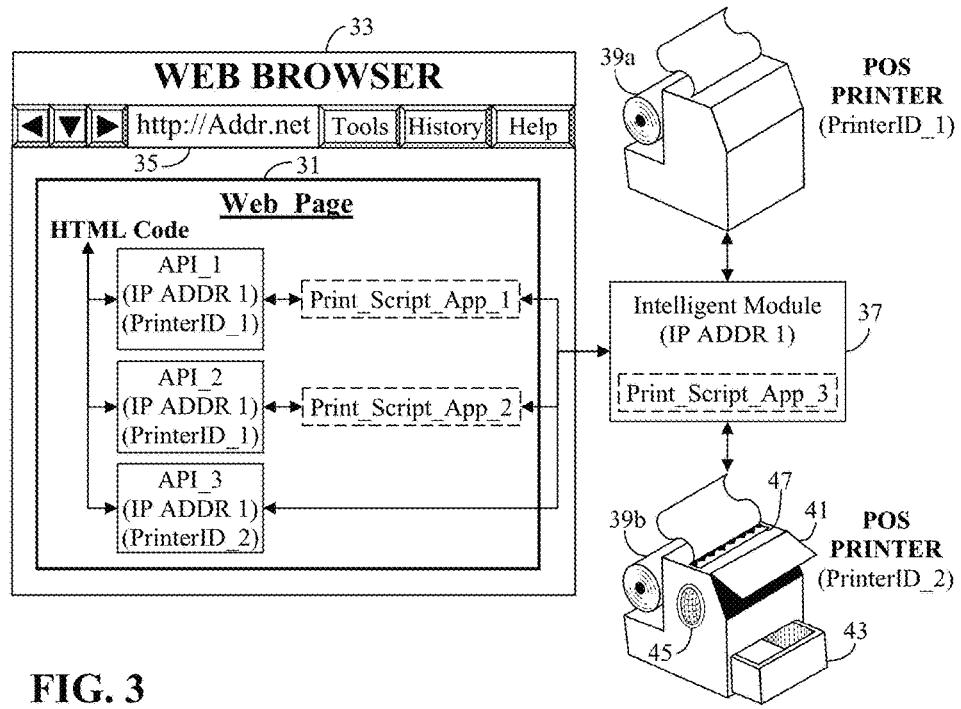
FIG. 3
FIG. 4
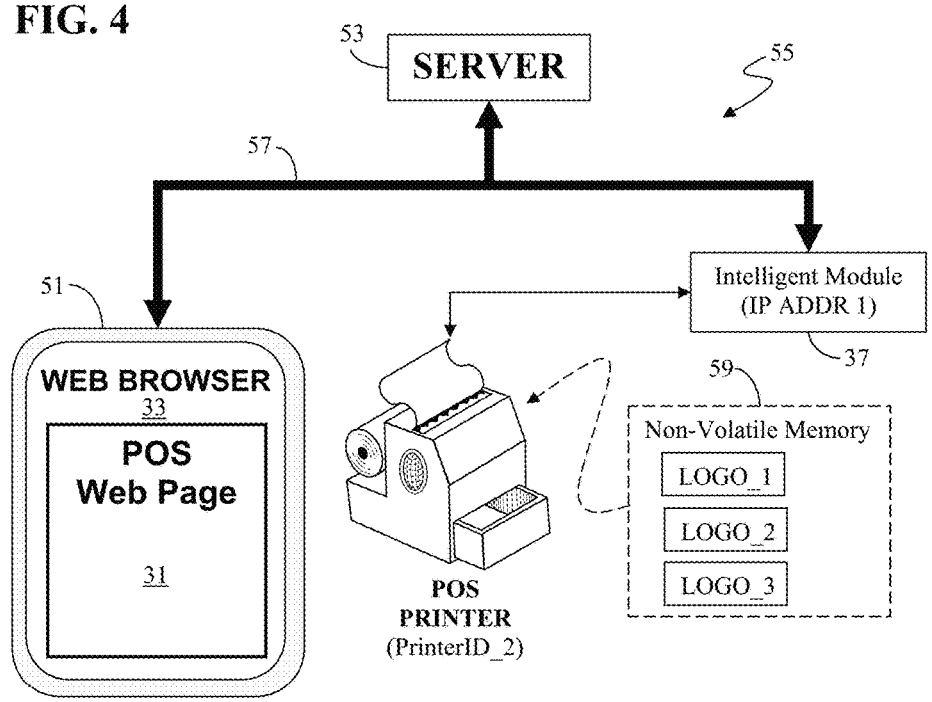

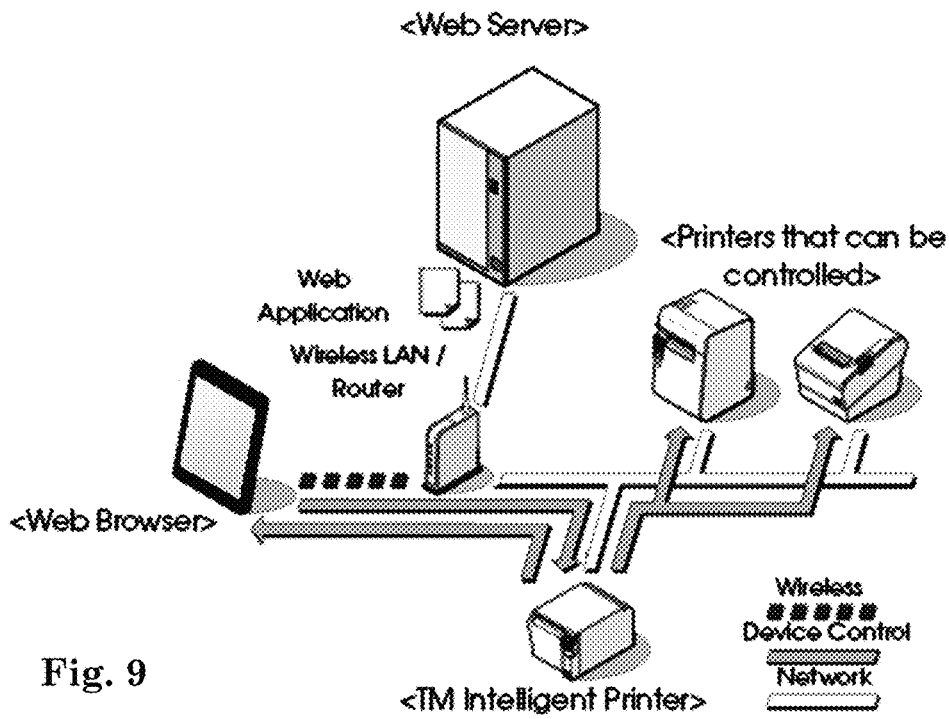
Fig. 9
Fig. 10
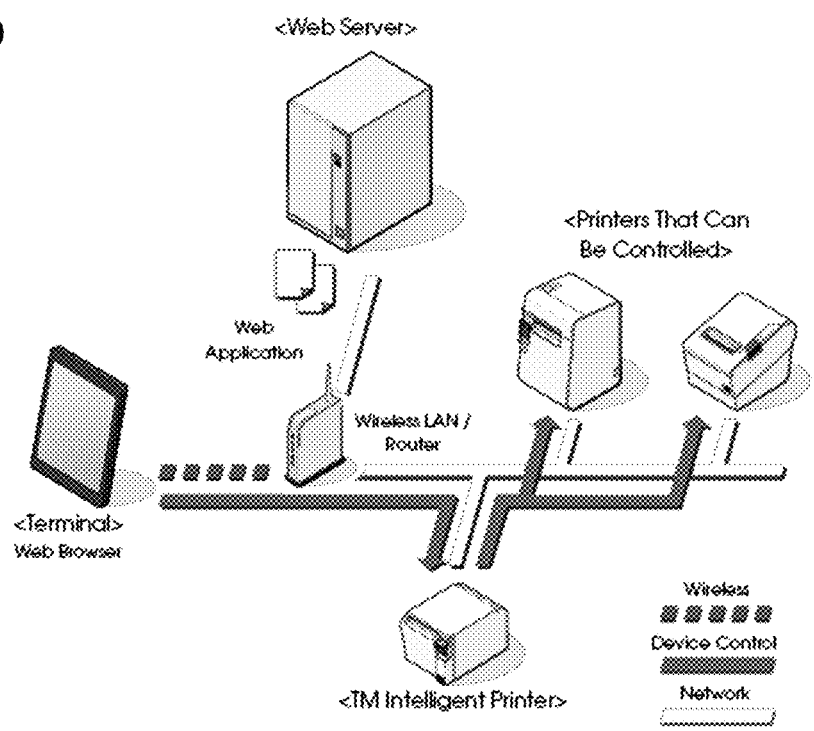

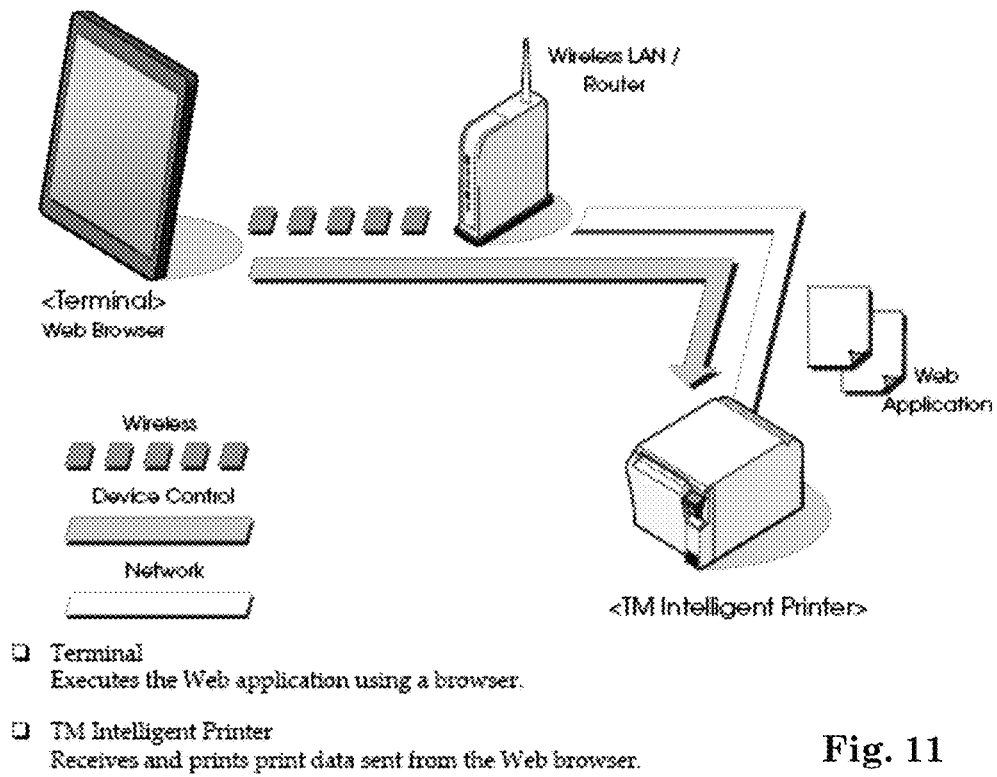
- Terminal
  Executes the Web application using a browser.
- TM Intelligent Printer
  Receives and prints print data sent from the Web browser.
Fig. 11
Fig. 12
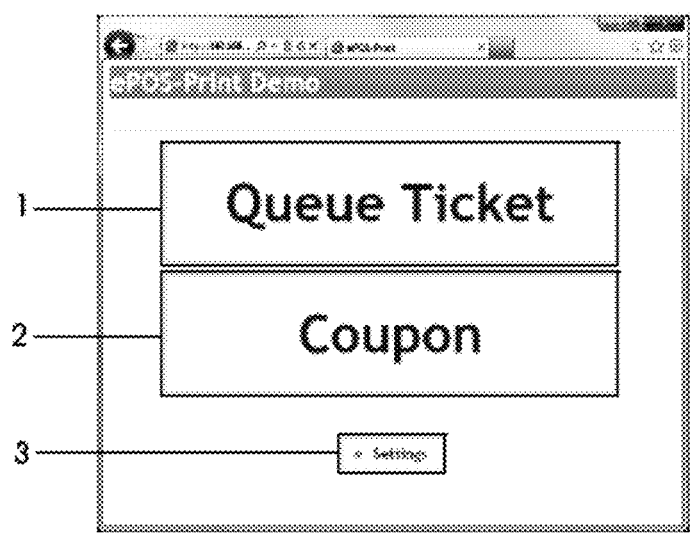

| Item | Description |
|---|---|
| Device ID | Specifies the ID to identify the printer to be controlled by ePOS-Print. |
| Model | Specifies the model of the printer to be controlled. |
| IP Address | Specifies the IP address of the printer to be controlled. |
| Retry Interval (ms) | Specifies the interval of retry toward the printer to be controlled, in milliseconds. |

Fig. 21

```
<!DOCTYPE html>
<html>
<head>
<meta charset="utf-8" />
<title>TITLE</title>
<script type="text/javascript" src="epos-print-2.x.x.js"></script>   ← Embed
<script type="text/javascript">
function buildMessage() {
    var builder = new epson.ePOSBuilder();
    .
    .
}
</script>
</head>
<body>
    .
    .
</body>
</html>
```

Fig. 23

```
<!DOCTYPE html>
<html>
<head>
<meta charset="utf-8" />
<title>TITLE</title>
<script type="text/javascript" src="epos-print-2.x.x.js"></script>
<script type="text/javascript">
function buildMessage() {
    //Create an ePOS-Print Builder object
    var builder = new epson.ePOSBuilder();
    //Create a print document
    builder.addTextLang('en')
    builder.addTextSmooth(true);
    builder.addTextFont(builder.FONT_A);
    builder.addTextSize(3, 3);
    builder.addText('Hello,\tWorld!\n');
    builder.addCut(builder.CUT_FEED);
    //Acquire the print document
    var request = builder.toString();
    alert(request);
}
</script>
</head>
<body>
<button onclick="buildMessage()">Run</button>
</body>
</html>
```

— Create a print document

Fig. 24

```
<script type="text/javascript" src="epos-print-2.x.x.js"></script>
<script type="text/javascript">
function buildMessage() {
    //Create an ePOS-Print Builder object
    var builder = new epson.ePOSBuilder();
    //Create a print document
    //<Configure the print character settings>
    builder.addTextLang('en');
    builder.addTextSmooth(true);
    builder.addTextFont(builder.FONT_A);
    builder.addTextSize(4, 4);
    builder.addTextStyle(false, false, true, undefined);
    //<Specify the print data>
    builder.addText('Hello,\tWorld!\n');
    builder.addCut(builder.CUT_FEED);
    //Acquire the print document
    var request = builder.toString();
}
</script>
```

Fig. 25

```
<script type="text/javascript" src="epos-print-2.x.x.js"></script>
<script type="text/javascript">
function buildMessage() {
    //Create an ePOS-Print Builder object
    var builder = new epson.ePOSBuilder();
    //Render an image in HTML5 Canvas
    var canvas = document.getElementById('canvas');
    var context = canvas.getContext('2d');
    context.drawImage(document.getElementById('logo'), 0, 0, 200, 70);
    //Create a print document
    builder.addTextAlign(builder.ALIGN_CENTER);
    builder.addImage(context, 0, 0, canvas.width, canvas.height, builder.COLOR_1);
    builder.addCut(builder.CUT_FEED);
    //Acquire the print document
    var request = builder.toString();
}
</script>
```

Fig. 26

```
<script type="text/javascript" src="epos-print-2.x.x.js"></script>
<script type="text/javascript">
function buildMessage() {
    //Create an ePOS-Print Builder object
    var builder = new epson.ePOSBuilder();
    //Create a print document
    //<The page mode starts>
    builder.addPageBegin();
    //<Specify the page mode print area>
    builder.addPageArea(100, 50, 200, 100);
    //<Specify the page mode print position>
    builder.addPagePosition(0, 42);
    //<Specify the print data>
    builder.addTextLang('en');
    builder.addTextFont(builder.FONT_A);
    builder.addTextSize(4, 4);
    builder.addTextStyle(false, false, true, undefined);
    builder.addText('Hello,\tworld!\n');
    //<The page mode ends>
    builder.addPageEnd();
    builder.addCut(builder.CUT_FEED);
    //Acquire the print document
    var request = builder.toString();
}
</script>
```

Fig. 27

```
<!DOCTYPE html>
<html>
<head>
<meta charset="utf-8" />
<title>TITLE</title>
<script type="text/javascript" src="epos-print-3.x.x.js"></script>
<script type="text/javascript">
function buildMessage() {
    //Create a print document
    var builder = new epson.ePOSBuilder();
    builder.addTextLang('en');
    builder.addTextSmooth(true);
    builder.addTextFont(builder.FONT_A);
    builder.addTextSize(3, 3);
    builder.addText('Hello,\tWorld!\n');
    builder.addCut(builder.CUT_FEED);
    var request = builder.toString();

//Set the end point address
    var address = 'http://192.168.192.168/cgi-bin/epos/
                   service.cgi?devid=local_printer&timeout=10000';

//Create an ePOS-Print object
    var epos = new epson.ePOSPrint(address);
    //Send the print document
    epos.send(request);
}
</script>
</head>
<body>
<button onclick="buildMessage()">Run</button>
</body>
</html>
```

Transmission of print document

Fig. 28

| Items to specify | Description |
|---|---|
| Domain | Specify either the IP address or the domain name of the TM intelligent printer. |
| Device ID | Specifies the printer to be used for printing.<br><br>Specify the Device ID registered using the TM intelligent printer's TMNet WebConfig. |
| Timeout period | Specifies the time to abort the process in milliseconds.<br>The timeout parameter is optional; when it is omitted, 60 seconds (60000) is set. When the timeout period elapses, the print job is canceled; the data already interpreted by the printer before the start of the print abort process is printed. |

Fig. 29

```
<!DOCTYPE html>
<html>
<head>
<meta charset="utf-8" />
<title>TITLE</title>
<script type="text/javascript" src="epos-print-2.x.x.js"></script>
<script type="text/javascript">
    function buildMessage() {
        //Create a print document
        var builder = new epson.ePOSBuilder();
        builder.addTextLang('en');
        builder.addTextSmooth(true);
        builder.addTextFont(builder.FONT_A);
        builder.addTextSize(3, 3);
        builder.addText('Hello,\tWorld!\n');
        builder.addCut(builder.CUT_FEED);
        var request = builder.toString();

var address = 'http://192.168.192.168/cgi-bin/epos/
                       service.cgi?devid=local_printer&timeout=10000';
        //Create an ePOS-Print object
        var epos = new epson.ePOSPrint(address);
        //Set a response receipt callback function
        epos.onreceive = function (res) {
            //When the printing is not successful, display a message
            if (!res.success) {
                alert('A print error occurred');
            }
        }
        //Send the print document
        epos.send(request);
    }
</script>
</head>
<body>
    <button onclick="buildMessage()">Run</button>
</body>
</html>
```

Print result receipt callback function

Fig. 30

```javascript
//Create an ePOS-Print object
var epos = new epson.ePOSPrint(address);
// Set a response receipt callback function
epos.onreceive = function (res) {
    // Obtain the print result and error code
    var msg = 'Print' + (res.success ? 'Success' : 'Failure') + '\nCode:' + res.code
                                                              + '\nStatus:\n';
    // Obtain the printer status
    var asb = res.status;
    if (asb & epos.ASB_NO_RESPONSE) {
            msg += ' No printer response\n';
        }
        if (asb & epos.ASB_PRINT_SUCCESS) {
            msg += ' Print complete\n';
        }
        if (asb & epos.ASB_DRAWER_KICK) {
            msg += ' Status of the drawer kick number 3 connector pin = "8"\n';
        }
        if (asb & epos.ASB_OFF_LINE) {
            msg += ' Offline status\n';
        }
        if (asb & epos.ASB_COVER_OPEN) {
            msg += ' Cover is open\n';
        }
        if (asb & epos.ASB_PAPER_FEED) {
            msg += ' Paper feed switch is feeding paper\n';
        }
        if (asb & epos.ASB_WAIT_ON_LINE) {
            msg += ' Waiting for online recovery\n';
        }
        if (asb & epos.ASB_PANEL_SWITCH) {
            msg += ' Panel switch is ON\n';
        }
        if (asb & epos.ASB_MECHANICAL_ERR) {
            msg += ' Mechanical error generated\n';
        }
        if (asb & epos.ASB_AUTOCUTTER_ERR) {
            msg += ' Auto cutter error generated\n';
        }
        if (asb & epos.ASB_UNRECOVER_ERR) {
            msg += ' Unrecoverable error generated\n';
        }
        if (asb & epos.ASB_AUTORECOVER_ERR) {
            msg += ' Auto recovery error generated\n';
        }
        if (asb & epos.ASB_RECEIPT_NEAR_END) {
            msg += ' No paper in the roll paper near end detector\n';
        }
        if (asb & epos.ASB_RECEIPT_END) {
            msg += ' No paper in the roll paper end detector\n';
        }
        if (asb & epos.ASB_BUZZER) {
            msg += ' Sounding the buzzer (limited model)\n';
        }
        if (asb & epos.ASB_SPOOLER_IS_STOPPED) {
            msg += ' Stop the spooler\n';
        }
    //Display in the dialog box
    alert(msg);
}
```

Fig. 31

```
<!DOCTYPE html>
<html>
<head>                                              Embed
<meta charset="utf-8" />
<title>TITLE</title>
<script type="text/javascript" src="epos-print-2.x.x.js"></script>
<script type="text/javascript">
  function drawCanvas() {
    .
    .
  }
</script>
</head>

<body>
  .
  .
</body>
</html>
```

Fig. 34

```
<!DOCTYPE html>
<html>
<head>                                              Rendering in HTML5 Canvas
<meta charset="utf-8" />
<title>TITLE</title>
<script type="text/javascript" src="epos-print-2.x.x.js"></script>
<script type="text/javascript">
  function drawCanvas() {
    // Rendering in HTML5 Canvas
    //<Obtain the context>
    var canvas = document.getElementById('myCanvas');
    var context = canvas.getContext('2d');
    //<Render an image>
    context.clearRect(0, 0, 512, 480);
    context.drawImage(document.getElementById('coffee'), 0, 0
                    , 512, 384);
    context.fillStyle = 'rgba(255, 255, 255, 0.5)';
    context.fillRect(0, 0, 512, 480);
    context.fillStyle = 'rgba(0, 0, 0, 1.0)';
    //<Render a water mark for the image>
    context.drawImage(document.getElementById('wmark'), 0, 0);
    context.drawImage(document.getElementById('wmark'), 256, 334);
    //<Render text>
    context.textAlign = 'center';
    context.textBaseline = 'alphabetic';
    context.font = 'bold normal normal 48px "Times New Roman", serif';
    context.fillText('FREE Coffee', 256, 224);
  }
</script>
</head>
<body>
  <button onclick='drawCanvas()'>Run</button>
  <canvas id='myCanvas' width='512' height='480'></canvas>
  <img id='coffee' src='img/coffee.jpg' alt=''>
  <img id='wmark' src='img/wmark.png' alt=''>
</body>
</html>
```

Fig. 35

```
<!DOCTYPE html>
<html>
<head>
<meta charset="utf-8" />
<title>Title</title>
<script type="text/javascript" src="epos-print-2.x.x.js"></script>
<script type="text/javascript">
function drawCanvas() {
    // Rendering in HTML5 Canvas
    //<Obtain the context>
    var canvas = document.getElementById('myCanvas');
    var context = canvas.getContext('2d');
     ・
     ・
    //Set the end point address                                    ┐
    var address = 'http://192.168.192.168/cgi-bin/epos/            │
                   service.cgi?devid=local_printer&timeout=10000'; │ Transmission of print document
    //Create an ePOS-Print Canvas API object                       │
    var epos = new epson.CanvasPrint(address);                     │
    //Print                                                        │
    epos.print(canvas, true);                                      ┘
}
</script>
</head>
<body>
<button onclick="drawCanvas()">Run</button>
<canvas id="myCanvas" width="512" height="480"></canvas>
<img id="coffee" src="img/coffee.jpg" alt="" />
<img id="wmark" src="img/wmark.png" alt="" />
</body>
</html>
```

```
var epos = new epson.CanvasPrint(address);
// Set a response receipt callback function
epos.onreceive = function (res) {
    // Obtain the print result and error code
    var msg = ''Print ' + (res.success ? 'Success' : 'Failure') + '\nCode:'
                                                + res.code + '\nStatus,\n';
    // Obtain the printer status
    var asb = res.status;
    if (asb & epos.ASB_NO_RESPONSE) {
            msg += ' No printer response\n';
    }
        if (asb & epos.ASB_PRINT_SUCCESS) {
            msg += ' Print complete\n';
        }
        if (asb & epos.ASB_DRAWER_KICK) {
            msg += ' Status of the drawer kick number 3 connector pin = "H"\n';
        }
        if (asb & epos.ASB_OFF_LINE) {
            msg += ' Offline status\n';
        }
        if (asb & epos.ASB_COVER_OPEN) {
            msg += ' Cover is open\n';
        }
        if (asb & epos.ASB_PAPER_FEED) {
            msg += ' Paper feed switch is feeding paper\n';
        }
        if (asb & epos.ASB_WAIT_ON_LINE) {
            msg += ' Waiting for online recovery\n';
        }
        if (asb & epos.ASB_PANEL_SWITCH) {
            msg += ' Panel switch is ON\n';
        }
        if (asb & epos.ASB_MECHANICAL_ERR) {
            msg += ' Mechanical error generated\n';
        }
        if (asb & epos.ASB_AUTOCUTTER_ERR) {
            msg += ' Auto cutter error generated\n';
        }
        if (asb & epos.ASB_UNRECOVER_ERR) {
            msg += ' Unrecoverable error generated\n';
        }
        if (asb & epos.ASB_AUTORECOVER_ERR) {
            msg += ' Auto recovery error generated\n';
        }
        if (asb & epos.ASB_RECEIPT_NEAR_END) {
            msg += ' No paper in the roll paper near end detector\n';
        }
        if (asb & epos.ASB_RECEIPT_END) {
            msg += ' No paper in the roll paper end detector\n';
        }
        if (asb & epos.ASB_BUZZER) {
            msg += ' Sounding the buzzer (limited model)\n';
        }
        if (asb & epos.ASB_SPOOLER_IS_STOPPED) {
            msg += ' Stop the spooler\n';
        }
    //Display in the dialog box
    alert(msg);
}
```

Fig. 38

```
//Set the end point address
var address = 'http://192.168.192.168/cgi-bin/epos/service.cgi?devid=local_printer
                &timeout=10000';

//Create an ePOS-Print Canvas API object
var epos = new epson.CanvasPrint(address);

//Set an event callback function (cover open)
epos.oncoveropen = function () {
    alert('coveropen');
};

//Set an event callback function (paper near end)
epos.onpapernearend = function () {
    alert('papernearend');
};

//Enable status event operation
epos.open();
```

Fig. 39

| Element | | | API | Description |
|---|---|---|---|---|
| Constructor | | | | |
| | | | ePOS Builder | Initializes an ePOS-Print XML Builder object |
| Method | | | | |
| | Text | | addTextAlign | Adds a tag for the text alignment setting. |
| | | | addText-LineSpace | Adds a tag for the line feed space setting. |
| | | | addTextRotate | Adds a tag for the text rotation setting. |
| | | | addText | Adds a tag for printing text. |
| | | | addTextLang | Adds a tag for the target language setting. |
| | | | addTextFont | Adds a tag for the text font setting. |
| | | | addTextSmooth | Adds a tag for the text smoothing setting. |
| | | | addTextDouble | Adds a tag for specifying the double-sized text setting. |
| | | | addTextSize | Adds a tag for the text scale setting. |
| | | | addTextStyle | Adds a tag for the text style setting. |
| | | | addTextPosition | Adds a tag for specifying the print position of text. |
| | Paper Feed | | addFeedUnit | Adds a tag for paper feeding (in dots). |
| | | | addFeedLine | Adds a tag for paper feeding (in lines). |
| | | | addFeed | Adds a line feed to the command buffer. (in Ver. 2.0 and later) |
| | Graphic | | addImage | Adds a tag for a raster image to be printed. |
| | | | addLogo | Adds a tag for an NV logo to be printed. |
| | Barcode | | addBarcode | Adds a tag for a bar code to be printed. |
| | | | addSymbol | Adds a tag for a two-dimensional code to be printed. |

Fig. 40

| Element | | API | Description |
|---|---|---|---|
| Method | | | |
| | Ruled line | addHLine | Adds a tag for a horizontal line to be printed. |
| | | addVLineBegin | Adds a tag for starting a vertical line. |
| | | addVLineEnd | Adds a tag for finishing a vertical line. |
| | Pagemode | addPageBegin | Adds a tag for switching to page mode. |
| | | addPageEnd | Adds a tag for finishing page mode. |
| | | addPageArea | Adds a tag for specifying the print area in page mode. |
| | | addPageDirection | Adds a tag for specifying the print direction in page mode. |
| | | addPagePosition | Adds a tag for specifying the print position in page mode. |
| | | addPageLine | Adds a tag for drawing a line in page mode. |
| | | addPageRectangle | Adds a tag for drawing a rectangle in page mode. |
| | Cut | addCut | Adds a tag for paper cut. |
| | Drawer kick-out | addPulse | Adds a tag for the drawer kick-out. |
| | Buzzer | addSound | Adds a tag for turning on the buzzer. |
| | Send Command | addCommand | Raster image halftone processing method |
| | Create a Print Document | toString | Raster image brightness correction value |
| Property | | | |
| | | halftone | Raster image halftone processing method (in Ver. 1.2 and later) |
| | | brightness | Raster image brightness correction value (in Ver. 1.2 and later) |
| | | message | Message buffer |

Fig. 41

| Element | API | Description |
|---|---|---|
| Constant | FONT_* | font |
| | ALIGN_* | alignment |
| | COLOR_* | color specification |
| | HALFTONE_* | Halftone type (in Ver. 1.2 and later) |
| | MODE_* | Color mode (in Ver. 1.2 and later) |
| | BARCODE_* | bar code type |
| | HRI_* | HRI position |
| | SYMBOL_* | two-dimensional code type |
| | LEVEL_* | error correction level |
| | LINE_* | line style |
| | DIRECTION_* | page mode print direction |
| | CUT_* | paper cut type |
| | DRAWER_* | drawer kick-out connector |
| | PULSE_* | drawer kick-out pulse length |
| | PATTERN_* | buzzer sound pattern |

Fig. 42a

| Element | | API | Description |
|---|---|---|---|
| Constructor | | | |
| | ePOS-Print | Initializes an ePOS-Print object |
| Method | | | |
| | send | Sends a message |
| | open | Enables status event operation (in Ver. 1.2 and later) |
| | close | Disables status event operation (in Ver. 1.2 and later) |
| Property | | | |
| | address | URL of the printer (in Ver. 1.2 and later) |
| | enabled | Enabling/disabling of status event (in Ver. 1.2 and later) |
| | interval | Printer status update interval (in Ver. 1.2 and later) |
| | status | Status |
| Event | | | |
| | onreceive | Response message receipt event |
| | onerror | Communication error event |
| | onstatuschange | Status change event (in Ver. 1.2 and later) |
| | ononline | Online event (in Ver. 1.2 and later) |
| | onoffline | Offline event (in Ver. 1.2 and later) |
| | onpoweroff | Non-response event (in Ver. 1.2 and later) |
| | oncoverok | Cover close event (in Ver. 1.2 and later) |
| | oncoveropen | Cover open event (in Ver. 1.2 and later) |
| | onpaperok | Paper remaining event (in Ver. 1.2 and later) |
| | onpapernearend | Paper near end event (in Ver. 1.2 and later) |
| | onpaperend | Paper end event (in Ver. 1.2 and later) |
| | ondrawerclosed | Drawer close event (in Ver. 1.2 and later) |
| | ondraweropen | Drawer open event (in Ver. 1.2 and later) |
| Constant | | | |
| | ASB_* | Status |

Fig. 42b

```
<script type='text/javascript' src='epos-print-2.x.x.js'></script>
<script type='text/javascript'>
<!--
function buildMessage() {
  var builder = new epson.ePOSBuilder();
}
//-->
</script>
```

Fig. 43

| Constant(align) | Description |
|---|---|
| ALIGN_LEFT (default) | Alignment to the left |
| ALIGN_CENTER | Alignment to the center |
| ALIGN_RIGHT | Alignment to the right |

Fig. 44

| Return value | Object type |
|---|---|
| ePOS-Print Builder Object | ePOS Builder |

Fig. 45

| Exception | Object type |
|---|---|
| Parameter "..." is invalid | Error |

Fig. 46

```
<script type='text/javascript' src='epos-print-2.x.x.js'></script>
<script type='text/javascript'>
<!--
function buildMessage() {
  var builder = new epson.ePOSBuilder();
  builder.addTextAlign(builder.ALIGN_CENTER);
}
//-->
</script>
```

Fig. 47

```
<script type="text/javascript" src="epos-print-2.x.x.js"></script>
<script type="text/javascript">
<!--
function buildMessage() {
  var builder = new epson.ePOSBuilder();
  builder.addTextLineSpace(30);
}
//-->
</script>
```

Fig. 48

| Setting | Description |
|---|---|
| true or 1 | Specifies rotated printing of text. |
| false or 0 (default) | Cancels rotated printing of text. |

Fig. 49

```
<script type="text/javascript" src="epos-print-2.x.x.js"></script>
<script type="text/javascript">
<!--
function buildMessage() {
  var builder = new epson.ePOSBuilder();
  builder.addTextRotate(true);
}
//-->
</script>
```

Fig. 50

| String | Description |
|---|---|
| \t | Horizontal tab(HT) |
| \n | Line feed (LF) |
| \\ | Carriage return |

Fig. 51

```
<script type="text/javascript" src="epos-print-2.x.x.js"></script>
<script type="text/javascript">
<!--
function buildMessage() {
  var builder = new epson.ePOSBuilder();
  builder.addText('Hello,\t').addText('World\n');
}
//-->
</script>
```

Fig. 52

| Setting | Language |
|---|---|
| en(default) | English(ANK) |
| ja | Japanese |

Fig. 53

```
<script type="text/javascript" src="epos-print-2.x.x.js"></script>
<script type="text/javascript">
<!--
function buildMessage() {
  var builder = new epson.ePOSBuilder();
  builder.addTextLang('en');
}
//-->
</script>
```

Fig. 54

| Constant (font) | Language |
|---|---|
| FONT_A (default) | Font A |
| FONT_B | Font B |
| FONT_C | Font C |

Fig. 55

```
<script type="text/javascript" src="epos-print-2.x.x.js"></script>
<script type="text/javascript">
<!--
function buildMessage() {
  var builder = new epson.ePOSBuilder();
  builder.addTextFont(builder.FONT_B);
}
//-->
</script>
```

Fig. 56

| Setting | Description |
| --- | --- |
| true or 1 | Specifies smoothing. |
| false or 0 (default) | Cancels smoothing |

Fig. 57

```
<script type="text/javascript" src="epos-print-2.x.x.js"></script>
<script type="text/javascript">
<!--
function buildMessage() {
   var builder = new epson.ePOSBuilder();
   builder.addTextSmooth(true);
}
//-->
</script>
```

Fig. 58

| Setting | Description |
| --- | --- |
| true or 1 | Specifies the double-sized width. |
| false or 0 (default) | Cancels the double-sized width |
| undefined (When not specified) | Retains the current setting for double-sized width. |

Fig. 59

| Setting | Description |
| --- | --- |
| true or 1 | Specifies the double-sized height |
| false or 0 (default) | Cancels the double-sized height |
| undefined (When not specified) | Retains the current setting for double-sized height |

Fig. 60

```
<script type="text/javascript" src="epos-print-2.x.x.js"></script>
<script type="text/javascript">
<!--
function buildMessage() {
   var builder = new epson.ePOSBuilder();
   builder.addTextDouble(true, true);
}
//-->
</script>
```

Fig. 61

| Setting | Description |
|---|---|
| Integer from 1 to 8 | Horizontal scale (default : 1) |
| undefined (When not specified) | Retains the current setting for the horizontal scale. |

Fig. 62

| Setting | Description |
|---|---|
| Integer from 1 to 8 | Vertical scale (default : 1) |
| undefined (When not specified) | Retains the current setting for the vertical scale. |

Fig. 63

```
<script type="text/javascript" src="epos-print-2.x.x.js"></script>
<script type="text/javascript">
<!--
function buildMessage() {
  var builder = new epson.ePOSBuilder();
  builder.addTextSize(4, 4);
}
//-->
</script>
```

Fig. 64

| Setting | Description |
|---|---|
| true or 1 | Specifies the inversion of black and white parts of characters. |
| false or 0 (default) | Cancels the inversion of black and white parts of characters. |
| undefined (When not specified) | Retains the current setting for inversion of black and white. |

Fig. 65

| Setting | Description |
|---|---|
| true or 1 | Specifies underlining. |
| false or 0 (default) | Cancels underlining. |
| undefined (When not specified) | Retains the current underlining setting. |

Fig. 66

| Setting | Description |
|---|---|
| true or 1 | Specifies emphasized printing of characters. |
| false or 0 (default) | Cancels emphasized printing of characters. |
| undefined (When not specified) | Retains the current setting for emphasized printing. |

Fig. 67

| Setting | Description |
|---|---|
| COLOR_NONE | Characters are not printed. |
| COLOR_1 (default) | First color |
| COLOR_2 | Second color |
| COLOR_3 | Third color |
| COLOR_4 | Fourth color |
| undefined (When not specified) | Retains the current color setting |

Fig. 68

```
<script type="text/javascript" src="epos-print-2.x.x.js"></script>
<script type="text/javascript">
<!--
function buildMessage() {
  var builder = new epson.ePOSBuilder();
  builder.addTextStyle(undefined, true);
}
//-->
</script>
```

Fig. 69

```
<script type="text/javascript" src="epos-print-2.x.x.js"></script>
<script type="text/javascript">
<!--
function buildMessage() {
  var builder = new epson.ePOSBuilder();
  builder.addTextPosition(120);
}
//-->
</script>
```

Fig. 70

```
<script type="text/javascript" src="epos-print-2.x.x.js"></script>
<script type="text/javascript">
<!--
function buildMessage() {
  var builder = new epson.ePOSBuilder();
  builder.addFeedUnit(30);
}
//-->
</script>
```

Fig. 71

```
<script type="text/javascript" src="epos-print-2.x.x.js"></script>
<script type="text/javascript">
<!--
function buildMessage() {
  var builder = new epson.ePOSBuilder();
  builder.addFeedLine(3);
}
//-->
</script>
```

Fig. 72

```
<script type="text/javascript" src="epos-print-2.x.x.js"></script>
<script type="text/javascript">
<!--
function buildMessage() {
  var builder = new epson.ePOSBuilder();
    builder.addText("Hello").addFeed();
    builder.addText("World").addFeed();
}
//-->
</script>
```

Fig. 73

| Setting | Description |
| --- | --- |
| COLOR_NONE | Characters are not printed. |
| COLOR_1 (default) | First color |
| COLOR_2 | Second color |
| COLOR_3 | Third color |
| COLOR_4 | Fourth color |
| undefined (When not specified) | First color |

Fig. 74

| Setting | Description |
| --- | --- |
| MODE_MONO | Monochrome (two-tone) |
| MODE_GRAY16 | Gray scale (16-tone) |
| undefined (When not specified) | Monochrome (two-tone) |

Fig. 75

```
<script type="text/javascript" src="epos-print-2.x.x.js"></script>
<script type="text/javascript">
<!--
function buildMessage() {
  var builder = new epson.ePOSBuilder();
  var canvas = document.getElementById('canvas');
  if (canvas.getContext) {
    var context = canvas.getContext('2d');
    builder.addImage(context, 0, 0, canvas.width, canvas.height);
  }
}
//-->
</script>
```

⋮

```
var canvas = document.getElementById('myCanvas');
var context = canvas.getContext('2d');
var builder = new epson.ePOSBuilder();
builder.addPageBegin();
builder.addPageArea(0, 0, 300, 300);
builder.addPagePosition(0, 299);
builder.addImage(context, 0, 0, 300, 300);
builder.addPageEnd();
```

Fig. 76

```
<script type="text/javascript" src="epos-print-2.x.x.js"></script>
<script type="text/javascript">
<!--
function buildMessage() {
  var builder = new epson.ePOSBuilder();
  builder.addLogo(48, 48);
}
//-->
</script>
```

Fig. 77

| Barcode type | Description |
|---|---|
| UPC-A | When an 11-digit number is specified, a check digit is automatically added.<br>When a 12-digit number is specified, the 12th digit is processed as a check digit but the check digit is not validated. |
| UPC-E | Specify 0 as the first digit.<br>Specify the manufacturer code in the digits 2 to 6.<br>Specify (right-align) the item code in the digits 7 to 11.<br>The number of item code digits varies depending on the manufacturer code. Specify 0s in empty digits.<br>When an 11-digit number is specified, a check digit is automatically added.<br>When a 12-digit number is specified, the 12th digit is processed as a check digit but the check digit is not validated. |
| EAN13 | When an 12-digit number is specified, a check digit is automatically added.<br>When a 13-digit number is specified, the 12th digit is processed as a check digit but the check digit is not validated. |
| JAN13 | |
| EAN8 | When a 7-digit number is specified, a check digit is automatically added.<br>When an 8-digit number is specified, the 8th digit is processed as a check digit but the check digit is not validated. |
| JAN8 | |
| CODE39 | When the first character is *, the character is processed as the start character. In other cases, a start character is automatically added. |

Fig. 78

| Barcode type | Description |
|---|---|
| ITF | Start and stop codes are automatically added. Check digits are not added or validated. |
| CODABAR | Specify a start character (A to D, a to d). Specify a stop character (A to D, a to d). Check digits are not added or validated. |
| CODE93 | Start and stop characters are automatically added. A check digit is automatically calculated and added. |
| CODE128 | Specify a start character (CODE A, CODE B, CODE C). A stop character is automatically added. A check digit is automatically calculated and added. To encode each of the following characters, specify two characters starting with the character "{": <br>FNC1: {1<br>FNC2: {2<br>FNC3: {3<br>FNC4: {4<br>CODE A: {A<br>CODE B: {B<br>CODE C: {C<br>SHIFT: {S<br>{: {{ |
| GS1-128 | A start character, FNC1, a check digit, and a stop character are automatically added. To automatically calculate and add a check digit for an application identifier (AI) and the subsequent data, specify the character "*" in the position of the check digit. You can enclose an application identifier (AI) in parentheses. The parentheses are used as HRI print characters and are not encoded as data. You can insert spaces between an application identifier (AI) and data. The spaces are used as HRI print characters and are not encoded as data. To encode each of the following characters, specify two characters starting with the character "{": <br>FNC1: {1<br>FNC3: {3<br>(: {(<br>): {)<br>*: {*<br>{: {{ |

Fig. 79

| Barcode type | Description |
|---|---|
| GS1 DataBar Omnidirectional | Specify a 13-digit global trade item number (GTIN) not including an application identifier (AI) or a check digit. |
| GS1 DataBar Truncated | |
| GS1 DataBar Limited | |
| BARCODE_GS1_DATABAR_EXPANDED | You can enclose an application identifier (AI) in parentheses. The parentheses are used as HRI print characters and are not encoded as data.<br>To encode each of the following characters, specify two characters starting with the character "{":<br>FNC1: {1<br>(: {(<br>): {) |

Fig. 80

| Constant (type) | Barcode type |
|---|---|
| BARCODE_UPC_A | UPC-A |
| BARCODE_UPC_E | UPC-E |
| BARCODE_EAN13 | EAN13 |
| BARCODE_JAN13 | JAN13 |
| BARCODE_EAN8 | EAN8 |
| BARCODE_JAN8 | JAN8 |
| BARCODE_CODE39 | CODE39 |
| BARCODE_ITF | ITF |
| BARCODE_CODABAR | CODABAR |
| BARCODE_CODE93 | CODE93 |
| BARCODE_CODE128 | CODE128 |
| BARCODE_GS1_128 | GS1-128 |
| BARCODE_GS1_DATABAR_OMNIDIRECTIONAL | GS1 DataBar Omnidirectional |
| BARCODE_GS1_DATABAR_TRUNCATED | GS1 DataBar Truncated |
| BARCODE_GS1_DATABAR_LIMITED | GS1 DataBar Limited |
| BARCODE_GS1_DATABAR_EXPANDED | GS1 Databar Expanded |

Fig. 81

| Constant (hri) | Description |
| --- | --- |
| HRI_NONE (default) | HRI not printed |
| HRI_ABOVE | Above the bar code |
| HRI_BELOW | Below the bar code |
| HRI_BOTH | Both above and below the bar code |

Fig. 82

```
<script type="text/javascript" src="epos-print-2.x.x.js"></script>
<script type="text/javascript">
<!--
function buildMessage() {
  var builder = new epson.ePOSBuilder();
  builder.addBarcode('01234567890', builder.BAROCDE_UPC_A,
      builder.HRI_BELOW, undefined, 2, 64);
  builder.addBarcode('01234500005', builder.BAROCDE_UPC_E);
  builder.addBarcode('201234567890', builder.BAROCDE_EAN13);
  builder.addBarcode('201234567890', builder.BAROCDE_JAN13);
  builder.addBarcode('2012345', builder.BAROCDE_EAN8);
  builder.addBarcode('2012345', builder.BAROCDE_JAN8);
  builder.addBarcode('ABCDE', builder.BAROCDE_CODE39);
  builder.addBarcode('012345', builder.BAROCDE_ITF);
  builder.addBarcode('A012345A', builder.BAROCDE_CODABAR);
  builder.addBarcode('ABCDE', builder.BAROCDE_CODE93);
  builder.addBarcode('{Babcde', builder.BAROCDE_CODE128);
  builder.addBarcode('(01)201234567890*', builder.BAROCDE_GS1_128);
  builder.addBarcode('0201234567890',
      builder.BAROCDE_GS1_DATABAR_OMNIDIRECTIONAL);
  builder.addBarcode('0201234567890',
      builder.BAROCDE_GS1_DATABAR_TRUNCATED);
  builder.addBarcode('0201234567890',
      builder.BAROCDE_GS1_DATABAR_LIMITED);
  builder.addBarcode('(01)2012345678903',
      builder.BAROCDE_GS1_DATABAR_EXPANDED);
}
//-->
</script>
```

Fig. 83

| 2D-Code type | Description |
|---|---|
| Standard PDF417 | Convert the character string to the string in UTF-8, apply the escape sequence, and then encode the string. |
| Truncated PDF417 | The data area can contain up to 928 code words in a maximum of 90 rows, each of which can contain up to 30 code words. |
| QR Code Model 1 | Convert the character string to the string in Shift-JIS, apply the escape sequence, and then encode the string based on the data type as shown below.<br>Number:           0 to 9<br>Alphanumeric character:<br>0 to 9, A to Z, space, $, %, *, +, -, .., /, :<br>Kanji character:   Shift-JIS value<br>8-bit, byte data:<br>            0x00 to 0xff |
| QR Code Model 2 | |

Fig. 84

| 2D-Code type | Description |
|---|---|
| MaxiCode Mode 2 | Convert the character string to the string in UTF-8, apply the escape sequence, and then encode the string. |
| MaxiCode Mode 3 | |
| MaxiCode Mode 4 | |
| MaxiCode Mode 5 | |
| MaxiCode Mode 6 | In Modes 2 and 3, when the first piece of data is ()>\ x1e01\x1dyy (where yy is a two-digit number), this is processed as the message header, and the subsequent data is processed as the primary message. In other cases, from the first piece of data, data is processed as the primary message.<br><br>In Mode 2, specify the primary message in the following format:<br>Postal code (1- to 9-digit number) GS:(\x1d) ISO country code (1- to 3-digit number) GS:(\x1d) Service class code (1- to 3-digit number)<br><br>In Mode 3, specify the primary message in the following format:<br>Postal code (1 to 6 pieces of data convertible by Code Set A) GS:(\x1d) ISO country code (1- to 3-digit number) GS:(\x1d) Service class code (1- to 3-digit number) |
| GS1 DataBar Stacked | Convert the character string to the string in UTF-8, apply the escape sequence, and then encode the string. |
| GS1 DataBar Stacked Omnidirectional | Specify a 13-digit global trade item number (GTIN) not including an application identifier (AI) or a check digit. |
| GS1 DataBar Expanded Stacked | Convert the character string to the string in UTF-8, apply the escape sequence, and then encode the string.<br><br>You can enclose an application identifier (AI) in parentheses. The parentheses are used as HRI print characters and are not encoded as data. To encode each of the following characters, specify two characters starting with the character "{":<br>FNC1:   {1<br>(:       {(<br>):       {) |

Fig. 85

| Constant (type) | 2D-Code type |
|---|---|
| SYMBOL_PDF417_STANDARD | Standard PDF417 |
| SYMBOL_PDF417_TRUNCATED | Truncated PDF417 |
| SYMBOL_QRCODE_MODEL_1 | QR Code Model 1 |
| SYMBOL_QRCODE_MODEL_2 | QR Code Model 2 |
| SYMBOL_MAXICODE_MODE_2 | MaxiCode Mode 2 |
| SYMBOL_MAXICODE_MODE_3 | MaxiCode Mode 3 |
| SYMBOL_MAXICODE_MODE_4 | MaxiCode Mode 4 |
| SYMBOL_MAXICODE_MODE_5 | MaxiCode Mode 5 |
| SYMBOL_MAXICODE_MODE_6 | MaxiCode Mode 6 |
| SYMBOL_GS1_DATABAR_STACKED | GS1 DataBar Stacked |
| SYMBOL_GS1_DATABAR_STACKED_OMNIDIRECTIONAL | GS1 DataBar Stacked Omnidirectional |
| SYMBOL_GS1_DATABAR_EXPANDED_STACKED | GS1 DataBar Expanded Stacked |

Fig. 86

| Constant (level) | Description |
|---|---|
| LEVEL_0 | PDF417 error correction level 0 |
| LEVEL_1 | PDF417 error correction level 1 |
| LEVEL_2 | PDF417 error correction level 2 |
| LEVEL_3 | PDF417 error correction level 3 |
| LEVEL_4 | PDF417 error correction level 4 |
| LEVEL_5 | PDF417 error correction level 5 |
| LEVEL_6 | PDF417 error correction level 6 |
| LEVEL_7 | PDF417 error correction level 7 |
| LEVEL_8 | PDF417 error correction level 8 |
| LEVEL_L | QR Code error correction level L |
| LEVEL_M | QR Code error correction level M |
| LEVEL_Q | QR Code error correction level Q |
| LEVEL_H | QR Code error correction level H |
| LEVEL_DEFAULT | Default level |

Fig. 87

```
<script type="text/javascript" src="epos-print-2.x.x.js"></script>
<script type="text/javascript">
<!--
function buildMessage() {
  var builder = new epson.ePOSBuilder();
  builder.addSymbol('ABCDE', builder.SYMBOL_PDF417_STANDARD);
  builder.addSymbol('ABCDE', builder.SYMBOL_QRCODE_MODEL_2,
      builder.LEVEL_Q);
  builder.addSymbol('908063840\xld850\xld001\xld\x04',
      builder.SYMBOL_MAXICODE_MODE_2);
  builder.addSymbol('0201234567890', builder.SYMBOL_
      GS1_DATABAR_STACKED);
  builder.addSymbol('0201234567890',
      builder.SYMBOL_GS1_DATABAR_STACKED_OMNIDIRECTIONAL);
  builder.addSymbol('(01)02012345678903',
      builder.SYMBOL_GS1_DATABAR_EXPANDED_STACKED);
}
//-->
</script>
```

Fig. 88

| Constant (style) | Description |
|---|---|
| LINE_THIN | Solid line: Thin |
| LINE_MEDIUM | Solid line: Medium |
| LINE_THICK | Solid line: Thick |
| LINE_THIN_DOUBLE | Double line: Thin |
| LINE_MEDIUM_DOUBLE | Double line: Medium |
| LINE_THICK_DOUBLE | Double line: Thick |
| undefined (When not specified) | Solid line: Thin |

Fig. 89

```
<script type="text/javascript" src="epos-print-2.x.x.js"></script>
<script type="text/javascript">
<!--
function buildMessage() {
  var builder = new epson.ePOSBuilder();
  builder.addHLine(100, 200, builder.LINE_THIN_DOUBLE);
  builder.addHLine(400, 500, builder.LINE_THIN_DOUBLE);
}
//-->
</script>
```

Fig. 90

| Constant (style) | Description |
| --- | --- |
| LINE_THIN | Solid line: Thin |
| LINE_MEDIUM | Solid line: Medium |
| LINE_THICK | Solid line: Thick |
| LINE_THIN_DOUBLE | Double line: Thin |
| LINE_MEDIUM_DOUBLE | Double line: Medium |
| LINE_THICK_DOUBLE | Double line: Thick |
| undefined (When not specified) | Solid line: Thin |

Fig. 91

```
<script type="text/javascript" src="epos-print-2.x.x.js"></script>
<script type="text/javascript">
<!--
function buildMessage() {
  var builder = new epson.ePOSBuilder();
  builder.addVLineBegin(100).addVLineBegin(200);
  builder.addFeedUnit(100);
  builder.addVLineEnd(100).addVLineEnd(200);
}
//-->
</script>
```

Fig. 92

| Constant (style) | Description |
| --- | --- |
| LINE_THIN | Solid line: Thin |
| LINE_MEDIUM | Solid line: Medium |
| LINE_THICK | Solid line: Thick |
| LINE_THIN_DOUBLE | Double line: Thin |
| LINE_MEDIUM_DOUBLE | Double line: Medium |
| LINE_THICK_DOUBLE | Double line: Thick |
| undefined (When not specified) | Solid line: Thin |

Fig. 93

```
<script type="text/javascript" src="epos-print-2.x.x.js"></script>
<script type="text/javascript">
<!--
function buildMessage() {
  var builder = new epson.ePOSBuilder();
  builder.addVLineBegin(100).addVLineBegin(200);
  builder.addFeedUnit(100);
  builder.addVLineEnd(100).addVLineEnd(200);
}
//-->
</script>
```

Fig. 94

```
<script type="text/javascript" src="epos-print-2.x.x.js"></script>
<script type="text/javascript">
<!--
function buildMessage() {
  var builder = new epson.ePOSBuilder();
  builder.addPageBegin();
  builder.addText('ABCDE');
  builder.addPageEnd();
}
//-->
</script>
```

Fig. 95

```
<script type="text/javascript" src="epos-print-2.x.x.js"></script>
<script type="text/javascript">
<!--
function buildMessage() {
  var builder = new epson.ePOSBuilder();
  builder.addPageBegin();
  builder.addPageArea(100, 50, 200, 30);
  builder.addText('ABCDE');
  builder.addPageEnd();
}
//-->
</script>
```

Fig. 96

| Constant (dir) | Description |
|---|---|
| DIRECTION_LEFT_TO_RIGHT(default) | Left to right<br>(No rotation. Data is printed from the top left corner to the right.) |
| DIRECTION_BOTTOM_TO_TOP | Bottom to top<br>(Counterclockwise rotation by 90 degrees. Data is printed from the bottom left corner to the top.) |
| DIRECTION_RIGHT_TO_LEFT | Right to left<br>(Rotation by 180 degrees. Data is printed from the bottom right corner to the left.) |
| DIRECTION_TOP_TO_BOTTOM | Top to bottom<br>(Clockwise rotation by 90 degrees. Data is printed from the top right corner to the bottom.) |

Fig. 97

```
<script type="text/javascript" src="epos-print-2.x.x.js"></script>
<script type="text/javascript">
<!--
function buildMessage() {
  var builder = new epson.ePOSBuilder();
  builder.addPageBegin();
  builder.addPageArea(100, 50, 30, 200);
  builder.addPageDirection(builder.DIRECTION_TOP_TO_BOTTOM);
  builder.addText('ABCDE');
  builder.addPageEnd();
}
//-->
</script>
```

Fig. 98

```
<script type="text/javascript" src="epos-print-2.x.x.js"></script>
<script type="text/javascript">
<!--
function buildMessage() {
  var builder = new epson.ePOSBuilder();
  builder.addPageBegin();
  builder.addPageArea(100, 50, 200, 100);
  builder.addPagePosition(50, 30);
  builder.addText('ABCDE');
  builder.addPageEnd();
}
//-->
</script>
```

Fig. 99

| Constant (style) | Description |
| --- | --- |
| LINE_THIN | Solid line: Thin |
| LINE_MEDIUM | Solid line: Medium |
| LINE_THICK | Solid line: Thick |
| LINE_THIN_DOUBLE | Double line: Thin |
| LINE_MEDIUM_DOUBLE | Double line: Medium |
| LINE_THICK_DOUBLE | Double line: Thick |
| undefined (When not specified) | Solid line: Thin |

Fig. 100

```
<script type="text/javascript" src="epos-print-2.x.x.js"></script>
<script type="text/javascript">
<!--
function buildMessage() {
  var builder = new epson.ePOSBuilder();
  builder.addPageBegin();
  builder.addPageLine(100, 0, 500, 0, builder.LINE_THIN);
  builder.addPageEnd();
}
//-->
</script>
```

Fig. 101

| Constant (style) | Description |
|---|---|
| LINE_THIN | Solid line: Thin |
| LINE_MEDIUM | Solid line: Medium |
| LINE_THICK | Solid line: Thick |
| LINE_THIN_DOUBLE | Double line: Thin |
| LINE_MEDIUM_DOUBLE | Double line: Medium |
| LINE_THICK_DOUBLE | Double line: Thick |
| undefined (When not specified) | Solid line: Thin |

Fig. 102

```
<script type="text/javascript" src="epos-print-2.x.x.js"></script>
<script type="text/javascript">
<!--
function buildMessage() {
  var builder = new epson.ePOSBuilder();
  builder.addPageBegin();
  builder.addPageLine(100, 0, 500, 200, builder.LINE_THIN_DOUBLE);
  builder.addPageEnd();
}
//-->
</script>
```

Fig. 103

| Setting | Description |
|---|---|
| CUT_NO_FEED | Cut without feeding (The paper is cut without being fed.) |
| CUT_FEED | Feed cut (The paper is fed to the cut position and then is cut.) |
| CUT_RESERVE | Cut reservation (Printing continues until the cut position is reached, at which the paper is cut.) |
| undefined (When not specified) | Feed cut (The paper is fed to the cut position and then is cut.) |

Fig. 104

```
<script type="text/javascript" src="epos-print-2.x.x.js"></script>
<script type="text/javascript">
<!--
function buildMessage() {
  var builder = new epson.ePOSBuilder();
  builder.addCut(builder.CUT_FEED);
}
//-->
</script>
```

Fig. 105

| Setting | Description |
|---|---|
| DRAWER_1 | Pin 2 of the drawer kick-out connector |
| DRAWER_2 | Pin 5 of the drawer kick-out connector |
| undefined (When not specified) | Pin 2 of the drawer kick-out connector |

Fig. 106

| Setting | Description |
|---|---|
| PULSE_100 | 100 ms |
| PULSE_200 | 200 ms |
| PULSE_300 | 300 ms |
| PULSE_400 | 400 ms |
| PULSE_500 | 500 ms |
| undefined (When not specified) | 100 ms |

Fig. 107

```
<script type="text/javascript" src="epos-print-2.x.x.js"></script>
<script type="text/javascript">
<!--
function buildMessage() {
  var builder = new epson.ePOSBuilder();
  builder.addPulse(builder.DRAWER_1, builder.PULSE_100);
}
//-->
</script>
```

Fig. 108

| Setting | Description |
|---|---|
| PATTERN_NONE | Stop |
| PATTERN_A | Pattern A |
| PATTERN_B | Pattern B |
| PATTERN_C | Pattern C |
| PATTERN_D | Pattern D |
| PATTERN_E | Pattern E |
| PATTERN_ERROR | Error sound pattern |
| PATTERN_PAPER_END | Pattern when there is no paper |
| undefined (When not specified) | Pattern A |

Fig. 109

| Setting | Description |
|---|---|
| 0 | The buzzer does not stop. |
| 1 to 255 | Number of repeats |
| undefined (When not specified) | One time |

Fig. 110

```
<script type="text/javascript" src="epos-print-2.x.x.js"></script>
<script type="text/javascript">
<!--
function buildMessage() {
  var builder = new epson.ePOSBuilder();
  builder.addSound(builder.PATTERN_A, 3);
}
//-->
</script>
```

Fig. 111

```
<script type="text/javascript" src="epos-print-2.x.x.js"></script>
<script type="text/javascript">
<!--
function buildMessage() {
  var builder = new epson.ePOSBuilder();
  var doc = builder.toString();
}
//-->
</script>
```

Fig. 112

| Constant | Description |
| --- | --- |
| HALFTONE_DITHER (default) | Dithering, suitable for printing graphics only. |
| HALFTONE_ERROR_DIFFUSION | Error diffusion, suitable for printing text and graphics together. |
| HALFTONE_THRESHOLD | Threshold, suitable for printing text only. |

Fig. 113

```
<script type="text/javascript" src="epos-print-2.x.x.js"></script>
<script type="text/javascript">
<!--
function buildMessage() {
var builder = new epson.ePOSBuilder();
var canvas = document.getElementById('canvas');
if (canvas.getContext) {
   var context = canvas.getContext('2d');
   builder.halftone = epos.HALFTONE_ERROR_DIFFUSION;
   builder.addImage(context, 0, 0, canvas.width, canvas.height);
   }
}
//-->
</script>
```

Fig. 114

```
<script type="text/javascript" src="epos-print-2.x.x.js"></script>
<script type="text/javascript">
<!--
function buildMessage() {
var builder = new epson.ePOSBuilder();
var canvas = document.getElementById('canvas');
if (canvas.getContext) {
   var context = canvas.getContext('2d');
   builder.brightness = 2.2;
   builder.addImage(context, 0, 0, canvas.width, canvas.height);
   }
}
//-->
</script>
```

Fig. 115

```
<script type="text/javascript" src="epos-print-2.x.x.js"></script>
<script type="text/javascript">
<!--
function buildMessage() {
var builder = new epson.ePOSBuilder();
   builder.addText('ABCDE');
   builder.message = '';
}
//-->
</script>
```

Fig. 116

```
<script type="text/javascript" src="epos-print-2.x.x.js"></script>
<script type="text/javascript">
<!--
function sendMessage() {
  var address = 'http://192.168.192.168/cgi-bin/epos/
                 service.cgi?devid=local_printer';
  var epos = new epson.ePOSPrint(address);
}
//-->
</script>
```

Fig. 117

```
<script type="text/javascript" src="epos-print-2.x.x.js"></script>
<script type="text/javascript">
<!--
function printHelloWorld() { var builder = new epson.ePOSBuilder();
  builder.addText('Hello, World!\n');
  builder.addCut();
  var request = builder.toString();

var address = 'http://192.168.192.168/cgi-bin/epos/service.cgi?devid=local_printer';
  var epos = new epson.ePOSPrint(address);
  epos.onreceive = function (res) { alert(res.success); };
  epos.onerror = function (err) { alert(err.status); };
  epos.send(request);
}
//-->
</script>
```

Fig. 118

```
<script type="text/javascript" src="epos-print-2.x.x.js"></script>
<script type="text/javascript">
<!--
  var address = 'http://192.168.192.168/cgi-bin/epos/service.cgi?devid=local_printer'
  var epos = new epson.ePOSPrint(address);
  epos.oncoveropen = function () {
    alert('coveropen');
  };

function startMonitor() {
  epos.open();
} function stopMonitor() {
  epos.close();
}
//-->
</script>
```

Fig. 119

```
<script type="text/javascript" src="epos-print-2.x.x.js"></script>
<script type="text/javascript">
<!--
  var address = 'http://192.168.192.168/cgi-bin/epos/service.cgi?devid=local_printer';
  var epos = new epson.ePOSPrint(address);
  epos.oncoveropen = function () {
    alert('coveropen');
  };

function startMonitor() {
  epos.open();
} function stopMonitor() {
  epos.close();
}
//-->
</script>
```

Fig. 120

```
<script type="text/javascript" src="epos-print-2.x.x.js"></script>
<script type="text/javascript">
<!--
  var epos = new epson.ePOSPrint();
  epos.address = 'http://192.168.192.168/cgi-bin/epos/
service.cgi?devid=local_printer';
  epos.oncoveropen = function () { alert('coveropen'); };
  epos.open();
//-->
</script>
```

Fig. 121

```
<script type="text/javascript" src="epos-print-2.x.x.js"></script>
<script type="text/javascript">
<!--
  var address = 'http://192.168.192.168/cgi-bin/epos/service.cgi?devid=local_printer';
  var epos = new epson.ePOSPrint(address);
  epos.oncoveropen = function () { alert('coveropen'); };
  epos.open();
  alert(epos.enabled);
//-->
</script>
```

Fig. 122

```
<script type="text/javascript" src="epos-print-2.x.x.js"></script>
<script type="text/javascript">
<!--
  var address = 'http://192.168.192.168/cgi-bin/epos/service.cgi?devid=local_printer';
  var epos = new epson.ePOSPrint(address);
  epos.interval = 1000;
  epos.oncoveropen = function () { alert('coveropen'); };
  epos.open();
//-->
</script>
```

Fig. 123

```
<script type="text/javascript" src="epos-print-2.x.x.js"></script>
<script type="text/javascript">
<!--
  var address = 'http://192.168.192.168/cgi-bin/epos/service.cgi?devid=local_printer';
  var epos = new epson.ePOSPrint(address);
  epos.onoffline = function () {
    alert(epos.status);
  };
  epos.open();
//-->
</script>
```

Fig. 124

| Property | Name | Object type |
|---|---|---|
| success | Print result | Boolean |
| code | Error code | String |
| status | Status | Number |

Fig. 125

| Value | Description |
|---|---|
| true or 1 | Printing succeeded. |
| false or 0 | Printing failed. |

Fig. 126

| Value | Description |
|---|---|
| 'EPTR_AUTOMATICAL' | An automatically recoverable error occurred |
| 'EPTR_COVER_OPEN' | A cover open error occurred |
| 'EPTR_CUTTER' | An autocutter error occurred |
| 'EPTR_MECHANICAL' | A mechanical error occurred |
| 'EPTR_REC_EMPTY' | No paper in roll paper end sensor |
| 'EPTR_UNRECOVERABLE' | An unrecoverable error occurred |
| 'SchemaError' | The request document contains a syntax error |
| 'DeviceNotFound' | The printer with the specified device ID does not exist |
| 'PrintSystemError' | An error occurred on the printing system |
| 'EX_BADPORT' | An error was detected on the communication port |
| 'EX_TIMEOUT' | A print timeout occurred |

Fig. 127

| Constant (status) | Description |
|---|---|
| ASB_NO_RESPONSE | No response from the TM printer |
| ASB_PRINT_SUCCESS | Printing is successfully completed |
| ASB_DRAWER_KICK | Status of the 3rd pin of the drawer kick-out connector = "H" |
| ASB_OFF_LINE | Offline |
| ASB_COVER_OPEN | The cover is open |
| ASB_PAPER_FEED | Paper is being fed by a paper feed switch operation |
| ASB_WAIT_ON_LINE | Waiting to be brought back online |
| ASB_PANEL_SWITCH | The paper feed switch is being pressed (ON) |
| ASB_MECHANICAL_ERR | A mechanical error occurred |
| ASB_AUTOCUTTER_ERR | An autocutter error occurred |
| ASB_UNRECOVER_ERR | An unrecoverable error occurred |
| ASB_AUTORECOVER_ERR | An automatically recoverable error occurred |
| ASB_RECEIPT_NEAR_END | No paper in roll paper near end sensor |
| ASB_RECEIPT_END | No paper in roll paper end sensor |
| ASB_BUZZER | A buzzer is on (only for applicable devices) |
| ASB_SPOOLER_IS_STOPPED | The spooler has stopped |

Fig. 128

```
<script type="text/javascript" src="epos-print-2.x.x.js"></script>
<script type="text/javascript">
<!--
function printHellowWorld() { var builder = new epson.ePOSBuilder();
builder.addText('Hello, World!\n');
builder.addCut();
var request = builder.toString();

var address = 'http://192.168.192.168/cgi-bin/epos/service.cgi?devid=local_printer';
var epos = new epson.ePOSPrint(address);
epos.onreceive = function (res) {
  var success = res.success;
  var code = res.code;
  var status = res.status;
  alert(success);
}
epos.send(request);
}
//-->
</script>
```

Fig. 129

| Property | Name | Object type |
|---|---|---|
| status | HTTP Status | Number |
| responseText | Response text | String |

Fig. 130

```
<script type="text/javascript" src="epos-print-2.x.x.js"></script>
<script type="text/javascript">
<!--
function printHelloWorld() { var builder = new epson.ePOSBuilder();
builder.addText('Hello, World!\n');
builder.addCut();
var request = builder.toString();

var address = 'http://192.168.192.168/cgi-bin/epos/service.cgi?devid=local_printer';
var epos = new epson.ePOSPrint(address);
epos.onerror = function (err) {
  var status = err.status;
  var text = err.responseText;
  alert(status);
}
epos.send(request);
}
//-->
</script>
```

Fig. 131

```
<script type="text/javascript" src="epos-print-2.x.x.js"></script>
<script type="text/javascript">
<!--
  var address = 'http://192.168.192.168/cgi-bin/epos/service.cgi?devid=local_printer';
  var epos = new epson.ePOSPrint(address);
  epos.onstatuschange = function (status) {
    alert(status);
  };
  epos.open();
//-->
</script>
```

Fig. 132

```
<script type="text/javascript" src="epos-print-2.x.x.js"></script>
<script type="text/javascript">
<!--
  var address = 'http://192.168.192.168/cgi-bin/epos/service.cgi?devid=local_printer';
  var epos = new epson.ePOSPrint(address);
  epos.ononline = function () {
    alert('online');
  };
  epos.open();
//-->
</script>
```

Fig. 133

```
<script type="text/javascript" src="epos-print-2.x.x.js"></script>
<script type="text/javascript">
<!--
  var address = 'http://192.168.192.168/cgi-bin/epos/service.cgi?devid=local_printer';
  var epos = new epson.ePOSPrint(address);
  epos.onoffline = function () {
    alert('offline');
  };
  epos.open();
//-->
</script>
```

Fig. 134

```
<script type="text/javascript" src="epos-print-2.x.x.js"></script>
<script type="text/javascript">
<!--
  var address = 'http://192.168.192.168/cgi-bin/epos/service.cgi?devid=local_printer';
  var epos = new epson.ePOSPrint(address);
  epos.onpoweroff = function () {
    alert('poweroff');
  };
  epos.open();
//-->
</script>
```

Fig. 135

```
<script type="text/javascript" src="epos-print-2.x.x.js"></script>
<script type="text/javascript">
<!--
  var address = 'http://192.168.192.168/cgi-bin/epos/service.cgi?devid=local_printer';
  var epos = new epson.ePOSPrint(address);
  epos.oncoverok = function () {
    alert('coverok');
  };
  epos.open();
//-->
</script>
```

Fig. 136

```
<script type="text/javascript" src="epos-print-2.x.x.js"></script>
<script type="text/javascript">
<!--
  var address = 'http://192.168.192.168/cgi-bin/epos/service.cgi?devid=local_printer';
  var epos = new epson.ePOSPrint(address);
  epos.oncoveropen = function () {
    alert('coveropen');
  };
  epos.open();
//-->
</script>
```

Fig. 137

```
<script type="text/javascript" src="epos-print-2.x.x.js"></script>
<script type="text/javascript">
<!--
  var address = 'http://192.168.192.168/cgi-bin/epos/service.cgi?devid=local_printer';
  var epos = new epson.ePOSPrint(address);
  epos.onpaperok = function () {
    alert('paperok');
  };
  epos.open();
//-->
</script>
```

Fig. 138

```
<script type="text/javascript" src="epos-print-2.x.x.js"></script>
<script type="text/javascript">
<!--
  var address = 'http://192.168.192.168/cgi-bin/epos/service.cgi?devid=local_printer';
  var epos = new epson.ePOSPrint(address);
  epos.onpapernearend = function () {
    alert('papernearend');
  };
  epos.open();
//-->
</script>
```

Fig. 139

```
<script type="text/javascript" src="epos-print-2.x.x.js"></script>
<script type="text/javascript">
<!--
  var address = 'http://192.168.192.168/cgi-bin/epos/service.cgi?devid=local_printer';
  var epos = new epson.ePOSPrint(address);
  epos.onpaperend = function () {
    alert('paperend');
  };
  epos.open();
//-->
</script>
```

Fig. 140

```
<script type="text/javascript" src="epos-print-2.x.x.js"></script>
<script type="text/javascript">
<!--
  var address = 'http://192.168.192.168/cgi-bin/epos/service.cgi?devid=local_printer';
  var epos = new epson.ePOSPrint(address);
  epos.ondrawerclosed = function () {
    alert('drawerclosed');
  };
  epos.open();
//-->
</script>
```

Fig. 141

```
<script type="text/javascript" src="epos-print-2.x.x.js"></script>
<script type="text/javascript">
<!--
  var address = 'http://192.168.192.168/cgi-bin/epos/service.cgi?devid=local_printer';
  var epos = new epson.ePOSPrint(address);
  epos.ondraweropen = function () {
    alert('draweropen');
  };
  epos.open();
//-->
</script>
```

Fig. 142

```
<script type="text/javascript" src="epos-print-2.x.x.js"></script>
<script type="text/javascript">
<!--
function printCanvas() {
  var address = 'http://192.168.192.168/cgi-bin/epos/service.cgi?devid=local_printer';
  var epos = new epson.CanvasPrint(address);
}
//-->
</script>
```

Fig. 144

| Setting | Decription |
|---|---|
| true or 1 | Cuts the paper after printing |
| false or 0 | Does not cut the paper after printing |
| undefined | Does not cut the paper after printing |

Fig. 145

| Setting | Decription |
|---|---|
| MODE_MONO | Monochrome (two-tone) |
| MODE_GRAY16 | Multiple tones (16-tone) |
| undefined | Monochrome (two-tone) |

Fig. 146

```
<script type="text/javascript" src="epos-print-2.x.x.js"></script>
<script type="text/javascript">
<!--
function printCanvas() {
  var address = 'http://192.168.192.168/cgi-bin/epos/service.cgi?devid=local_printer';
  var canvas = document.getElementById('myCanvas');

var epos = new epson.CanvasPrint(address);
  epos.onreceive = function (res) { alert(res.success); };
  epos.onerror = function (err) { alert(err.status); };
  epos.print(canvas);
}
//-->
</script>
```

Fig. 147

| Element | | API | Description |
|---|---|---|---|
| Constructor | | | |
| | CanvasPrint | | Initializes an ePOS-Print Canvas API object. |
| method | | | |
| | print | | Prints an HTML5 Canvas image. |
| | open | | Enables status event operation (in Ver. 1.2 and later) |
| | close | | Disables status event operation (in Ver. 1.2 and later) |
| Property | | | |
| | address | | URL of the printer (in Ver. 1.2 and later) |
| | enabled | | Enabling/disabling of status event (in Ver. 1.2 and later) |
| | interval | | Printer status update interval (in Ver. 1.2 and later) |
| | status | | Status (in Ver. 1.2 and later) |
| | halftone | | Raster image halftone processing method (in Ver. 1.2 and later) |
| | brightness | | Raster image brightness correction value (in Ver. 1.2 and later) |
| Event | | | |
| | onreceive | | Response message receipt event |
| | onerror | | Communication error event |
| | onstatuschange | | Status change event (in Ver. 1.2 and later) |
| | ononline | | Online event (in Ver. 1.2 and later) |
| | onoffline | | Offline event (in Ver. 1.2 and later) |
| | onpoweroff | | Non-response event (in Ver. 1.2 and later) |
| | oncoverok | | Cover close event (in Ver. 1.2 and later) |
| | oncoveropen | | Cover open event (in Ver. 1.2 and later) |
| | onpaperok | | Paper remaining event (in Ver. 1.2 and later) |
| | onpapernearend | | Paper near end event (in Ver. 1.2 and later) |
| | onpaperend | | Paper end event (in Ver. 1.2 and later) |
| | ondrawerclosed | | Drawer close event (in Ver. 1.2 and later) |
| | ondraweropen | | Drawer open event (in Ver. 1.2 and later) |
| Constant | | | |
| | ASB_* | | Response document status |
| | HALFTONE_* | | Halftone type |
| | MODE_* | | Color mode |

Fig. 143

```
<script type="text/javascript" src="epos-print-2.x.x.js"></script>
<script type="text/javascript">
<!--
var address = 'http://192.168.192.168/cgi-bin/epos/service.cgi?devid=local_printer';
var epos = new epson.CanvasPrint(address);
  epos.oncoveropen = function () {
    alert('coveropen');
  };

function startMonitor() {
  epos.open();
} function stopMonitor() {
  epos.close();
}
//-->
</script>
```

Fig. 148

```
<script type="text/javascript" src="epos-print-2.x.x.js"></script>
<script type="text/javascript">
<!--
var address = 'http://192.168.192.168/cgi-bin/epos/service.cgi?devid=local_printer';
var epos = new epson.CanvasPrint(address);
  epos.oncoveropen = function () {
    alert('coveropen');
  };

function startMonitor() {
  epos.open();
} function stopMonitor() {
  epos.close();
}
//-->
</script>
```

Fig. 149

```
<script type="text/javascript" src="epos-print-2.x.x.js"></script>
<script type="text/javascript">
<!--
  var epos = new epson.CanvasPrint();
  epos.address = 'http://192.168.192.168/cgi-bin/epos/service.cgi?devid=local_printer';
  epos.oncoveropen = function () { alert('coveropen'); };
  epos.open();
//-->
</script>
```

Fig. 150

```
<script type="text/javascript" src="epos-print-2.x.x.js"></script>
<script type="text/javascript">
<!--
  var address = 'http://192.168.192.168/cgi-bin/epos/service.cgi?devid=local_printer';
  var epos = new epson.CanvasPrint(address);
  epos.oncoveropen = function () { alert('coveropen'); };
  epos.open();
  alert(epos.enabled);
//-->
</script>
```

Fig. 151

```
<script type="text/javascript" src="epos-print-2.x.x.js"></script>
<script type="text/javascript">
<!--
   var address = 'http://192.168.192.168/cgi-bin/epos/service.cgi?devid=local_printer';
   var epos = new epson.CanvasPrint(address);
   epos.interval = 1000;
   epos.oncoveropen = function () { alert('coveropen'); };
   epos.open();
//-->
</script>
```

Fig. 152

```
<script type="text/javascript" src="epos-print-2.x.x.js"></script>
<script type="text/javascript">
<!--
   var address = 'http://192.168.192.168/cgi-bin/epos/service.cgi?devid=local_printer';
   var epos = new epson.CanvasPrint(address);
   epos.onoffline = function () {
      alert(epos.status);
   };
   epos.open();
//-->
</script>
```

Fig. 153

| Constant | Description |
|---|---|
| HALFTONE_DITHER | Dithering, suitable for printing graphics only. |
| HALFTONE_ERROR_DIFFUSION | Error diffusion, suitable for printing text and graphics together. |
| HALFTONE_THRESHOLD | Threshold, suitable for printing text only. |

Fig. 154

```
<script type="text/javascript" src="epos-print-2.x.x.js"></script>
<script type="text/javascript">
<!--
   var address = 'http://192.168.192.168/cgi-bin/epos/service.cgi?devid=local_printer';
   var canvas = document.getElementById('myCanvas');

var epos = new epson.CanvasPrint(address);
   epos.halftone = epos.HALFTONE_ERROR_DIFFUSION;
   epos.print(canvas);
//-->
</script>
```

Fig. 155

```
<script type="text/javascript" src="epos-print-2.x.x.js"></script>
<script type="text/javascript">
<!--
   var address = 'http://192.168.192.168/cgi-bin/epos/service.cgi?devid=local_printer';
   var canvas = document.getElementById('myCanvas');

var epos = new epson.CanvasPrint(address);
   epos.halftone = epos.HALFTONE_ERROR_DIFFUSION;
   epos.print(canvas);
//-->
</script>
```

Fig. 156

| Parameter | Name | Object type |
|---|---|---|
| success | Print result | Boolean |
| code | Error code | String |
| status | Status | Number |

Fig. 157

| Value | Decription |
|---|---|
| true or 1 | Printing succeeded. |
| false or 0 | Printing failed. |

Fig. 158

| Value | Decription |
|---|---|
| 'EPTR_AUTOMATICAL' | An automatically recoverable error occurred |
| 'EPTR_COVER_OPEN' | A cover open error occurred |
| 'EPTR_CUTTER' | An autocutter error occurred |
| 'EPTR_MECHANICAL' | A mechanical error occurred |
| 'EPTR_REC_EMPTY' | No paper in roll paper end sensor |
| 'EPTR_UNRECOVERABLE' | An unrecoverable error occurred |
| 'SchemaError' | The request document contains a syntax error |
| 'DeviceNotFound' | The printer with the specified device ID does not exist |
| 'PrintSystemError' | An error occurred on the printing system |
| 'EX_BADPORT' | An error was detected on the communication port |
| 'EX_TIMEOUT' | A print timeout occurred |

Fig. 159

| Constant (status) | Description |
|---|---|
| ASB_NO_RESPONSE | No response from the TM printer |
| ASB_PRINT_SUCCESS | Printing is successfully completed |
| ASB_DRAWER_KICK | Status of the 3rd pin of the drawer kick-out connector = "H" |
| ASB_OFF_LINE | Offline |
| ASB_COVER_OPEN | The cover is open |
| ASB_PAPER_FEED | Paper is being fed by a paper feed switch operation |
| ASB_WAIT_ON_LINE | Waiting to be brought back online |
| ASB_PANEL_SWITCH | The paper feed switch is being pressed (ON) |
| ASB_MECHANICAL_ERR | A mechanical error occurred |
| ASB_AUTOCUTTER_ERR | An autocutter error occurred |
| ASB_UNRECOVER_ERR | An unrecoverable error occurred |
| ASB_AUTORECOVER_ERR | An automatically recoverable error occurred |
| ASB_RECEIPT_NEAR_END | No paper in roll paper near end sensor |
| ASB_RECEIPT_END | No paper in roll paper end sensor |
| ASB_BUZZER | A buzzer is on (only for applicable devices) |
| ASB_SPOOLER_IS_STOPPED | The spooler has stopped |

Fig. 160

```
<script type="text/javascript" src="epos-print-2.x.x.js"></script>
<script type="text/javascript">
<!--
function printCanvas() {
  var address = 'http://192.168.192.168/cgi-bin/epos/service.cgi?devid=local_printer';
  var canvas = document.getElementById('myCanvas');

var epos = new epson.CanvasPrint(address);
  epos.onreceive = function (res) {
    var success = res.success;
    var code = res.code;
    var status = res.status;
    alert(success);
  };
  epos.print(canvas);
}
//-->
</script>
```

Fig. 161

| property | Name | Object type |
|---|---|---|
| status | HTTP status | Number |
| responseText | Responce text | String |

Fig. 162

```
<script type="text/javascript" src="epos-print-2.x.x.js"></script>
<script type="text/javascript">
<!--
function printCanvas() {
var address = 'http://192.168.192.168/cgi-bin/epos/service.cgi?devid=local_printer';
var canvas = document.getElementById('myCanvas');

var epos = new epson.CanvasPrint(address);
epos.onerror = function (err) {
  var status = err.status;
  var text = err.responseText;
  alert(status);
};
epos.print(canvas);
}
//-->
</script>
```

Fig. 163

```
<script type="text/javascript" src="epos-print-2.x.x.js"></script>
<script type="text/javascript">
<!--
  var address = 'http://192.168.192.168/cgi-bin/epos/service.cgi?devid=local_printer';
  var epos = new epson.CanvasPrint(address);
  epos.onstatuschange = function (status) {
    alert(status);
  };
  epos.open();
//-->
</script>
```

Fig. 164

```
<script type="text/javascript" src="epos-print-2.x.x.js"></script>
<script type="text/javascript">
<!--
  var address = 'http://192.168.192.168/cgi-bin/epos/service.cgi?devid=local_printer';
  var epos = new epson.CanvasPrint(address);
  epos.ononline = function () {
    alert('online');
  };
  epos.open();
//-->
</script>
```

Fig. 165

```
<script type="text/javascript" src="epos-print-2.x.x.js"></script>
<script type="text/javascript">
<!--
  var address = 'http://192.168.192.168/cgi-bin/epos/service.cgi?devid=local_printer';
  var epos = new epson.CanvasPrint(address);
  epos.onoffline = function () {
    alert('offline');
  };
  epos.open();
//-->
</script>
```

Fig. 166

```
<script type="text/javascript" src="epos-print-2.x.x.js"></script>
<script type="text/javascript">
<!--
  var address = 'http://192.168.192.168/cgi-bin/epos/service.cgi?devid=local_printer';
  var epos = new epson.CanvasPrint(address);
  epos.onpoweroff = function () {
    alert('poweroff');
  };
  epos.open();
//-->
</script>
```

Fig. 167

```
<script type="text/javascript" src="epos-print-2.x.x.js"></script>
<script type="text/javascript">
<!--
  var address = 'http://192.168.192.168/cgi-bin/epos/service.cgi?devid=local_printer';
  var epos = new epson.CanvasPrint(address);
  epos.oncoverok = function () {
    alert('coverok');
  };
  epos.open();
//-->
</script>
```

Fig. 168

```
<script type="text/javascript" src="epos-print-2.x.x.js"></script>
<script type="text/javascript">
<!--
  var address = 'http://192.168.192.168/cgi-bin/epos/service.cgi?devid=local_printer';
  var epos = new epson.CanvasPrint(address);
  epos.oncoveropen = function () {
    alert('coveropen');
  };
  epos.open();
//-->
</script>
```

Fig. 169

```
<script type="text/javascript" src="epos-print-2.x.x.js"></script>
<script type="text/javascript">
<!--
  var address = 'http://192.168.192.168/cgi-bin/epos/service.cgi?devid=local_printer';
  var epos = new epson.CanvasPrint(address);
  epos.onpaperok = function () {
    alert('paperok');
  };
  epos.open();
//-->
</script>
```

Fig. 170

```
<script type="text/javascript" src="epos-print-2.x.x.js"></script>
<script type="text/javascript">
<!--
  var address = 'http://192.168.192.168/cgi-bin/epos/service.cgi?devid=local_printer';
  var epos = new epson.CanvasPrint(address);
  epos.onpapernearend = function () {
    alert('papernearend');
  };
  epos.open();
//-->
</script>
```

Fig. 171

```
<script type="text/javascript" src="epos-print-2.x.x.js"></script>
<script type="text/javascript">
<!--
  var address = 'http://192.168.192.168/cgi-bin/epos/service.cgi?devid=local_printer';
  var epos = new epson.CanvasPrint(address);
  epos.onpaperend = function () {
    alert('paperend');
  };
  epos.open();
//-->
</script>
```

Fig. 172

```
<script type="text/javascript" src="epos-print-2.x.x.js"></script>
<script type="text/javascript">
<!--
  var address = 'http://192.168.192.168/cgi-bin/epos/service.cgi?devid=local_printer';
  var epos = new epson.CanvasPrint(address);
  epos.ondrawerclosed = function () {
    alert('drawerclosed');
  };
  epos.open();
//-->
</script>
```

Fig. 173a

```
<script type="text/javascript" src="epos-print-2.x.x.js"></script>
<script type="text/javascript">
<!--
  var address = 'http://192.168.192.168/cgi-bin/epos/service.cgi?devid=local_printer';
  var epos = new epson.CanvasPrint(address);
  epos.ondraweropen = function () {
    alert('draweropen');
  };
  epos.open();
//-->
</script>
```

Fig. 173b

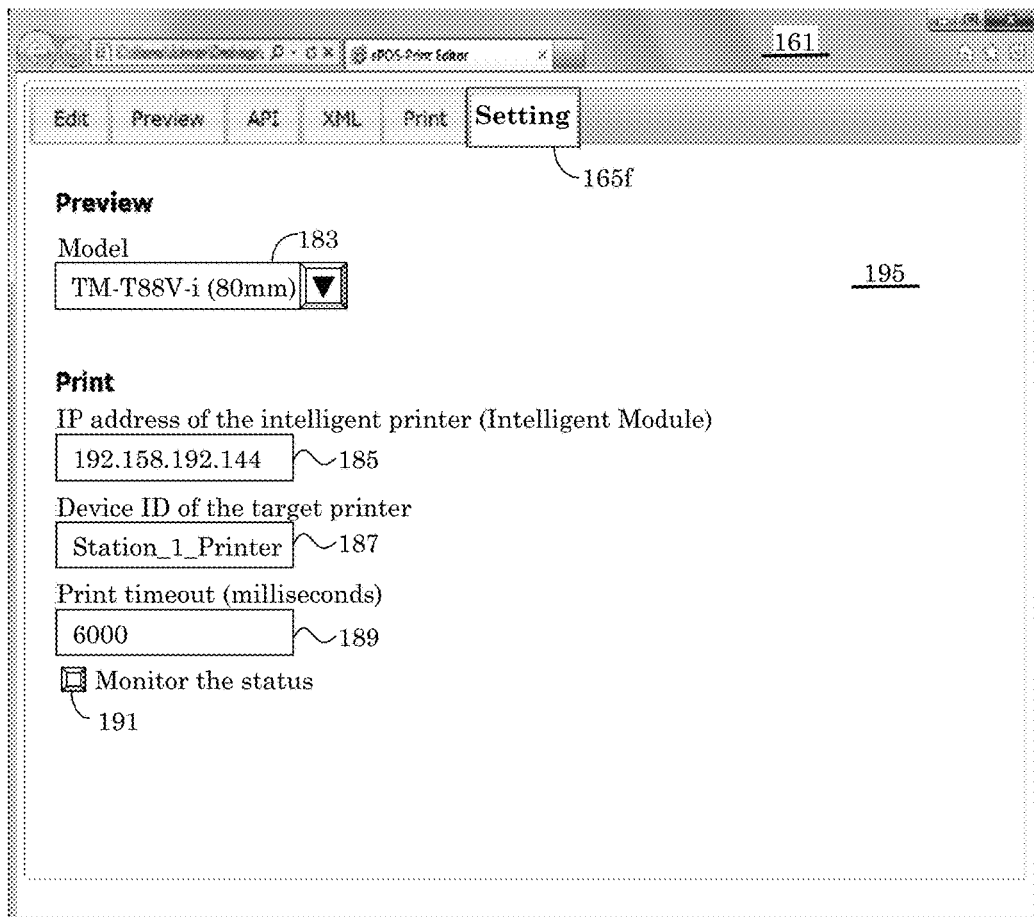

Fig. 175

| Item | Description |
|---|---|
| Model | Specify the model of the printer to be used for printing. The Preview screen resizes according to the paper width set to the model. |
| IP address of the intelligent printer | Specify the IP address of the printer. Be sure to specify this item. |
| Device ID of the target printer | Specify the device ID of the printer. Be sure to specify this item. |
| Print timeout (milliseconds) | Specify the print timeout time in milliseconds. The maximum value is 60000 (60 seconds). |
| Monitor the status | When this checkbox is checked, the printer's status is monitored. |

Fig. 176

TERMINAL AND METHOD TO ACCESS AN INTELLIGENT MODULE ADAPTED TO CONNECT TO A PRINTER, AND TO ACCESS A WEB SERVER IN WHICH A WEB APPLICATION IS MAINTAINED

CROSS-REFERENCE TO RELATED APPLICATION(S)

This application is a continuation of, and claims priority under 35 U.S.C. § 120 on U.S. application Ser. No. 14/734, 671, filed on Jun. 9, 2015, which is a continuation of U.S. application Ser. No. 13/955,344, filed on Jul. 31, 2013, now U.S. Pat. No. 9,098,226. This application also claims the benefit of priority under 35 U.S.C. § 119(e) on Provisional Patent Application No. 61/683,009, filed Aug. 14, 2012. The content of each such related application is incorporated by reference herein in its entirety.

BACKGROUND

Field of Invention

The present invention relates to printing over a TCP/IP network. More specifically, it relates to printing in a point-of-sale (POS) network.

Description of Related Art

Network printing refers to the sharing of printing resources on a computer network. An early application of network printing is the print server, or printer server, as illustrated in FIG. 1. A printer server 11 is a device that connects a client computer 13a with a printer 15a on a common computer network 17. That is, client computer 13a sends a print job to printer server 11; printer server 11 receives and holds (i.e., spools) the print job; and when printer 15a becomes available, printer server 11 sends the held print job to printer 15a for printing. It is to be understood that printer sever 11 may manage multiple print jobs from multiple client computers 13a through 13n among multiple printers 15a through 15i, and that the computer network may including both wired and wireless communication links. Individual printers 15a through 15i may be local printers and/or network printers, and may be connected directly to print server 11 via a direct cable connection (such as a by a parallel cable, USB cable, proprietary cable, etc.) or by a wired network connection (IEEE 802.11 on standardized network category cable (i.e., CAT 5, 5e, 6), etc.) or by a wireless network connection (IEEE 802.11 a/b/g/n, etc.) or by another known wireless communication link (Bluetooth, HomeRF, HyperLan, etc.)

Printer server 11 is responsible for queuing (i.e., spooling) print jobs while it waits for a target printer to become available. It may also be responsible for re-ordering or deleting print jobs in its queue, keeping track of printer activity (such as the number of pages printed, the time of printing, etc.). As a result, printer server 11 generally supports multiple industry standards and/or proprietary printing protocols, and thus may also include printer drivers for each printer under its management. Although printer servers are well suited for private networks, as the industry has moved toward using the prolific internet protocol TCP/IP for both public and private networks, it has become desirable to incorporate printing capabilities in public networks through internet interfaces.

The "web browser" is a popular internet interface (commonly used on the Worldwide Web, i.e., WWW or Internet), which displays "web pages" based on the HyperText Markup Language (HTML). A markup language is a text-based language system that uses "tags" to provide machine-executable instructions in a textual format that is legible by a human reader. For example, tags may instruct the web browser about how to format information for display on a web page (i.e., how to display the web page information on a display screen), or to specify a desired executable function.

As the Internet grew, it became desirable to provide more functionality than was available on early versions of HTML. To address this need, the Java language was adapted to provide fully contained machine code that could be embedded within an HTML web page. These small applications became known as applets. Java is a full-feature, object oriented programming (i.e., OOP) language used in many applications, such as in control applications for small devices and appliances.

Companies that created Java applications to control their devices wanted to ease adoption of their devices by third-party manufactures without releasing proprietary information regarding the control programs of their devices. This was achieved by the use of application program interface (API) libraries that provided simplified interfaces to their control applications, and thereby simplified the adoption of their control programs by third-party manufacturers. Basically, an API is a set of common code pieces with specified input and output requirements, such as are found in objects or classes in OOP languages, and which provide an interface to a coded application. In this manner, a user does not need to re-code a specific software tool or even to know how the software tool is coded. The user merely needs to know how to invoke the software tool, pass it any specified parameters, let it execute the desired function, and receive any specified output. Although Java made web pages more dynamic, Java applications (and applets) are compiled programs that are provided in machine code, not script, and are therefore not readily legible by a human user. Thus, the use of applets reduced the readability of HTML code.

JavaScript, which provides some of the dynamic capabilities of Java in a script-language form, addresses this issue. Since JavaScript is a script language, HTML can execute JavaScript code without the JavaScript code being pre-processed (i.e., compiled), and thus it remains in a script (i.e., textual) form. Like Java applets, JavaScript may be embedded within an HTML web page, and the web browser will execute it when the HTML web page is downloaded or in response to a triggering event. JavaScript permits a web page to dynamically modify its content or add content to a current web page or send content from that web page. JavaScript, and other script languages, permit web pages to become more interactive by providing a bridge between the web browser and the operating system on which the web browser is running. This permits a web page to incorporate information from the user's local device environment, such the device's location and other user information that the web browser and/or operating system deem safe to provide to the web page.

With the adoption of JavaScript, software developers began providing complete script applications designed to execute specific tasks. When these script applications are packaged as a unit for insertion into a web page, they are sometimes termed "widgets". Since each widget is as a complete script code, it may have a set of expected inputs and a list of possible outputs, in a manner similar to how inputs and outputs are used in Java applets. As a result, APIs have also been developed for script codes. For example, a company may produce a library of script codes to operate with a specific device and provide a list of API's that facilitate the integration of their script codes into a third party developer's code. Thus, the third party developer does not need to understand how the company's device works or know how to program it; the third party developer can quickly insert control of the company's device by using their provided API's and/or widgets (i.e., script codes).

This leads to the topic of printing from a web browser, i.e., HTML printing. Most web browsers provide a print function on their toolbar (i.e., a visual list of selectable "software-buttons" for invoking different tasks), and when a user selects this print function, the web browser accesses the local device's printer through the print APIs of the local device's operating system. That is, the web browser does not know what type of printing capabilities are available to the device on which it is running, if any, and the operating system does not share this information with the web browser for security reasons. Thus, in order for the web browser to print, it must pass this function request to the operating system, which it may do by calling up the operating system's print interface.

Consequently, printing from a webpage requires going through a printer dialogue box, as is illustrated in FIG. 2. The printer dialogue box 19 provides printer information and provides options for a user to select from to format the printed document. These options are determined from the printer's capabilities, which are in turn provided by the printer driver. For example, printer dialogue box 19 may provide a printer-select option 21 to select among multiple available printers. Boxes 21a through 21c may provide information about the selected printer, such as its status, type and location, respectively. Other options may include a choice of printing in black-and-white or color, as indicated by selection button 23. A user may also enter a range of pages to be printed, and/or select a paper type or paper orientation, as indicated by selection buttons 25 and 27.

Some web browsers may provide a quick-print option wherein a currently displayed web page is sent for printing without the use of a printer dialogue box by instead sending the printing request to a default printer and accepting all the printer's default settings. This request is sent to the local operating system's print API, and if it supports quick printing and it has default print and its default settings assigned, then it will accept the webpage for printing. Unfortunately, the entire web page is sent for printing. Thus, web page developers have no control over how, or what part of, a web page is printed, or what material, in general, is printed. The web page developers also do not know what printers are available or their print-capabilities, nor do the web developers know what the individual printer's default settings might be. To summarize, the web browser goes through the local device's operating system (OS), and assumes that on the local OS will access the appropriate printer driver.

The XML printer has been developed to reduce the reliability on printer drivers, and to have more control over the formatting of printed documents. The XML printer is not limited to web pages, and can serve as a local virtual printer. That is, it responds to a print request as if it were a physical printer, but instead of producing a physical printed document, it produces a script-language description of how the printed document should look. This is similar to how the HTML script language is used to define the look and format of a web page on a display screen. This script-language description can then be sent to a physical printer that supports XML printing to produce a physical print-out. XML printers are typically used to maintain consistency of printing across different platforms and document formats. For example, an XML print document file would assure that a document prepared in Microsoft Word™ would print the same as the same document prepared in Adobe Acrobat™.

Thus, if one has an XML print document file and a printer (or printer driver) capable of reading XML print document files, one may send the XML print document file to the printer without need of printer driver requirements. The printer (or its printer driver) would read the scripted description of how the document should look, and generate its own print image for printing. Although the XML printer reduces the reliance on printer drivers, and thus facilitates printing on a network, it does not provide any additional printing control to the web page developer. That is, the web page developer still cannot control printing from within a script application, or widget, but instead relies on the web browser as a print interface.

JavaScript does not provide any assistance in this matter. Although the web browser may interface with the local operating system to access the local printer's API or call upon an XML printer to create an XML print document, for security reasons the web browser does not share this information with its Java scripts. That is, the job of the JavaScript is traditionally to define information on a web page and to provide dynamic functionality; it is not the Java script's job to print documents. It is the web browser's job to control the print function, and thus it does not share this control with internal script applications. As a result, heretofore a JavaScript application cannot directly control a printer. It must instead request that the web browser make a print request, which in turn relays the request to the local OS, which then calls up the print dialogue box to setup a local/network printer (real or virtual).

In spite of these difficulties, strides have been made toward providing web-printing, i.e., printing over the Internet. For example, the Internet Printing Protocol (IPP) provides a standard network protocol for remote printing over the internet, which removes the need for individual print drivers on each user's machine. IPP provides control over various printing needs, such as managing print jobs, media size, resolution, etc, and is intended to provide users with similar methods and operations as if the printer were local. Basically, IPP is a collection of open standards that define a network printing protocol, and if a printer vendor has adopted this standard, then IPP allows a user to interact with that vendor's printer in real-time in order to find out about the printer's capabilities, inquire about the status of a print job or cancel a print job that has been submitted. As in the case of a local printer, this dialogue would be through a printer dialogue box.

Another approach toward providing internet printing is known as Google Cloud Printing™, or GCP. This is a service provided by Google™ Corp., and it basically permits developers to incorporate printing capabilities into their web pages and services by sending print requests to Google Corp, letting Google Corp. prepare print jobs (limited to PDF print jobs) and forward them to a user's pre-registered printer. Google™ Corp. provides an API to permit developers to quickly insert the required code, and it uses a standard printing dialogue box to create and submit PDF print jobs. As it would be understood, this means that Google has access to all documents to be printed, which raises questions of security and privacy for users. It is further note that another limitation of this service is that it requires that the document-to-be-printed already be on the web, and not just on the user's computer. Thus, the service cannot be used to print locally generated documents that are not on the web.

What is needed is a way to increase a user's control over printing from within a web browser.

It is further preferred that developer have direct access to, and control over, a printer directly through a script application, such as a JavaScript widget, without having to send a print request to a local web browser.

It also desired that a script application within web page be able to directly generate and format the information to be printed, and to send the information directly to a printer without necessitating a print dialogue box, or being limited by the content within the web page.

It is further desired that a user have direct web printing capabilities without depending upon any third party entity to manage print jobs.

SUMMARY OF INVENTION

The above objects are met in a method for creating a document in a web application, and sending the document to a printer through network, the web application executed by a web browser, the method comprising steps of: providing an intelligent module adapted to connect to the printer, the intelligent module configured to be set an address, to receive the document, and to send the document to the printer; embedding an application program interface (API) in the web application, the API providing an address property element configured to designate the address of the intelligent module, a first method element configured to add commands for controlling the printer into a command buffer and creating the document by accumulating the commands in the command buffer, and a second method element configured to send the document to the intelligent module; creating the document by means of the first method element embedded in the web application; sending the document, by means of the second method element embedded in the web application, to the intelligent module having the address designated by the address property element; and sending the document from the intelligent module to the printer.

Preferably, the web application is placed in the intelligent module or a web server, and the intelligent module is an electronic device.

The method may further comprise a step of printing the document on a paper in the printer. One of the commands may be a text command for adding text for printing to the command buffer. Additionally, one of the commands may be a text setting command for adding a parameter for setting a property of the text, to the command buffer. The text setting command may include a first text setting parameter specifying at least one of a start position, an alignment, a language, a font, a style, a scale, or a size of the text. The text command may also include a second text setting parameter specifying whether to rotate the text, or whether to enable smoothing the text.

One of the commands may also be a paper feed command for adding an instruction of feeding the paper in the printer, to the command buffer.

Additionally, one of the commands may be an image command for adding a raster image for printing, to the command buffer.

Preferably, the API includes a halftone property element, and the image command converts a color image rendered in the web application into the raster image data for printing according to a setting of the halftone property element. The halftone property element may specify either one of a dithering, an error diffusion, and a threshold for converting the color image into the raster image data.

Further preferably, the API includes a brightness property element, and the image command converts the color image into the raster image data for printing according to a setting of the brightness property element. The brightness property element may, for example, specify a gamma value in the range 0.1-10 for correcting the brightness of the raster image data.

In a preferred embodiment, the printer includes a non-volatile, i.e., NV, memory for registering a logo identifiable by key code, and wherein the command includes a logo command for adding a key code to the command buffer for printing the logo, the added key code specifying (i.e., identifying) the logo registered in the NV memory.

One of the commands may also be a barcode command for adding an instruction of printing a barcode, to the command buffer, said barcode command including a barcode parameter, the barcode parameter specifying at least one of a type of the barcode, width and height of the barcode, and/or data to be converted to the barcode.

Additionally, one of the commands may also a symbol command for adding an instruction of printing a two-dimensional symbol, to the command buffer, said symbol command including a symbol parameter, the symbol parameter specifying at least one of a type of the two-dimensional symbol, an error correction level of the two-dimensional symbol, or data to be converted to the two-dimensional symbol.

The commands may also include a first line command for adding to the command buffer an instruction of drawing a first line in a first direction and a second line command for adding to the command buffer an instruction of drawing a second line in a second direction, the first line command including a first line parameter specifying a start position and an end position of the first line to define it as a line segment, and the second line command including a second line parameter specifying a start position of the second line and excluding any end position of the second line to define it as a continuous line. Preferably, another of the commands is a third line command for adding an instruction of finishing drawing the second line, which is started by the second line command, the third line command including a third line parameter, the third line parameter specifying an end position of the second line.

Further preferably, one of the commands is a page mode command for adding an instruction of switching to a page mode to the command buffer, said page mode being a print mode wherein a print area is defined, data is laid out in the print area, and the print area is printed in a batch operation, said page mode command further adding instructions for adding the print area to the command buffer including a coordinate specifying the print area. Preferably, one of the commands is a second page mode command for adding an instruction of ending the page mode to the command buffer. The commands may further include a third page command for adding a setting for the page mode, to the command buffer, the third page command including a third page parameter specifying a direction for the printing in the page mode, or a coordinate specifying a start position for the printing in the page mode. The commands may further include a forth page command for adding an instruction of drawing a line or a rectangle in the page mode, to the command buffer, the forth page command including coordinates specifying a start position and an end position of the line or the rectangle in the page mode. The forth page command may include a forth page parameter specifying a type of the line or of the rectangle.

Additionally, one of the commands may be a paper cut command for adding an instruction of cutting the paper, to the command buffer, said paper cut command including a paper cut parameter specifying either to cut the paper without feeding the paper or to cut the paper after feeding the paper.

Further preferably, a drawer connects to the printer, and one of the commands is a drawer kick command for adding an instruction of kicking the drawer open, to the command buffer. The drawer kick command preferably includes a first drawer parameter specifying an ON time duration of a signal that is applied to open the drawer. Preferably, the drawer is connected to the printer by two connectors, and the drawer kick command includes a second drawer parameter specifying either one of the connectors connecting the drawer and the printer.

Additionally, the printer may have a buzzer and one of the commands may be a buzzer command for adding an instruction of turning on the buzzer to the command buffer. The buzzer command may include a buzzer parameter specifying a pattern or a number of times that actuation of the buzzer is repeated.

The address property element may be configured to set a timeout period, and the method may preferably include a step of cancelling a print job for printing the document in the printer designated by the address property element in response to the elapse of the timeout period.

The address property element may further be configured to set a device identification of the printer for sending the document to the printer. The API may further include a receive event element configured to obtain a response message including one of a print result, an error code and/or a printer status from the printer, the may method further include a step of receiving the response message from the printer that is connected to the intelligent module designated by the address property element. Preferably, the error code and/or the printer status indicates the occurrence of one of an automatically recoverable error and/or an unrecoverable error. Further preferably, the printer has a cover, and the error code and/or the printer status indicates when the cover is open. Also preferably, the printer has an auto cutter, and the error code and/or the printer status indicates when an error occurred in the auto cutter. The printer may also have a sensor detecting if paper is in the printer, and the error code and/or the printer status indicates when no paper is detected by the sensor. The error code and/or the printer status may also indicate if the document sent to the intelligent module contains a syntax error.

Preferably the error code and/or the printer status indicate if the printer with the device identification does not exist. If the printer has a communication port connected to the intelligent module, the error code and/or the printer status may indicate that if an error was detected on the communication port. Further preferably, the address property element is configured to set a timeout period for cancelling a print job for printing the document in the printer, and the error code and/or the printer status indicates if the timeout period elapses. The error code and/or the printer status may further indicate if printing is successfully completed. Assuming that the printer is adapted to connect to a drawer by a connector, the error code or the printer status may indicate the status of a predetermined pin of the connector. The error code or the printer status may also indicate if the printer is offline or waiting to be brought back online, or if no response was received from the printer. The printer may also have a switch for feeding paper. In this case, the error code and/or the printer status may indicate if the paper is being fed by operation of the switch. The printer may also have a buzzer, in which case the error code and/or the printer status may indicate if the buzzer is turned on. The printer or the intelligent module may have a spooler configured to spool a print job for printing the document, and the error code or the printer status may indicate if the spooler has stopped.

Preferably the API includes a constructor for initializing the API. In this case, the method may further include a step of initializing the API before the step of creating the document.

The objects may also be met in a method for creating a document in a web application, and sending the document to a printer through network, the web application executed by a web browser, the method comprising steps of: providing an intelligent module adapted to connect to the printer, the intelligent module configured to be set an address, to receive the document, and to send the document to the printer; embedding an application program interface (API) in the web application, the API providing a first object for creating the document, the object including a command buffer, a first method element for processing the first object element, the first method element configured to add commands of controlling the printer, into the command buffer, and creating the document by accumulating the commands in the buffer, a second object for sending the document, an address property element configured to designate the address of the intelligent module, and a second method element for processing the second object, the second method element configured to send the document in the buffer to the intelligent module; creating the document by the first method element embedded in the web application; sending the document by the second method element embedded in the web application, to the intelligent module having the address designated by the address property element; and sending the document from the intelligent module to the printer.

Preferably in this approach, the API includes a first constructor for initializing the first object, and a second constructor for initializing the second object, the method further comprising steps of: initializing the first object before the step of creating the document; and initializing the second object before the step of sending the document.

This method may further comprise a step of printing the document on a paper in the printer.

The API may also include a receive event element configured to obtain a response message including one of a print result, an error code or a printer status, from the printer, and the method may further comprise a step of: receiving the response message from the printer, which is connected to the intelligent module designated by the address property element, the second object being initialized before the step of receiving the response message.

The objects may also be met in a method for creating a document in a web application, and sending the document to a printer through a network, the web application executed by a web browser, the method comprising steps of: providing a printer configured to be set an address; embedding an application program interface (API) in the web application, the API providing: (i) an address property element configured to designate the address of the printer, (ii) a first method element configured to add commands for controlling the printer, into a command buffer, and creating the document by accumulating the commands in the buffer, and (iii) a second method element configured to send the document in the buffer to the intelligent module; creating the document by the first method element embedded in the web application; sending the document by the second method element embedded in the web application, to the printer having the address designated by the address property element; and printing the document.

The objects may also be met in a system for creating a document in a web application, and sending the document to a printer through network, the web application executed by a web browser, the system comprising: an intelligent module adapted to connect to the printer, the intelligent module configured to be set an address; a web server connected to the intelligent module through the network, the web application installed in the web server; an application program interface (API) embedded in the web application; the API including; (i) an address property element configured to designate the address of the intelligent module, (ii) a first method element configured to add commands, for controlling the printer, into a command buffer and creating the document by accumulating the commands in the buffer, and (iii) a second method element configured to send the document in the buffer to the intelligent module; wherein the document is created by the first method element and is sent by the second method element, to the intelligent module having the address designated by the address property element, and the intelligent module sends the document to the printer.

Preferably, a drawer is connected to the printer, and one of the commands is a drawer kick command for adding an instruction of kicking the drawer open, to the command buffer.

The printer may also have a buzzer, and one of the commands may be a buzzer command for adding an instruction of turning on of the buzzer to the command buffer.

The above objects are also met in a method for sending an image rendered in HTML5 Canvas, to a printer, and printing the image by the printer, the method comprising steps of: providing an intelligent module adapted to connect to the printer, the intelligent module configured to be set an address; embedding an application program interface (API) in a web application, the API providing: (i) a first property element configured to designate a conversion method for converting the rendered image into the raster image data, (ii) a second property element configured to designate the address of the intelligent module, and (iii) a method element configured to convert the image into the raster image data and send the converted raster image data to the intelligent module; converting the image into the raster image data by the method element, according to the conversion method designated by the first property element; sending the raster image data to the intelligent module by the method element, according to the address designated by the second property element; and sending the raster image data from the intelligent module to the printer.

The above objects may also be met in a method for creating or editing a document in an application, the document adapted to be sent to a printer through a network, the application adapted to be executed by a web browser, the method comprising steps of: providing commands of controlling the printer adapted to be added into a command buffer, and the document being created by accumulating the commands in the command buffer; displaying a setting screen enabled to set an address of the printer to an address property element; displaying an edit screen enabled to edit and/or create the document, the edit screen including icons, each of the icons corresponding to one of the commands of controlling the printer; displaying an input box enabled to input a parameter of the command on the edit screen, if a specified one of the icons, which corresponds to the command, is selected on the edit screen; adding to the command with the parameter, which is selected or input in the edit screen, to the command buffer.

Preferably, this method further includes a step of converting the document edited or created on the edit screen to XML language code, and displaying the code. The method may further include a step of converting a first portion of the document edited or created on the edit screen to a print preview, and displaying the print preview. Optionally, the method may also include a step of displaying a button for sending the document to the printer having the address designated by the address property element.

The above objects may further be met in a method for creating a document in a web application, sending the document to a printer, and obtaining a status of the printer through a network, the web application executed by a web browser, the method comprising steps of: providing an intelligent module (the intelligent module preferably being a physical electronic device) adapted to connect to the printer, the intelligent module configured to be set an address, to receive the document, and to send the document to the printer; embedding an application program interface (API) in the web application, the API including: (i) an address property element configured to designate the address of the intelligent module, (ii) a status event element configured to check one or more statuses of the printer, and (iii) an open method element configured to enable to operate the status event element; setting the address of the intelligent module to the address property element; and enabling to operate the status event element so as to receive a specified status of the printer.

Preferably the API includes a close method element configured to disable operation of the status event element, the method further comprising a step of disabling the status event element.

The API may also include an interval property element specifying a time interval for upgrading the status of the printer, the method further comprising a step of setting the time interval in the interval property element.

The API may further include a status property element specifying the status last obtained from the printer.

Additionally, the method may further include a step of setting a device identification of the printer, wherein the address property element is configured to designate the device identification of the printer for receiving the status of the printer specified by the device identification.

Optionally, the web application may be placed in the intelligent module or a web server.

The status of the printer may include a status indicating whether the printer is online or offline.

Additionally, the printer may have a cover, and the status of the printer may include a status indicating whether the cover is open or closed.

Preferably, the API further provides: (i) a first method element configured to add commands of controlling the printer, into a command buffer, and creating the document by accumulating the commands in the buffer, and (ii) a second method element configured to send the document in the buffer to the intelligent module. In this case, the method may further include the steps of: creating the document by the first method element embedded in the web application; sending the document by the second method element embedded in the web application, to the intelligent module having the address designated by the address property element; and sending the document from the intelligent module to the printer.

The method may also include a step of printing the document on a paper in the printer. In this case, the status of the printer may include a status indicating whether the paper supply in the printer is ended or nearly ended. Preferably, a drawer is connected to the printer, and one of the commands is a drawer kick command for adding an instruction of kicking the drawer open, to the command buffer. The status of the printer may include a status indicating whether the drawer is open or closed.

The above objects may also be met in a system for creating a document in a web application, sending the document to a printer, and obtaining a status of the printer through a network, the web application executed by a web browser, the system comprising of: an intelligent module adapted to connect to the printer, the intelligent module configured to be set an address; a web server connected to the intelligent module through a network, the web application installed in the web server; an application program interface (API) embedded in the web application, the API including: (i) an address property element configured to designate the address of the intelligent module, (ii) a status event element configured to check one or more statuses of the printer, and (iii) an open method element configured to enable operation of the status event element; wherein the status of the printer, designated by the status event element, is sent from the printer designated by the address property element, to the web browser, after the open method element enables operation of the status event element.

Preferably, the printer has a cover, and the status of the printer includes a status indicating whether the cover is open or closed.

Further preferably, the API further provides a first method element configured to add commands of controlling the printer into a command buffer, and creating the document by accumulating the commands in the buffer, and a second method element configured to send the document in the command buffer to the intelligent module, wherein the document is created by the first method element and is sent by the second method element, to the intelligent module having the address designated by the address.

Preferably, a drawer is connected to the printer, and one of the commands is a drawer kick command for adding an instruction of kicking the drawer open, to the command buffer.

The status of the printer may further include a status indicating whether the drawer is open or closed.

Objects of the present invention are also met in a method of controlling a terminal configured to access a printer and a web server in which a web application is maintained, the method includes steps of: acquiring the web application from the web server, the web application having an embedded application program interface (API), the API including: (i) an address property-element configured to designate a network address of the printer, (ii) an open method-element configured to enable a status event operation that checks a device status, (iii) an add-commands method-element configured to add commands into a command buffer for creating a document, and (iv) a send method-element configured to send the document to the printer over the network; wherein the terminal uses a status event notification function to check the printer without printing, including: setting the network address of the printer by use of the address property-element; enabling the status event operation by use of the open method-element; and obtaining a status event of the printer designated by the address property-element, after the open method-element enables the status event operation; and wherein the transmitting of the document for printing from the terminal to the printer, includes: creating the document by use of the add-commands method-element; and sending the created document by use of the send method-element to the printer having the network address designated by the address property-element.

In this method, wherein the printer has a cover; and the method further includes obtaining a status event indicating that the cover is open, after the open method-element enables a cover open event as the status event operation.

Assuming the printer has a cover, the method further includes obtaining a status event indicating that the cover is closed, after the open method-element enables a cover close event as the status event operation.

If a drawer is connected to the printer, the method further includes creating a kick open document for instructing the printer to kick open its connected drawer by adding a drawer kick command into the command buffer by use of the add-commands method-element; sending the kick open document to the printer by use of the send method-element; and obtaining a status event indicating that the drawer is open, after the open method-element enables a drawer open event as the status event operation.

Preferably method includes obtaining a status event indicating that the printer is powered off, after the open method-element enables a non-response event as the status event operation.

Optionally, the method may further include obtaining a status event indicating that one or more statuses of the printer have changed, after the open method-element enables a status change event as the status event operation.

It is preferred that the API further include a close method-element configured to disable the status event operation. In this case, the method may include disabling the status event operation by use of the close method-element.

If the API further includes an interval property-element specifying a time interval for spacing an upgrading of the status of the printer, then the method may further include setting the time interval for upgrading of the status of the printer by use of the interval property-element.

Preferably the API further includes a status property-element specifying the status last obtained from the printer.

Objects of the invention are also met in a non-transitory computer-readable medium encompassing computer-readable instructions executing the above method(s).

Objects of the present invention are also met in a terminal configured to access a printer and a web server in which a web application is maintained, the terminal including: an input device configured to receive input instructions from a user; an image display; a computing module that, in response to said input device, acquires the web application from the web server and displays a user interface of the web application on the image display, the web application having an embedded application program interface (API); the API including: (i) an address property-element configured to designate a network address of the printer, (ii) an open method-element configured to enable a status event operation that checks a device status, (iii) an add-commands method-element configured to add commands into a command buffer for creating a document, and (iv) a send method-element configured to send the document to the printer over the network; wherein the terminal uses a status event notification function to check the printer without printing by, setting the network address of the printer by use of the address property-element; enabling the status event operation by use of the open method-element; and obtaining a status event of the printer designated by the address property-element, after the open method-element enables the status event operation; and wherein the terminal transmits the document for printing to the printer by, creating the document by use of the add-commands method-element, and sending the created document by use of the send method-element to the printer having the network address designated by the address property-element.

Preferably the printer has a cover, and the computing module further obtains a status event indicating that the cover is open, after the open method-element enables a cover open event as the status event operation.

Again if the printer has a cover, it is preferred that the computing module further obtains a status event indicating that the cover is closed, after the open method-element enables a cover close event as the status event operation.

Preferably a drawer is connected to the printer. In this case, the computing module further: creates a kick-open document for instructing the printer to kick open its connected drawer by adding a drawer kick command into the command buffer by use of the add-commands method-element, sends the kick-open document to the printer by use of the send method-element, and obtains a status event indicating that the drawer is open, after the open method-element enables a drawer open event as the status event operation.

Optionally, the computing module obtains a status event indicating that the printer is powered off, after the open method-element enables a non-response event as the status event operation.

Further preferably, the computing module obtains a status event indicating one or more statuses of the printer are changed, after the open method-element enables a status change event as the status event operation.

In is preferred that the API further include a close method-element configured to disable the status event operation, and that the computing module disable the status event operation by use of the close method-element.

Additionally, the API further includes an interval property-element specifying a time interval for spacing an upgrading of the status of the printer; and the computing module sets the time interval for upgrading the status of the printer by use of the interval property-element.

Optionally, the API further includes a status property-element specifying the status last obtained from the printer.

Additionally, the computing module may display the status of the printer on the image display.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

FIG. 3 is a first embodiment in accord with the present invention.

FIG. 4 is a second embodiment in accord with the present invention.

FIG. 9 is an example of print flow in accord with an embodiment of the present invention.

FIG. 10 shows a system construction example in accord with the present invention.

FIG. 11 shows the registering of a web application into a TM intelligent printer.

FIG. 12 provides an example of a sample program screen created using the ePOS-Print API in accord with the present invention.

FIG. 21 shows examples of devices settings that may be configured.

FIG. 23 shows an example of using the HTML <script> tag to embed an ePOS-Print API.

FIG. 24 shows an example a program code segment for creating a print document.

FIG. 25 illustrates an example of script code for creating a text print document.

FIG. 26 provides sample script code creating a graphic print document.

FIG. 27 illustrates sample code for creating a page mode print document.

FIG. 28 provides sample code for transmission of a print document.

FIG. 29 provides a table with details about the printer end point address.

FIG. 30 provides sample code for implementing a callback function.

FIG. 31 provides an example of an error handling method for a callback function.

FIG. 34 shows sample code for embedding an ePOS-Print-Canvas API.

FIG. 35 provides sample code for rendering in HTML5-Canvas.

FIG. 36 provides sample code for transmitting a print document for printing.

FIG. 37 shows sample code for printing a result receipt and callback function.

FIG. 38 provides sample code for error handling by a callback function.

FIG. 39 provides sample code for using the status event notification function to check the printer status without printing.

FIGS. 40, 41, 42a and 42b list some of the methods and components of the ePOS-Print API.

FIG. 43 provides sample code for the constructor of an ePOS-Print Builder object.

FIG. 44 provides examples of types of alignment parameters.

FIG. 45 provides the return value for the ePOS-Print Builder object.

FIG. 46 illustrates exception error.

FIG. 47 provides sample code illustrating the use of text alignment.

FIG. 48 provides sample code to set the line feed space to 30 dots.

FIG. 49 illustrates Boolean values for the rotate parameter.

FIG. 50 provides sample code to set text rotation.

FIG. 51 shows escape sequences to indicate nonprintable characters in a character string.

FIG. 52 provides sample code illustrating the use of addText(data).

FIG. 53 provides examples of parameter "lang" to designate a target language.

FIG. 54 provides sample code illustrating the use of method addTextLang(lang).

FIG. 55 illustrates sample values for the font parameter.

FIG. 56 provides sample code illustrating the use of the addTextFont(font) method.

FIG. 57 illustrates possible values for parameter "smooth".

FIG. 58 provides sample code illustrating the use of method addTextSmooth(smooth).

FIG. 59 describes parameter values for dw.

FIG. 60 describes parameter values for dh.

FIG. 61 provides sample code to set the text size to double width and double height.

FIG. 62 illustrates possible values for parameter "width".

FIG. 63 illustrates possible values for parameter "height".

FIG. 64 shows sample code to set a horizontal scale of x4 and a vertical scale of x4.

FIG. 65 shows possible values for parameter "reverse".

FIG. 66 shows possible values for parameter "ul".

FIG. 67 shows possible values for parameter "em".

FIG. 68 shows possible values for parameter "color".

FIG. 69 provides sample code to set the underline style.

FIG. 70 shows sample code to set the print position at 120 dots from the left end.

FIG. 71 shows sample code to feed paper by 30 dots.

FIG. 72 shows sample code to feed paper by 3 lines.

FIG. 73 shows sample code to start a new line after printing a character string.

FIG. 74 shows sample values for parameter "color" within the addImage method.

FIG. 75 shows sample values for parameter "mode" within the addImage method.

FIG. 76 provides sample code to print an image 300 dots wide and 300 dots high in page mode.

FIG. 77 shows sample code illustrating the use of the addLogo method.

FIGS. 78 to 81 provide examples of barcode types.

FIG. 82 illustrates some possible values for the hri parameter.

FIG. 83 provides sample code illustrating how to print barcodes.

FIGS. 84 and 85 provide examples of 2D-Code type descriptions for parameter "data" within the addSymbol method.

FIG. 86 provides sample values for parameter "type" within the addSymbol method.

FIG. 87 provides sample values for parameter "level" within the addSymbol method.

FIG. 88 provides sample code to print two-dimensional symbols.

FIG. 89 illustrates some style parameters for the addHline method.

FIG. 90 shows sample code to draw double horizontal lines.

FIG. 91 provides examples of parameter style for the addVLineBegin method.

FIG. 92 provides sample code to draw thin vertical lines at 100 dots and 200 dots from the left end.

FIG. 93 provides examples of parameter style for the addVLineEnd method.

FIG. 94 provides sample code to draw thin vertical lines at 100 dots and 200 dots from the left end.

FIG. 95 shows sample code to print characters "ABCDE" in page mode.

FIG. 96 shows sample code to specify the print area with the origin (100, 50), a width of 200 dots, and a height of 30 dots and print the characters "ABCDE".

FIG. 97 provides some examples for parameter "dir" of method addPageDirection.

FIG. 98 provides sample code to print characters "ABCDE" by rotating them 90 degrees clockwise.

FIG. 99 shows sample code to specify (50,30) for the print start position in the area specified by the addPageArea method and print the characters "ABCDE".

FIG. 100 provides examples of the "style" parameter in method addPageLine.

FIG. 101 provides sample code to draw a thin solid line between start position (100, 0) and end position (500, 0).

FIG. 102 provides examples of the "style" parameter in method addPageRectangle.

FIG. 103 shows sample code to draw a rectangle with a thin double line, with the start position (100, 0) and the end position (500, 200) as its vertexes.

FIG. 104 shows sample types for method addCut.

FIG. 105 provides sample code to perform a feed cut operation.

FIG. 106 shows examples of parameter "drawer" for method addCut.

FIG. 107 shows examples of parameter "time" for method addCut.

FIG. 108 shows sample code to send a 100 msec pulse signal to pin "2" of a drawer kick connector.

FIG. 109 shows examples of buzzer patterns.

FIG. 110 shows examples of how to set parameter "repeat" in method addSound.

FIG. 111 shows sample code to repeat a sound pattern "A" three times.

FIG. 112 shows sample code illustrating the use of method to String( ).

FIG. 113 shows the specifying of the halftone processing method to be applied to monochrome (two-tone) printing.

FIG. 114 shows sample code to set the halftone type as error diffusion.

FIG. 115 provides sample code to set brightness as 2.2.

FIG. 116 provides sample code to clear the command buffer and reset it to its initial state.

FIG. 117 provides sample code illustrating the use of ePOSPring(address).

FIG. 118 provides sample code illustrating the use of the send (request) method.

FIG. 119 provides sample code illustrating the use of the open( ) method.

FIG. 120 provides sample code illustrating the use of the close( ) method.

FIG. 121 provides an example of the use of the address property.

FIG. 122 provides an example of using the enabled property.

FIG. 123 provides an example of using the interval property.

FIG. 124 provides an example of using the status property

FIG. 125 shows some properties of the response object.

FIG. 126 shows value of success.

FIG. 127 shows value of code.

FIG. 128 shows value of status.

FIG. 129 show sample code to create and send a print document, and to display the print result in a message box.

FIG. 130 lists some properties of the error object.

FIG. 131 shows sample code to create and send a print document and to display the HTTP status code in a message box when a communication error occurs.

FIG. 132 provides an example of using the onstatuschange property.

FIG. 133 provides an example of using the ononline property.

FIG. 134 provides an example of using the onoffline property.

FIG. 135 provides an example of using the onpoweroff property.

FIG. 136 provides an example of using the foncoverok property.

FIG. 137 provides an example of using the oncoveropen property

FIG. 138 provides an example of using the onpaperok event.

FIG. 139 provides an example of using the onpapernearend event.

FIG. 140 provides an example of using the onpaperend event.

FIG. 141 provides an example of using the ondrawerclosed event.

FIG. 142 provides an example of using the ondraweropen event.

FIG. 143 provides a list of some components of the ePOS-Print-Canvas API.

FIG. 144 is sample code illustrating the creation of a new ePOS-Print Canvas API object.

FIG. 145 shows examples of parameter "cut".

FIG. 146 shows examples of parameter "mode".

FIG. 147 provides sample code to print Canvas (ID='myCanvas').

FIG. 148 is sample code illustrating the use of the open( ) method.

FIG. 149 is sample code illustrating the use of the close( ) method.

FIG. 150 is sample code illustrating the use of the address property.

FIG. 151 is sample code illustrating the use of the enabled property.

FIG. 152 is sample code illustrating the use of the interval property.

FIG. 153 is sample code illustrating the use of the status property.

FIG. 154 illustrates some halftone properties.

FIG. 155 is sample code illustrating the use of the halftone property.

The default value is 1.0. FIG. 156 is sample code illustrating the setting of the brightness property.

FIG. 157 shows some properties of the response object.

FIG. 158 shows value of success.

FIG. 159 shows value of code.

FIG. 160 shows value of status.

FIG. 161 shows sample code to print Canvas (ID=myCanvas), and to display the print result in a message box.

FIG. 162 lists some properties of the error object.

FIG. 163 shows sample code to print Canvas (ID=myCanvas), and to display the HTTP status code in a message box when a communication error occurs.

FIG. 164 is sample code illustrating the use of onstatuschange event.

FIG. 165 provides an example of using the ononline property.

FIG. 166 provides an example of using the onoffline property.

FIG. 167 provides an example of using the onpoweroff event.

FIG. 168 provides an example of using the oncoverok event

FIG. 169 provides an example of using the oncoveropen event.

FIG. 170 provides an example of using the onpaperok event.

FIG. 171 provides an example of using the onpapernearend event.

FIG. 172 provides an example of using the onpaperend event.

FIG. 173a provides an example of using the ondrawerclosed event.

FIG. 173b provides an example of using the ondraweropen event.

Figure 174:
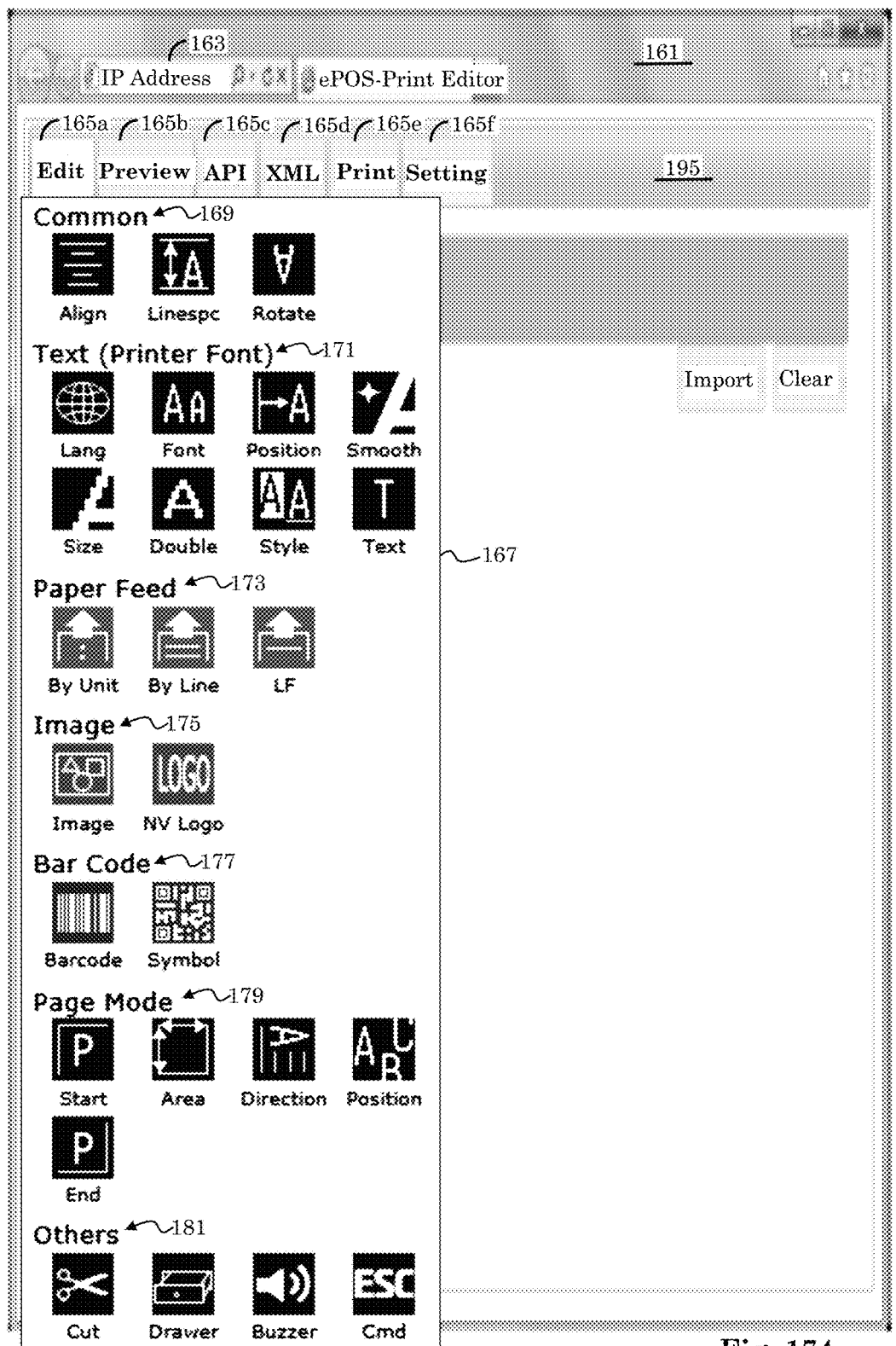

FIG. 174 provides a sample main page (i.e. index.html, or home page) for an ePOS Print editor in accord with the present invention.

FIG. 175 shows the Setting screen resulting from selection of the "Setting" tab of the ePOS Print editor in accord with the present invention.

FIG. 176 provides a table summarizing some of the options provided by the Setting screen.

Figure 177:

FIG. 177 provides another view of the Edit screen of the ePOS Print editor in accord with the present invention.

Figure 178:
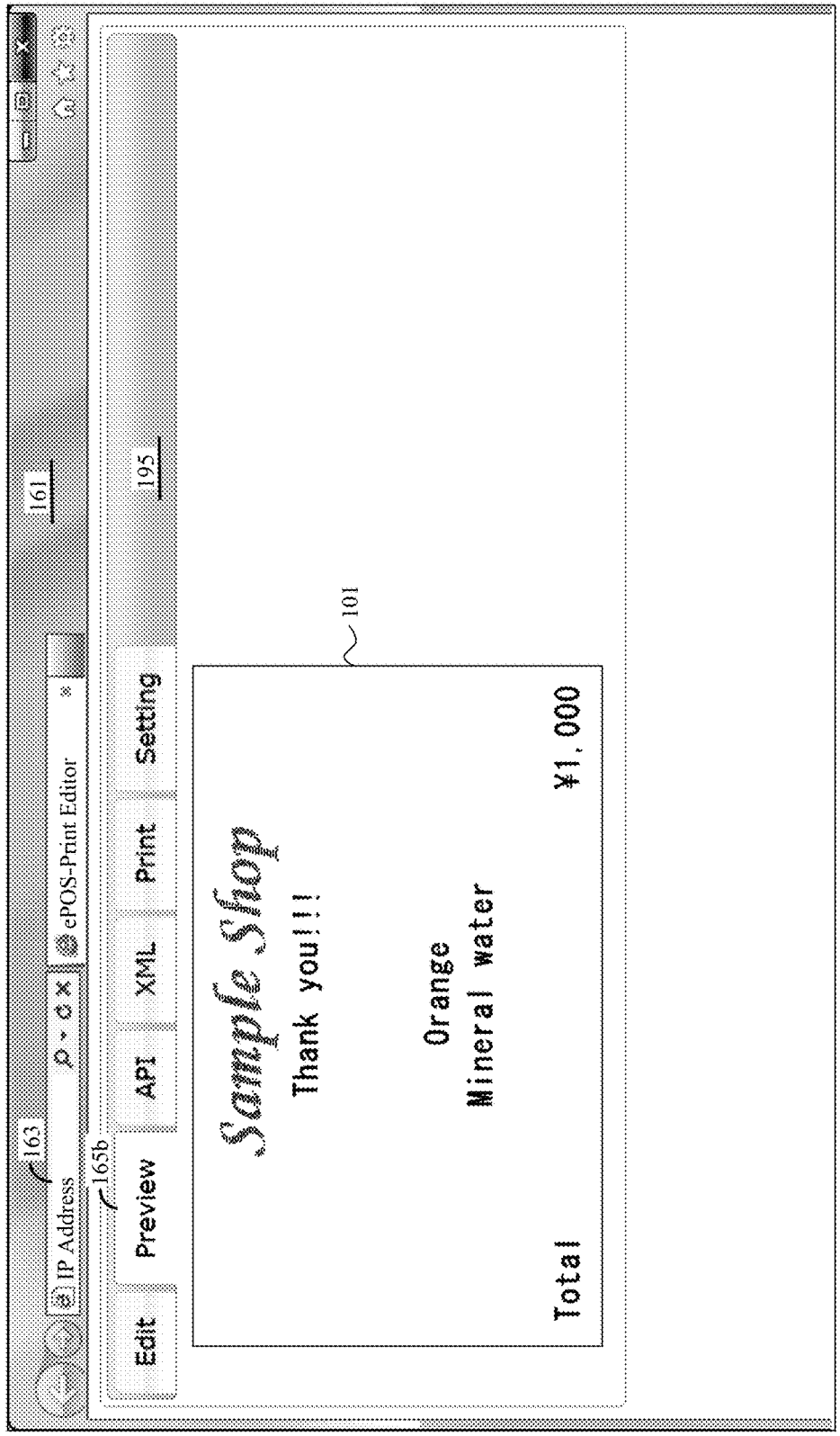

FIG. 178 shows a sample preview image of the ePOS Print editor in accord with the present invention.

Figure 179:
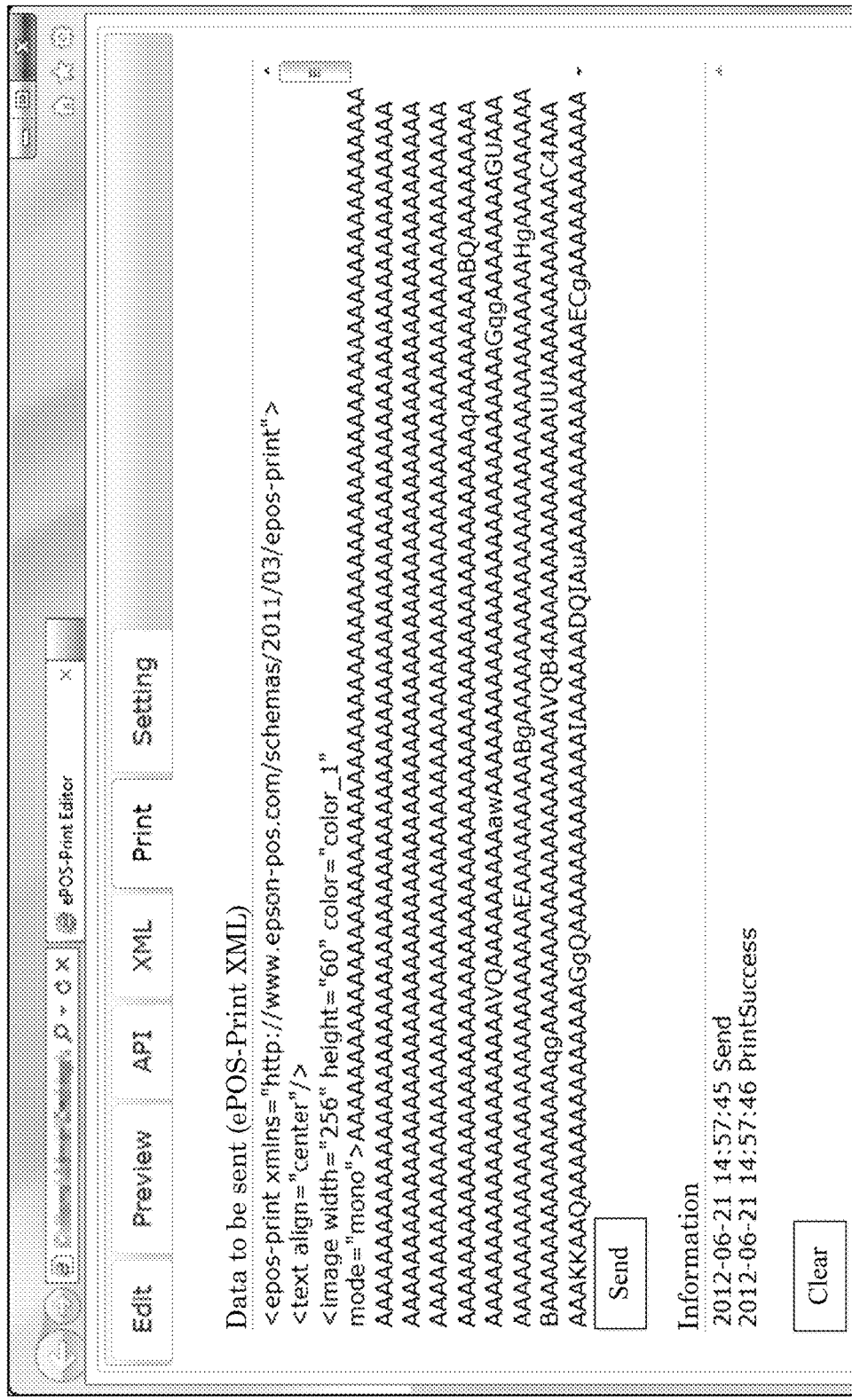

FIG. 179 provides a sample view of the present ePOS-Print editor with the Print tab selected.

Figure 180:
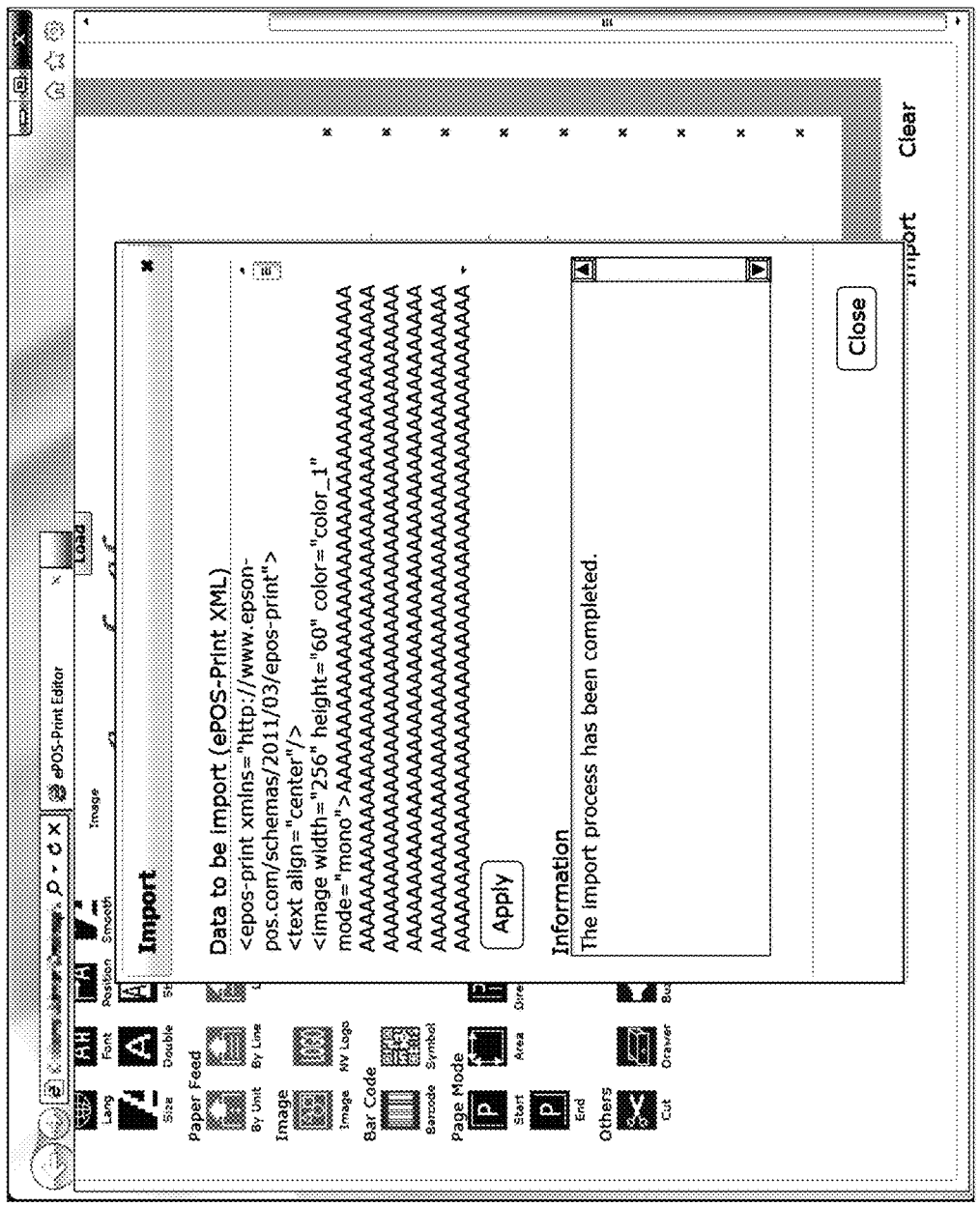

FIG. 180 shows an import screen in accord with the present invention.

Figure 181:
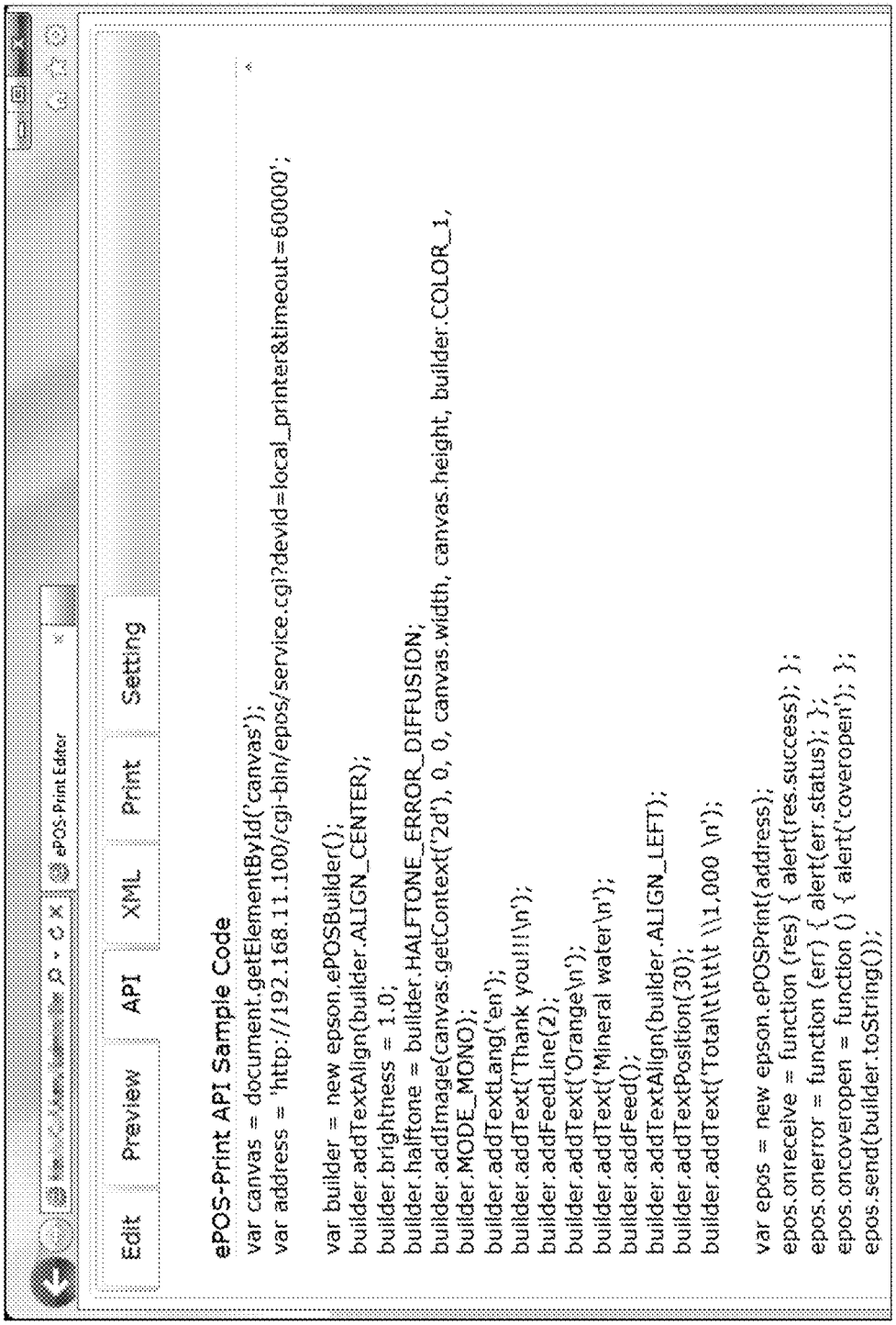

FIG. 181 provides a sample view of the present ePOS-Print editor with the API tab selected.

DESCRIPTION OF THE PREFERRED EMBODIMENTS

Previously, in order to print from a web page on the Internet, a user typically had to go through a web browser's print-select button on the web browser's interface or go through a third-party printing service on the Internet. The web browser controls access to local resources, such as printers. Basically, the web browser functions as an interface to the local operating system, which in turn controls access to any installed printer drivers. If one wishes to print through a third-party printing service on the Internet, then the document to be printed needs to also exist on the Internet, and not just on the user's local device. In either case, the user is required to go through a printer dialogue box to select from among available, registered printers and printing options, none of which are known to the web page from which one wishes to print.

To improve the capabilities of network printing, the present invention endeavors to increase the capabilities of web applications, i.e., web pages, and in particular to increase the capabilities of script applications (i.e., widgets, methods, etc.) executed within a web page to directly control network printers and non-network printers without having to go through the web browser's print-select button or relying on a third-party Internet printing service.

The printers in the preferred embodiments may be local printers and/or remote printers. That is, the present invention permits web page script applications to create a print document and communicate with, and control, a printer without requiring explicit printing permission or printing assistance from the web browser. In addition to the print document being directly created by the script application, the print document may does not need to exist on the Internet in order to be printed. As a preferred implementation, whenever a script application is mentioned in the following discussion, it is discussed as implemented in the JavaScript language, which is a Java-based script language. It is to be understood however, that the present invention may be implemented using other script languages known in the art.

Since the present invention adds printing capabilities to a web page, and the web page is typically accessed via a web browser, the preferred embodiment of the present invention includes a local computing device capable of running a web browser. To facilitate the use of the present invention with existing network and non-network printers, it is further preferred that the web page communicate via an interface box (i.e., device, apparatus, or module) capable of receiving printing instructions from the web page and translating them to an appropriate communication format/language for the connected printers. Preferably, the interface box provides translation services for communication between the web page and the printers, and further provides any needed help for creating a print document appropriate for a given printer. Since the interface box has computing and decision-making capabilities, it is an intelligent device. So for ease of discussion, the interface box is hereinafter termed, an "intelligent module".

If a printer is not a non-network printer, the local printers is connected to local computing device (on which the web browser is installed) via the intelligent module (which is preferably a physical computing apparatus/device). Alternatively, if the printer is a network printer, it is preferred that the intelligent module still function as a communications interface with the local printer. Furthermore, in a network environment, the intelligent module may function as a communication interface for multiple (network and non-network) printers.

Although the present invention may be implemented in any computing environment having a web browser and printer(s), for ease of explanation and as an example of a preferred embodiment, the present invention is herein described as implemented within a retail environment. In particular, the present invention is described as implemented in a point-of-sale (i.e., POS) system, or POS network. It is to be understood however, that the present invention may be implemented other networked and non-networked computing/printing environments.

In POS systems, a point-of-sale device is located at each checkout station to implement a commercial transaction and maintain a record of the transaction. The checkout station is thus the location within a retail environment (or retail establishment) where a physical customer pays a merchant for goods and/or services. A POS system may include multiple POS devices, which may be thought of as electronic cash registers that incorporate computing and/or networking capabilities. POS devices typically have an adjacent (or integrated) receipt printer on which a receipt (or summary of a transaction) is printed for the customer's records. In order to accommodate transaction summaries of indefinite length, the receipt printer is typically a "roll-paper printer" (i.e., a printer that prints on a roll of paper, or "paper roll") and cuts the printed portion from the roll of paper at the end of the printed transaction summary). It is to be understood, however, that the present invention is compatible with sheet printer, and other non-roll-paper printers.

POS devices are typically networked within a POS system and communicate with a central server that keeps track of transactions for bookkeeping and inventory purposes, and may additionally provide information to the POS device, such as product prices (or updates to produce prices), coupons, promotional advertisements, product information (such as product description and/or availability), and other data. The central server may be part of a local area network and/or a wide area network, and may optionally be distributed across multiple servers. Conceivably, the central server may also be accessible via the Internet.

Since POS system networks are comprised of specialized and computerized POS devices, they can be complicated and costly to purchase, set-up, maintain, and upgrade. The cost and difficulty of implementing and maintaining POS systems is further increased by the use of different model POS devices (from different manufactures) and different model printers (from different manufactures) within the same POS system network. As it would be understood, the different POS devices may have different operating platforms (i.e., run on different operating systems, OS) with different capabilities, and the different model printers may have different driver requirements/capabilities for the different operating platforms.

The following discussion illustrates how the present invention may reduce the cost and complexity of setting up, maintaining, and upgrading a POS system network; particularly one that combines different model POS devices and different model printers.

In a preferred embodiment, a POS system is implemented over a network, and commercial transactions are managed via a web page application (i.e., a web page) maintained within a network server and accessible by remote web terminals functioning as POS devices to implement and record sales transactions. Alternatively, the web page may be maintained in the intelligent module, and the POS devices may access the web page from the intelligent module. In either case, each POS device accesses the web page via a web browser, and uses the web page to print to a printer. Preferably, commercial transactions are also entered and recorded via the web page.

A printer, which is typically adjacent to a POS device, may be controlled by the network server or controlled by the POS device. In both cases, it is preferred that communication with the printer be conducted via the intelligent module, as is explained more fully below.

Alternatively, the present invention may also be implemented without the use of any network server. In this case, the intelligent module may provide the web page to the POS device(s), and convey communication between the POS device(s) and the printer(s). This implementation does not preclude the POS device from being part of a computer network.

In this manner, the operating platform of the POS device is not a limiting factor; all that is needed is that the POS device be capable of running a web browser, irrespective of its operating platform. Indeed, the POS device may be implemented using a simplified computing device having minimal computing power. For example, the POS device may be implemented as a budget computer tablet having basic computing and communications capabilities.

With reference to FIG. 3, a web page 31 is shown within a web browser 33. Preferably, web browser 33 is run within a computing device (i.e., data processing device such as computing device 51 shown in FIG. 4), which may function as a POS device. As it is known in the art, web browser 33 provides an interface for accessing web pages within a TCP/IP network, such as the Internet, and typically includes an address field 35 in which one may enter a network address for accessing a desired web page. For example, web page 31 may be maintained (i.e., placed) in intelligent module 37 and downloaded to web browser 33. Alternatively, web page 31 may be incorporated into (i.e., be resident by default in) the computer device on which web browser 33 resides. Web page 31 is preferably written in a markup language, such as HTML and/or its variants, and supports script languages, such as JavaScript.

In the present embodiment, web browser 33 is in communication with one or more printers, PrinterID_1 and PrinterID_2, via intelligent module device 37. Optionally, these printers may be POS printers (i.e., receipt printers) and may optionally print onto respective rolls of paper 39a and 39b.

Preferably, intelligent module 37 communicates with web page 31 via at least one print application program interfaces, i.e., print API, labeled API_1 through API_3. For illustration purposes, print application program interfaces API_1 through API_3 are shown embedded within web page 31, and they provide an interface to respective print script applications, such as Print_Script_App_1 through Print_Script_App_3. If desired, the functionality of all print script applications may be combined and accessed via a single print API. Further preferably, the print script applications are Java script applications that provide various printer functions, as described below, and are accessible via at least one print API. API_1 through API_3 (and their respective print script applications Print_Script_App_1 through Print_Script_App_3) may be provided as part of a library of print APIs to web page developers to incorporate the present printing capabilities.

API_1 through API_3 provide a print interface for web page 31, and print script applications Print_Script_App_1 through Print_Script_App_3 are designed to provide printing capabilities and/or to communicate with intelligent module 37. The print APIs and print script applications may be embedded together as a unit within web page 31, such as illustrated by API_1+Print_Script_App_1 and by API_2+Print_Script_App_2. In this case, both may be addressed under the common term of "API" or "print API", and this "API" would thus handle both the interfacing with web page 31, the creation of a print document, and the sending of the print document to the intelligent module 37.

As it may be understood by one versed in the art, print APIs may be instances of a specific software class (as defined in object oriented languages), and they may be created by means of a constructor (as defined in OOP languages). In one embodiment, a print API may include a constructor for initializing the API.

In another embodiment, the print API and its corresponding print script application may be split such that the print API is embedded the within the web page 31, but its corresponding print script application is maintained separate within intelligent module 37. This is illustrated by API_3 being embedded within web page 31 while its corresponding printer script application, Print_Script_App_3, is maintained within intelligent module 37. In this manner, some of the computing resources needed by Print_Script_App3 may be offloaded from the device on which web browser 33 resides and transferred to intelligent module 37. In this case, API_3 would send all data necessary for defining a printed document to Print_Script_App3, which would then create a corresponding print document within intelligent module 37 and send the resultant print document to a specified printer. The separating of the print API from its corresponding print script application also permits the updating of the script application within the intelligent module 37 without altering the print API within the web browser. In this case, web developers may be provided with a library of print API for incorporation into their web pages, but the details of the implementation of the corresponding print script applications may be maintained in intelligent module 37 or in a network server and thus be kept hidden from the web developers.

In a preferred embodiment, each print API communicates directly with intelligent module 37. Therefore, intelligent module 37 is configured to receive (i.e., be assigned) a network address, illustrated as IP_ADD_1. This network address may be a static address or a dynamically assigned address.

Each print API is preferably provided with an address property element (i.e., address data field) configured to receive the network address of intelligent module 37, by which each print API may address its communication to intelligent module 37. If the network address of intelligent module 37 is static (i.e., fixed), the address property element within each API may be manually set. Alternatively if the network address of is dynamic, a network address resolution service may be used to determine the network address of intelligent module 37 and enter the resolved address in each print API's address property element. Further preferably, the address property element is configured to set a timeout period. This timeout period may indicate a maximum amount of time allotted for receiving an acknowledgement, or other response, from the intelligent module. Preferably, the print API includes a step, or process, for canceling a print job (or a submitted print request) in response to the timeout period elapsing.

Further preferably, each printer is identifiable by name, or identification code (ID) or (network) address. For ease of discussion, both printer ID and/or printer network address are designated by reference characters "PrinterID_1" and "printerID_2". Further for ease of discussion, whenever printer ID is used, it is to be understood that "printer network address" may be substituted since the present invention envisions using a printer network address in place of printer IDs. Further preferably, the name, printer ID and/or printer address is provided to the print API's. The print API's may therefore designate a target printer by name, printer ID and/or printer network address to receive a printing request, or print document.

In one embodiment, the print API's address property element is expanded to also receive the ID (or network address) of the target printer. For example, the address property element may be configured to set the device identification (the ID or network address) of the target printer, which designates it as the printer to which the document to be printed should be sent. The print API may further have a receive event element configured to obtain a response message from the printer. The response message may include a print result, an error code and/or a printer status. The error code or the printer status may indicate one of an automatically recoverable error or an unrecoverable error occurred. Thus, the print API may receive a response message from the printer via the intelligent module designated by the address property element. In this manner, communications between a target printer and a print API are conducted via the intelligent module specified in the address property element. Additionally, the address property element may be configured to set a timeout period. This timeout period may indicate the maximum amount of time allotted for receiving an acknowledgement, or other response, from the intelligent module or from the printer. Preferably, the print API includes a step, or process, for canceling a print job (or a submitted print request) for printing a document in the printer designated by the address property element in response to the timeout period elapsing.

Alternatively, the print APIs may send a printing request to intelligent module 37 without designating a specific printer, and intelligent module 37 may select a printer based on proximity information to the device that issued to the printing request or by determining which printer is available (i.e., not busy). In this case, intelligent module 37 is preferably aware of the locations of the devices on which the web pages are running and the locations of the printers in order to select the printer closest to the device that issued the printing request. Further alternatively, once intelligent module 37 has selected a printer for a specific device that issues a print request, the selected printer preferably becomes assigned to that device and all future print requests from the same device are sent to the same selected printer.

Since each print API embedded within web page 31 can directly communicate with intelligent module 37 by means of its address property element (which holds the network address of intelligent module 37), each print API may submit printing requests at any time without user intervention or without submitting a print request to the web browser 33 on which it resides. For example at a checkout station, a print API may submit for printing a description of each product item being summed for purchase, as the product item is identified (i.e., scanned) by the web browser and added to the overall transaction summary. Thus, web page 31 may generate a print document of any data (including newly generated data and/or portion(s) of a display screen), and submit the print document for printing at any desired time. For example, the API may generate parts of a print document in segments (i.e., at different times) and then combine and/or arrange the segments into a composite print document to be sent to the printers. Alternatively, since in the present embodiment the preferred printers are roll printers, the print API may send multiple segments to the printers for printing, and send an instruction for cutting the printed portion of the paper roll at the end of a printing session (i.e., at the end of a commercial transaction at a checkout station).

In operation, a print script application (or the API itself if it is combined with its corresponding print script application as a single unit) includes a first method element (i.e., a first executable routine, or executable method) to define a print document by accumulating (i.e., adding) printer control instructions into a command buffer and then executing the accumulated printer control instructions. Preferably, the print script application (or API) further include a second method element (i.e., a second executable routine) configured to send the defined print document to intelligent module 37. A printed document may thus be created by executing the first and second method elements, in turn.

In the present discussion, all or some of the recited software methods may be replaced by software objects, as defined in object oriented languages.

Intelligent module 37 is preferably implemented as a data processing device (including, but not limited to: a control unit circuit and/or central processing unit; and/or volatile/non-volatile electronic memory; and/or data/control registers; and/or signal busses; and/or electronic communication interfaces; and/or lookup table(s)). Intelligent module 37 may be implemented as a stand-alone unit in its own physical encasement, or may alternately be incorporated into (or physically attached to) a printer, server, or other electronic device. In operation, Intelligent module 37 receives a print document from a print API embedded within web page 31, converts it (if necessary) into a suitable print document for a specified (or otherwise designated) printer, and sends it for printing to the designated printer. Optionally, intelligent module 37 may include printer drivers for each of the printers, and utilize the printer drivers to define the suitable print document. Alternatively, intelligent module 37 may receive a record of the command buffer from a print API, create a print document by executing the printer commands in the command buffer, and send the created print document to the appropriate printer. Still alternatively, the commands received from a print API may be general printing descriptions, such as formatting information and print content data, and the intelligent module may then determine the necessary printer commands to generate a print document that best resembles the general printing descriptions based on the capabilities of the designated printer, and then send generated print document to the designated printer.

In the above discussion, the created print document may be an XML print document or a bitmap print document or other document description format known in the art.

As illustrated, printers PrintID_1 and PrintID_2 may be POS printers that prints on paper rolls 39a and 39b, respectively. The printers may further have accessories such as a (fully or partially removable) cover 41, a drawer 43, a buzzer 45, and a paper cutter (or auto cutter) 47. These accessories are preferably controllable via the printer commands mentioned above, and relayed to the printers by intelligent module 37. Among the error codes or printer statuses that a target printer may send to a print API, as discussed above, may be an indication that the cover is open. Similarly, an error code or printer status may indicate that an error occurred in the auto cutter. The printer may also have a sensor that detects if paper is in the printer, and an error code or printer status may indicate if no paper is detected by the sensor. Alternatively, an error code or printer status may indicate if the document sent to intelligent module 37 contains a syntax error. Alternatively, an error code or printer status may indicate if a print API's target printer, as designated by the submitted printer ID, does not exist.

As it would be understood PrintID_1 and PrintID_2 have communication ports for communicating with intelligent module 37. The error code or the printer status may indicate if an error is detected on the communication port. An error code or printer status may further indicate if the timeout period, mentioned above, elapses. Alternatively, the error code or printer status may indicate that printing operation is successfully completed. As mentioned above, the printer may be connected to a drawer by a connector, which may have at least one pin. In this case, the error code or the printer status may indicate the status of a predetermined pin of the connector.

Alternatively, the error code or printer status may indicate that the printer is offline or waiting to be brought back online, or that no response was received from the printer.

PrintID_1 and PrintID_2 may further have a switch for feeding paper 39a and 39b, and the error code or the printer status may indicate when paper is being fed by operation of the switch. The error code or printer status may further indicate when buzzer 45 is turned on (i.e., actuated). The printers or intelligent module 37 may have a spooler configured to spool a print job for printing a document, and the error code or the printer status may indicate if the spooler has stopped.

In the embodiment of FIG. 3, the present invention is implemented as a system that may, or may not, be networked. That is, the local device on which web browser 33 runs may be a stand-alone device not connected to any specific central server. Irrespective of whether the local device is a stand-alone device or networked with other POS devices or server(s), intelligent module 37 may function as a printer control box relaying and translating communication (and generating any necessary command and instruction) signals between the printers and web page 31.

FIG. 4 illustrates a network implementation of the present invention. All elements similar to those of FIG. 3 have similar reference characters and are described above. As illustrated, network 55 includes computing device 51, server 53, intelligent module 37 and printer PrinterID_2. Computing device 51, server 53 and intelligent module 37 communicate via a network communication channel 57, which may be a wired channel, wireless channel or a combination of both. Computing device 51, which may be a computer tablet or other data processing device, accesses web page 31 via web browser 33. Optionally, web page (i.e., web application) 31 is accessed from server 53 or from intelligent module 37. That is, web application 31 may be maintained (i.e., stored or placed) in (and accessed from) server 53 and/or in intelligent module 37.

Optionally, printer PrinterID_2 may include non-volatile memory 59. In one embodiment, multiple predefined images, such as logos, may be stored in memory 59 and identified/addressed by ID code, such as LOGO_1 through LOGO_3.

Figure 1:
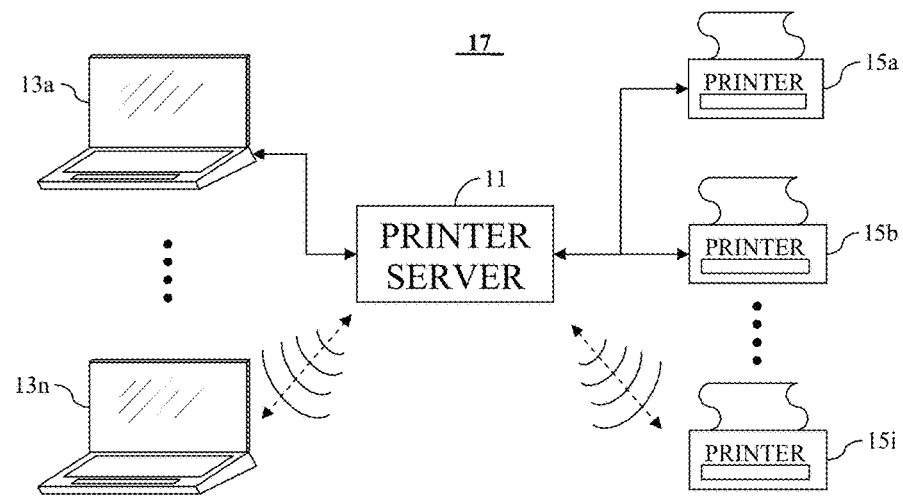
FIG. 1 illustrates a typical printer server arrangement.
Figure 2:
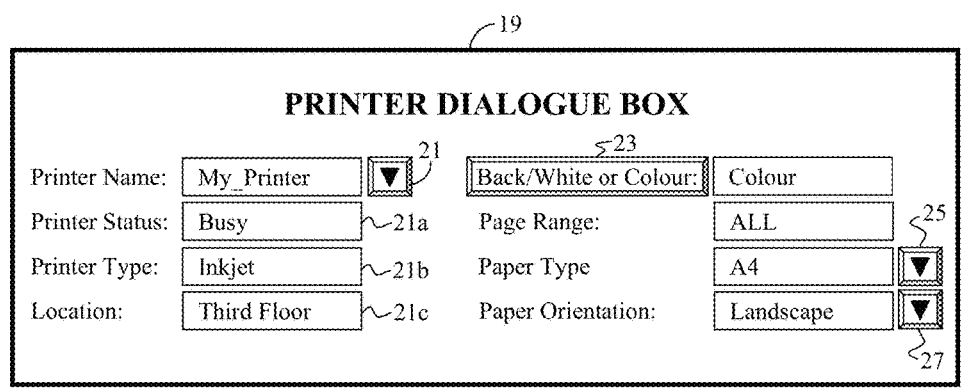
FIG. 2 illustrates a typical printer dialogue box.
Figure 5:
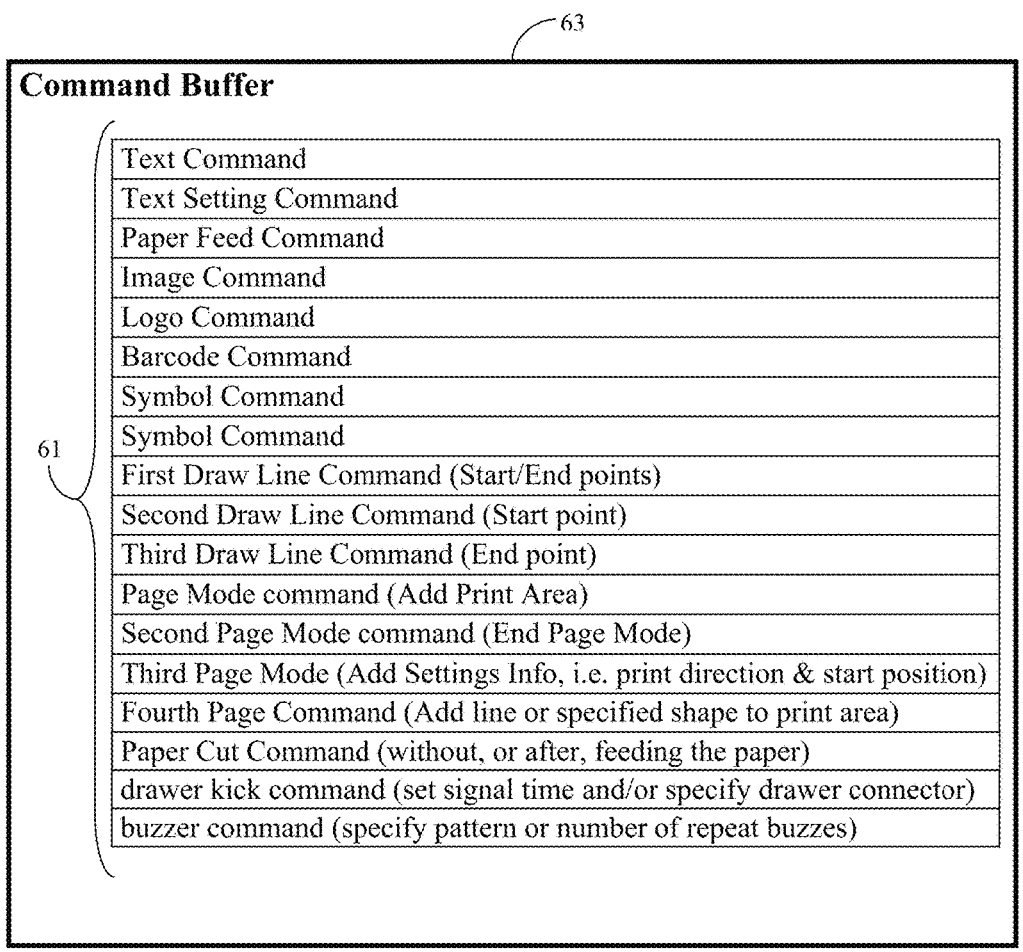
FIG. 5 shows a command buffer and illustrates some examples of control commands in accord with present invention.

As is explained above, the print API defines a command buffer in which printer control commands are accumulated. Various types of control commands may be accumulated in the command buffer. FIG. 5 illustrates some examples of printer control commands 61 that may be accumulated in the command buffer 63 in accord with the present invention. Each command may result in one or more instructions necessary for executing the command.

For example with reference to FIG. 5, one of the commands may be a text command for adding text for printing to the command buffer. That is, the text command may define a data field of definite or indefinite length in which text to be printed is inserted. Another command may be a text setting command for adding parameters that define (i.e., set) properties of the text, to the command buffer. Such properties may include the size, font, color, etc. of the inserted text. The text setting command may set multiple different parameters. For example, a first text setting parameter may specify a start position for printing on paper, and another may set alignment requirements. Other parameters may set language, font, style, scale, and/or size of the inserted text. Additional text setting parameters may include a parameter for specifying whether to rotate the printed text, or whether to enable smoothing the text.

Another command may be a paper feed command for adding to the command buffer one or more instructions for feeding the paper in the printer.

Still another command may be an image command for adding a raster image for printing. As it is known in the art, a raster image is typically a rectangular area that defines an image as viewed on a display medium one point at a time, such as bitmap, and defines an image file. Preferably, the print API includes a half tone property element, and a color image rendered in the web application, is converted into the raster image data for printing, by the image command, according to a setting of the halftone property element. Preferably, the halftone property element specifies at least one of a dithering, error diffusion, and/or threshold for converting the color image into the raster image data. The print API may also include a brightness property element, which may specify a gamma value in the range 0.1-10.0 for correcting the brightness of the raster image data. In this case, the image command may convert the color image into the raster image data for printing according to a setting of the brightness property element.

As is illustrated in FIG. 4, PrinterID_2 may include non-volatile, NV, memory 59 for registering at least one logo. In this case, it is preferred that there be a logo command for adding a key code that identifies a specific logo to the command buffer for printing the identified logo. That is, the key code specifies a specific logo (i.e., logos LOGO_1 through LOGO_3) registered in NV memory 59.

Another command may be a barcode command for adding an instruction of printing a barcode, to the command buffer. Preferably, multiple barcode types are supported, and the barcode command includes a barcode parameter that specifies at least the barcode type desired, the width and height of the barcode, and/or data to be converted (i.e., encoded) into the selected barcode type.

Another command may be a symbol command for adding an instruction of printing a two-dimensional symbol, to the command buffer. The symbol command may include a symbol parameter that specifies at least one of a type of the two-dimensional symbol, an error correction level of the two-dimensional symbol, or data to be converted to the two-dimensional symbol.

Preferably, another command is a first line command for adding an instruction of drawing a first line to the command buffer. The first line command may include a first line parameter that specifies a start position and an end position of the first line. The present invention may also include a second line command for adding to the command buffer an instruction of starting the drawing of a second line of indefinite length, and providing a second line parameter that specifies a start position of the second line but provides no line parameter for specifying any end position of the second line. In this case, it is preferred that the present invention include a third line command for adding an instruction of finishing (i.e., stopping) the drawing of the second line started by the second line command. The third line command may include a third line parameter that specifies an end position for the second line.

Still another command may be a page mode command for adding to the command buffer an instruction of switching to a page mode, and adding a print area in the page mode. That is, the page mode may be a print mode wherein the print area is defined, data is laid out in the print area, and the print area is printed in a batch operation. The page mode may further include at least one coordinate specifying a desired placement location for the print area. A second page mode command may add instruction(s) for ending the page mode initiated by the first page mode command. A still third page mode command may at least one setting (i.e., setting parameter) to the page mode defined by the first page mode command. The third page mode command may include a third page parameter that specifies a direction for the printing in the page mode, or coordinate(s) specifying a starting position for the printing in the page mode. A fourth page mode command may further add instruction(s) for drawing a predefined shape, such as a line or a rectangle, in the page mode defined by the first page mode command. The forth page command may include coordinates specifying a start position and an end position of the predefined shape, i.e., the line or the rectangle, within the page mode. The forth page command may further include a forth page parameter that specifies a type choice for the shape. For example, the forth page parameter may specify a line type or a rectangle type.

Another command maybe a paper cut command for adding to the command buffer an instruction for cutting the paper, i.e., the printing medium, such as by means of paper cutter 47. The paper cut command may include a paper cut parameter specifying either one of cutting the paper without first feeding the paper or cutting the paper after feeding the paper.

As is shown FIG. 3, a printer in accord with the present invention may have a drawer 43 connected to it. Assuming this is the case, another command may be a drawer kick command for adding an instruction of kicking (i.e., releasing or unlatching) the drawer open to the command buffer. Preferably, the drawer kick command includes a first drawer parameter that specifies an ON time duration of a signal that is applied to open the drawer. Further preferably, the drawer is connected to the printer by two connectors, and the drawer kick command includes a second drawer parameter specifying (the release of) either one of the connectors that connect the drawer and the printer.

As shown in FIG. 3, PrinterID_2 may include a buzzer 45. If so, then another command may be a buzzer command for adding to the command buffer an instruction of turning on (or actuating) the buzzer. The buzzer command may include a buzzer parameter specifying a pattern or a number of times that actuation of the buzzer is repeated.

A specific example of the present invention as implemented in a POS system is as follows.

Figure 6:
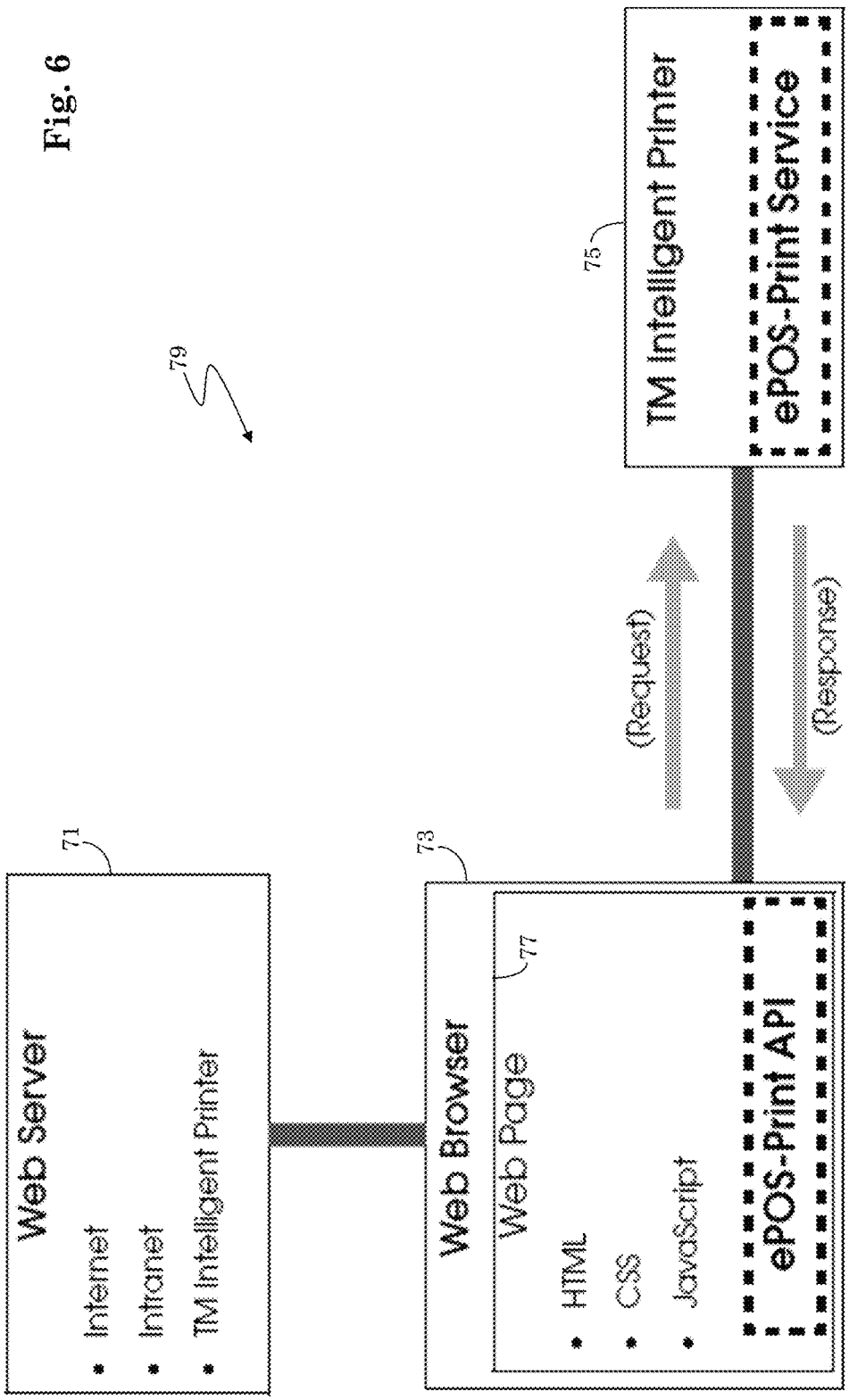
FIG. 6 illustrates a specific example of the present invention as applied in a POS system.

FIG. 6 illustrates a specific example of the present invention as applied in a POS system 79. As shown, the present example includes a server 71, web browser 73 and intelligent module 75, as discussed above. For illustration purposes, intelligent module 75 is identified as "TM intelligent Pinter" to indicate that it may consist of the combination of one or more intelligent modules in communication with one ore more printers. Web browser 73 may be executed within a POS device (such as an electronic/computerized cash register), and web browser 73 accesses a web page 77, as discussed above. For ease of discussion, the printing mechanism/method of the present invention as applied in the present POS system 79 is termed "ePOS-Print".

ePOS-Print provides functionality to control POS printers in a multi-platform environment. Using ePOS-Print, data can be directly printed from Web browsers on personal computers, smart phones, or tablet computers to TM intelligent printers (i.e., the combination of one or more intelligent modules and one or more printers).

In addition, print images rendered in HTML5 Canvas can be printed. As it is known in the art, HTML5 Canvas is a container for graphics, and provides a way to draw graphics via scripting. ePOS-Print provides the API (equivalent to "print API" in the present discussion) for print commands. When a print document (Request) is sent via HTTP from the host (i.e., the device or terminal on which web browser 73 is running) to an ePOS-Print Service of a TM intelligent printer 75, ePOS-Print processes the printing of that document and returns a response document (i.e., a response).

The present implementation includes many features. For example, as long as the present system is in a network environment, a terminal with an HTML5-supported web browser can perform printing from anywhere. Installation of printer drivers and plug-ins are not required. No PCs or servers are required for printing. The present system allows printing from public and private network clouds. The present invention further allows printing in any languages supported by web browsers, in general. The present invention automatically checks the status of the TM printer before printing. There is no need for checking the status of the TM printer in advance. The present system does not respond to a printer's function to automatically send its status (such as an AutoStatusBack function). Instead, the present system is capable of sending an empty print command and checking (i.e., determining) the status of the TM printer based on the result of the command transmission. Nonetheless, to change the printer settings, utility programs dedicated to each printer, or other utility programs, may be used. Thus, the present invention allows printing by TM printers via TM intelligent printers. The present invention thus may provide both an ePOS-Print API and an ePOS-Print-Canvas API. As is discussed above, the present invention further allows device fonts to be used for printing, allows barcode printing, allows printing of images rendered in HTML5 Canvas and allows TrueType fonts to be used for printing. Preferably, the present invention allows device fonts to be used for printing and allows barcode printing. Further preferably, the ePOS-Print-Canvas API allows printing of images rendered in HTML5 Canvas and allows TrueType fonts to be used for printing.

Figure 7:
FIG. 7 shows examples of the type of printing that may be implemented by means of ePOS-Print API.

FIG. 7 shows examples of the type of printing that may be implemented by means of the ePOS-Print API. Two receipts 81 and 83 are shown. Receipt 81 shows examples the execution of various print commands, as discussed above. Receipt 81 shows examples of printing a logo, text alignment (centered), paper feed, and paper cut. Receipt 83 shows examples of executing print commands for: printing a raster image, printing text in a double-sized width style, scaling such as scale=x6 (horizontal) and x4 (vertical), alignment (center), and printing a barcode.

Figure 8:
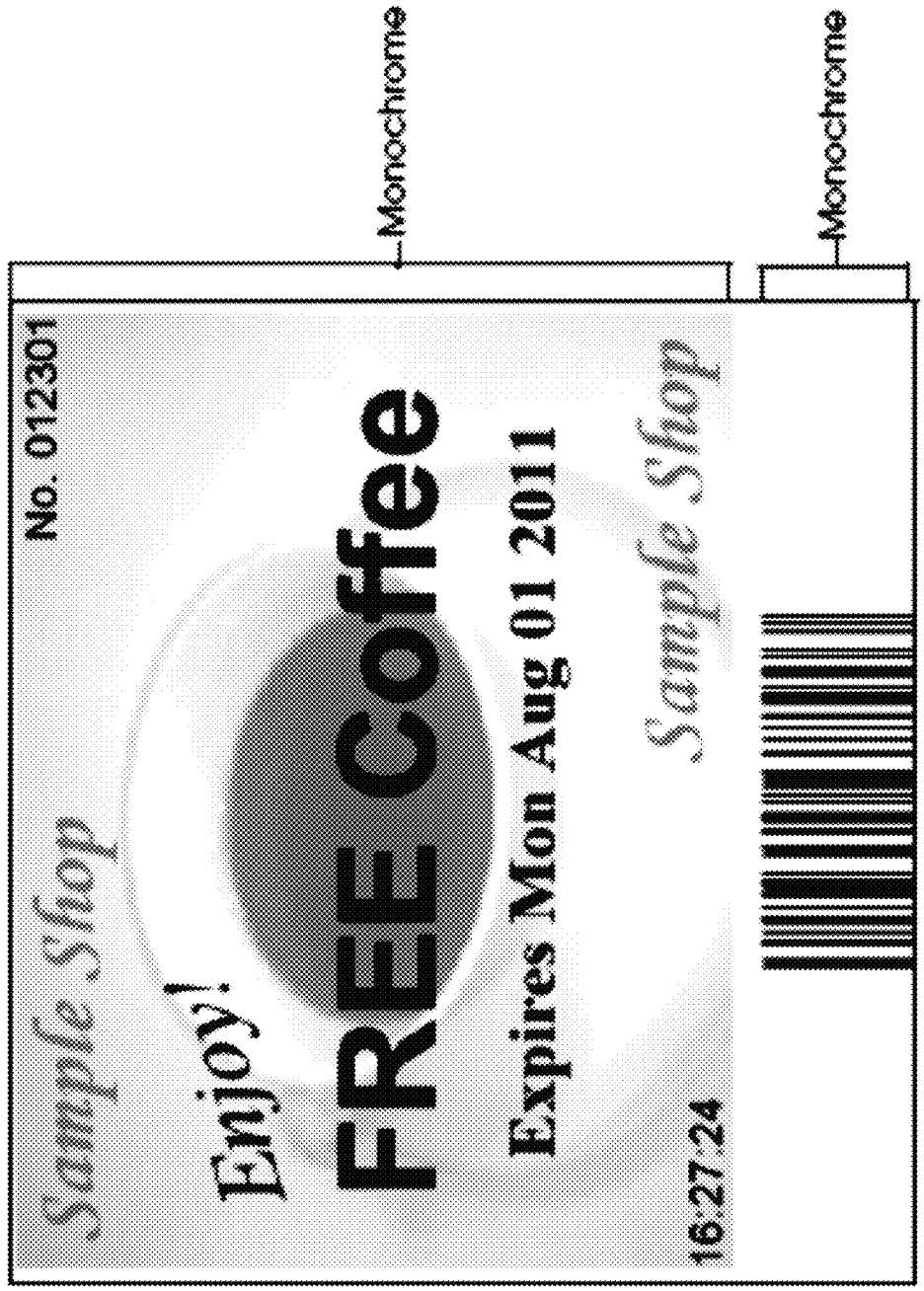
FIG. 8 shows examples of the type of printing that may be implemented by means of the ePOS-Print-Canvas API

FIG. 8 shows examples of the type of printing that may be implemented by means of the ePOS-Print-Canvas API. In the present example, the graphic created by HTML5 Canvas includes a barcode, which is typically a monochrome graphic (or image) and a pictorial graphic immediately above the barcode. The pictorial graphic may be monochrome, or grayscale, or color.

FIG. 9 is an example of print flow in accord with an embodiment of the present invention. The present example shows a server, a wireless LAN router, web browser, a TM intelligent printer, and printers that can be controlled. Preferably, the web application (i.e., web page) in accord with the present invention may be placed (i.e., maintained) in the server, and the web browser displays the web application. In operation, the Web browser may send print data to the TM intelligent printer (or intelligent module), the TM intelligent printer sends the print data to the appropriate printers under its control, and these printers print the data. The TM intelligent printer then returns a response document to the web browser (i.e., to the terminal that runs the web browser).

The ePOS-Print API may provide multiple functions. For example, it can provide print setting functions, such as alignment (for example text alignment), line feed space, text rotation, and page mode. It can also provide multiple character data settings (for example, text characters), such as language, font (device font), double-sizing, scale, smoothing, and print position. It can also provide character style settings, such as inversion of black and white, underline, and bold. It may further include printer operation controls such as paper feed setting (in dots count or in line count). The ePOS-Print API preferably also provides image printing (i.e., raster image and NV graphics), barcode printing, and two dimensional symbol printing. It may further provide a ruled line setting, drawer kick function, buzzer function, ESC/POS command transmission, response document acquisition (print result, printer status and/or system error status).

The ePOS-Print-Canvas API may also provide multiple functions. For example, it may provide printing of images (raster images) rendered in HTML5 Canvas, feed and cut functions, and response document acquisition (such as print result, printer status, and/or system error status).

The preferred web browser is therefore a browser that supports HTML5. Examples of web browsers that support HTML5 are Windows Internet Explorer 9 or later, Mozilla Firefox 3.6 or later, Google Chrome 7 or later, Safari in iOS4.0 or later, and the standard browser in Android 2.2 or later.

A system construction example in accord with the present invention is shown in FIG. 10. This example again shows a (web) server (in which the web applications, i.e., web pages, are placed), a terminal (on which a web browser that supports HTML5 is installed), an optional wireless LAN router, a TM intelligent printer, and the printers that can be controlled by the TM intelligent printer. Like before, the TM Intelligent Printer receives and prints print-data sent from the web browser and/or controls other devices, and the printers under its control print the print-data received from the TM intelligent printer.

FIG. 11 shows the registering of a web application into a TM intelligent printer. As is explained above, the terminal executes (i.e., accesses) the web application (i.e., web page) using a browser, and sends device control (which may include print data) to the TM intelligent printer. The TM intelligent printer then prints the received print data sent from the web browser.

In a preferred embodiment of the present invention, some restrictions may be imposed. For example, a printer's drawer and buzzer may not be used together. Naturally, the buzzer function cannot be used if the printer does not have a buzzer.

The present invention may also respect restrictions provided by specific web browsers. For example, Internet Explorer 9 does not allow printing to the printer to be performed from security-protected Web pages (which are typically identified by the address header "HTTPS").

FIG. 12 provides an example of a sample program screen created using the ePOS-Print API in accord with the present invention. The following examples assume that the web server is configured using IIS (Microsoft Internet Information Services). Box 1 illustrates a queue ticket, box 2 illustrates a coupon, and box 3 identifies a "settings" actuation button. In one embodiment, box 1 may print queue ticket numbers and box 2 naturally prints coupons.

Figure 13:
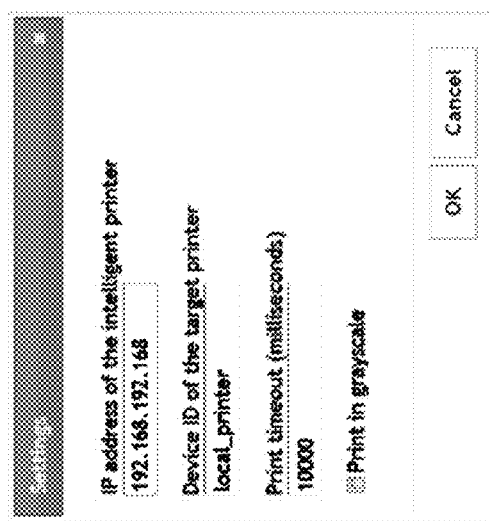
FIG. 13 is an example of a settings window that may be called up in response to actuation of the settings button of FIG. 12.

FIG. 13 is an example of a settings window that may be called up in response to actuation of the settings button of FIG. 12. The settings may include the network address (i.e., IP address) of the intelligent printer (i.e., of the intelligent module as explained above), the device ID of the target printer, a timeout setting, and an option to print in grayscale.

Figure 14:
FIG. 14 shows a first sample print-out using the ePOS-Print API and a second sample print-out using the ePOS-Print-Canvas API.

FIG. 14 shows a first sample print-out using the ePOS-Print API and a second sample print-out using the ePOS-Print-Canvas API. As illustrated, the ePOS-Print-Canvas API is preferably used to print graphics.

Figure 15:
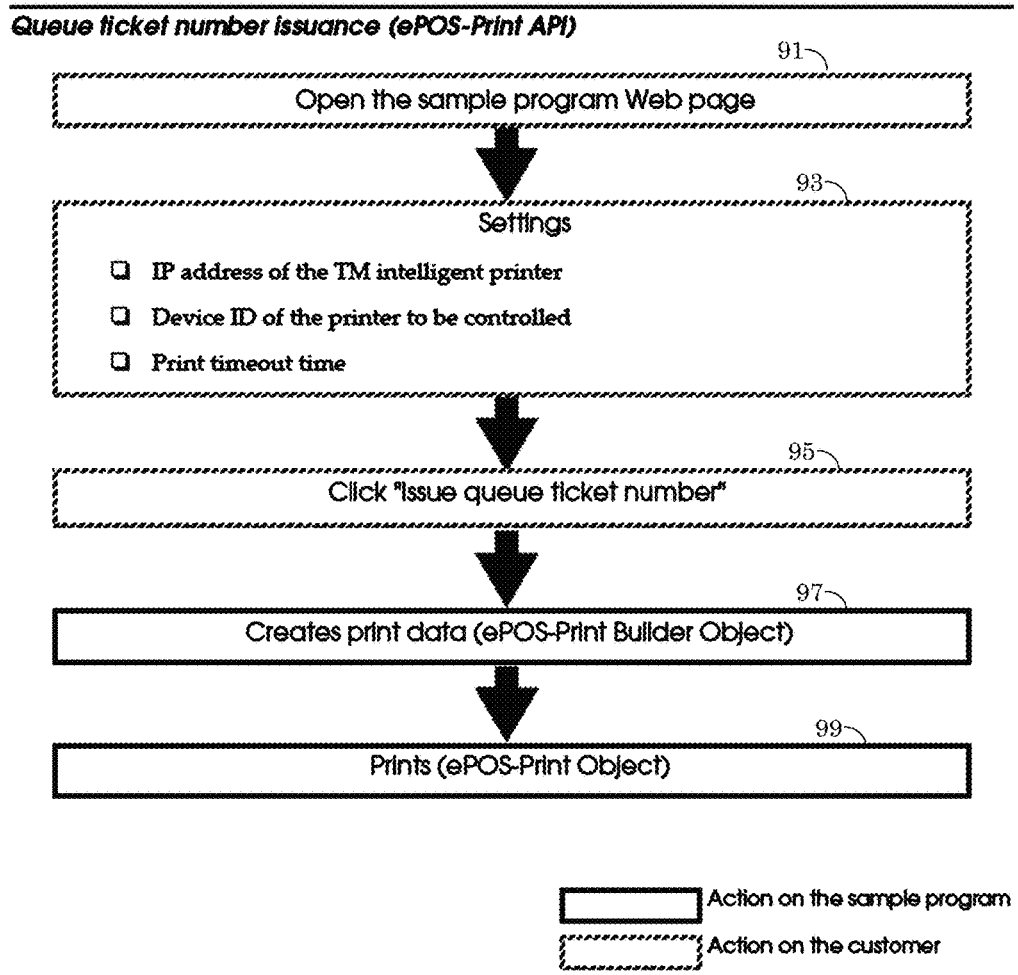
FIG. 15 shows a sample flow chart illustrating a process step flow from its initial display state up to print job completion.

FIG. 15 shows a sample flow chart illustrating a process step flow from its initial display state up to print job completion. This is an example of queue ticket number issuance printed using the ePOS-Print API. The process begins by opening the web application (i.e., the sample program web page), step 91. The settings are then entered, step 93. Some settings may include the IP address of the TM intelligent printer, the device ID of the printer to be controlled and a (print) timeout time. The proper queue ticket is crated by selecting (i.e., clicking) an "Issue queue ticket number" option, as illustrated by step 95. An ePOS-Print Builder Object may then be called to create the print data (step 95). The ePOS-Print Object then creates the prints (step 99).

Figure 16:
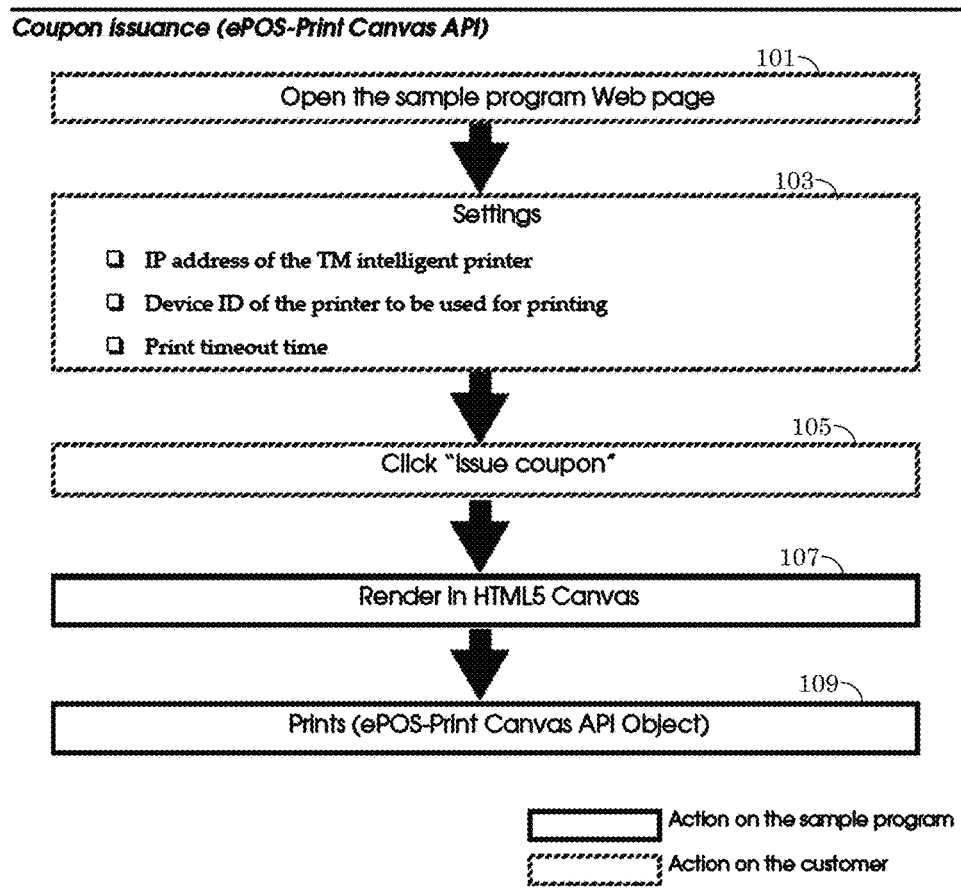
FIG. 16 shows a sample flow chart illustrating a process step flow for coupon issuance.

FIG. 16 shows a sample flow chart illustrating a process step flow for coupon issuance. This is an example of the ePOS-Print Canvas API. The process flow begins by opening the web page in accord with the present invention (step 101). If needed, one may enter settings (step 103). Example of settings are the IP address of the TM intelligent printer, the device ID of the printer to be used for printing, and a print timeout time. One then clicks (i.e., actuates/selects) an "issue coupon" option (step 105). The web page then renders the coupon in HTML5 Canvas (step 107). Finally in step 109, the web page issues a print request to the TM intelligent printer (i.e., intelligent module) using the ePOS-Print Canvas API (i.e., the ePOS-Print Canvas API Object).

Figure 17:
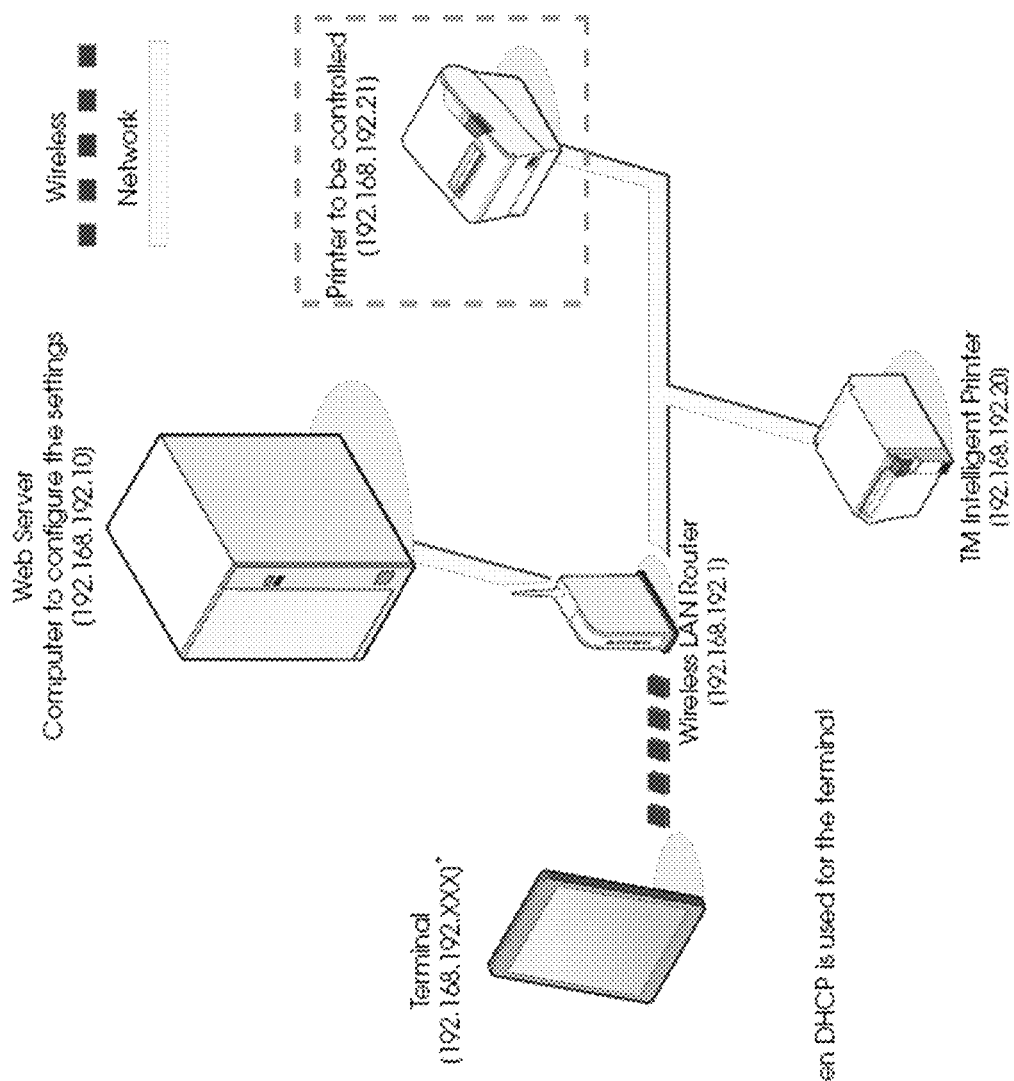
FIG. 17 is an example of an operating environment in accord with the present invention.

FIG. 17 is an example of an operating environment in accord with the present invention. Basically, FIG. 17 provides a system configuration diagram for some sample programs discussed below. FIG. 17 shows a web server with a fixed IP address of (192.168.192.10). The web server may configure the environment settings. The web server communicates directly with a wireless LAN router, which may have a fixed IP address of, for example, (192.168.192.1). The wireless LAN router provides a communication path (such as a wired connection) between the TM Intelligent Printer (which may have a fixed IP address of, for example (192.168.192.20)) and an optional second printer that may be controlled by the TM Intelligent Printer. Preferably, the optional second printer also has a fixed IP address of, for example (192.168.192.21). In the present implementation, the wireless LAN router provides a wireless communication link to a terminal that has an HTML5-supported web browser, and on which the web page in accord with the present invention may be executed. In the present example, the terminal has a dynamic network address (illustrated as (192.168.192.XXX)), and which can be issued by DHCP. For example, the wireless LAN router may issue an IP address to the terminal by DHCP.

Figure 18:
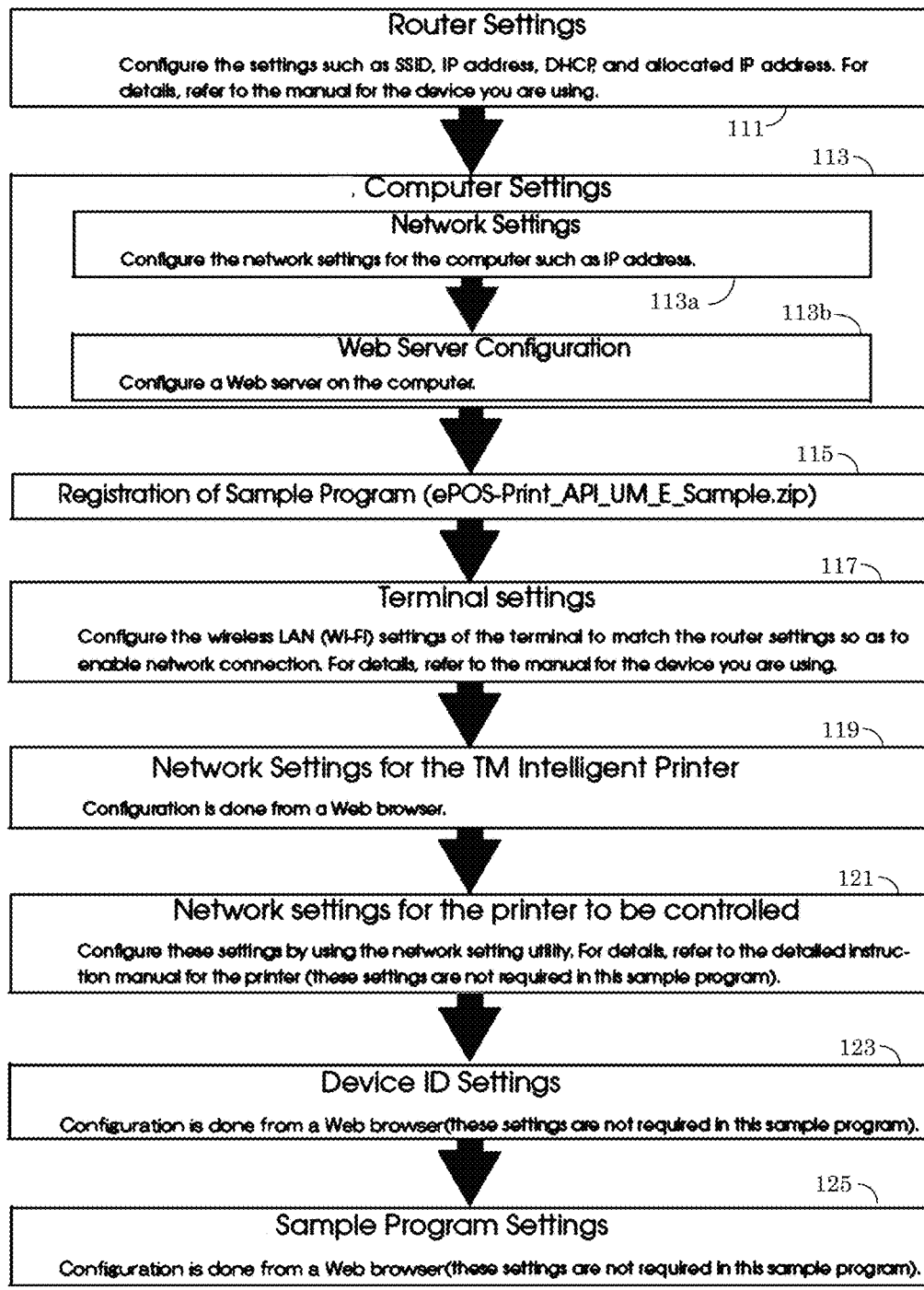
FIG. 18 shows a process flow for configuring the environment settings for a sample program.

FIG. 18 shows a process flow for configuring the environment settings for a sample program. In step 111, one begins by configuring the router settings, such as SSID, IP address, DHCP, and allocated IP address. Next in step 113, one configures the computer settings. This may be divided into a first sub-step 113a of configuring the network settings for the computer, such as the IP address, and a second sub-step 113b of configuring the web server on the computer. In step 115, one registers the program to execute. In the present example, a sample program called ePOS-Print_API_UM_E_Sample is registered. One then provides terminal settings (step 117), such as configuring the wireless LAN (Wi-Fi) settings of the terminal to match the router settings so as to enable network connection. In step 119, the network settings for the TM Intelligent Printer are configured. This may be done via a web browser. Next in step 121 the network settings for the printer to be controlled are configured. These settings may be configured by using a network setting utility, as is known in the art. Optional device ID Settings are provided in step 123. These settings may be configured via a web browser, but are not required in the present sample program. Finally in step 125, any needed program settings may be configured via a web browser. It is noted that no program settings are needed in the present sample program.

Figure 19:
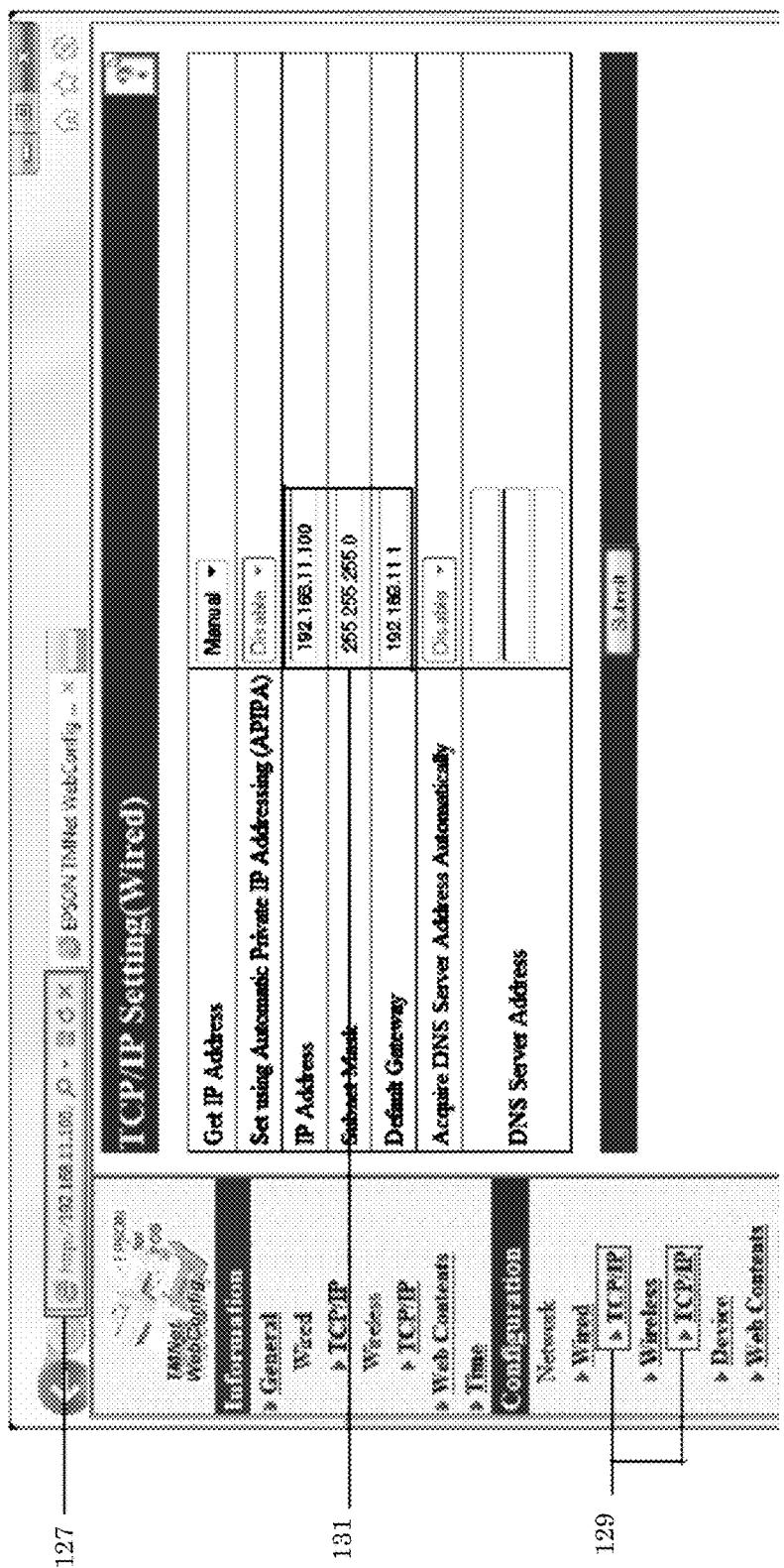
FIG. 19 is an example of Network Settings for the TM Intelligent Printer.

FIG. 19 is an example of Network Settings for the TM Intelligent Printer. One may begin by starting the web browser and entering the IP address of the TM intelligent printer interface into the address bar 127. One may then select a configuration, such as wired TCP/IP or wireless TCP/IP, as illustrated by 129. The "TCP/IP Setting" screen then appears and one configures the network settings for the TM intelligent printer, as illustrated by 131. To test the IP address, one may submit a status sheet using the TM intelligent printer.

Figure 20:
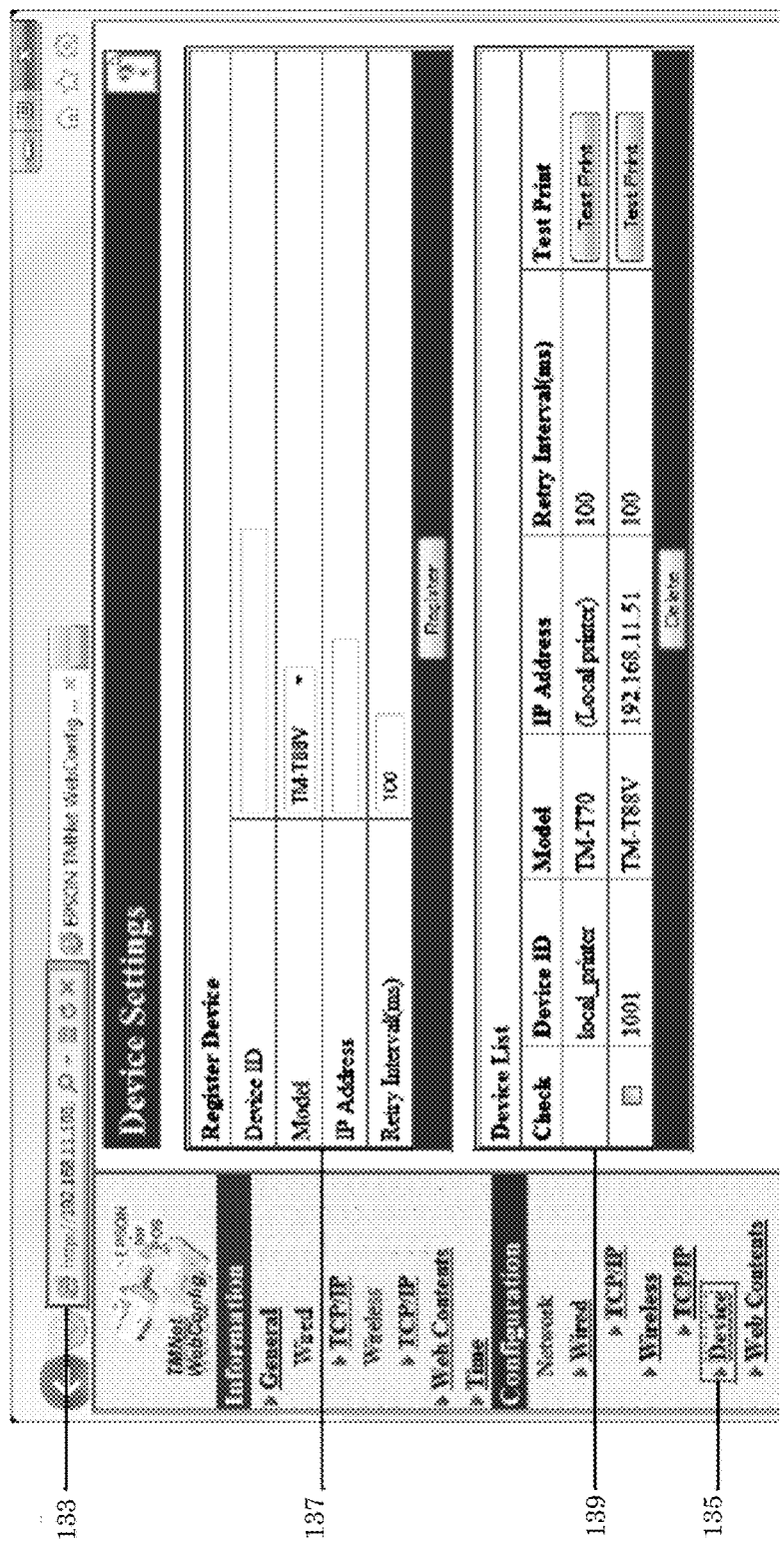
FIG. 20 is an example of device settings.

FIG. 20 is an example of device settings. For example, one may set the ID of the printer to be controlled by ePOS-Print into the TM intelligent printer. On may use the web browser to enter the IP address of the TM Intelligent Printer (133). One then selects device to configure (135). A "Device Settings" screen 137 appears. FIG. 21 shows examples of devices settings that may be configured. Information 139 on the registered devices is displayed.

Execution of the above configuration and registration sequence will result in the sample program screen of FIG. 12.

Next is discussed a guide for programming using ePOS print, i.e., using print APIs in accord with the present invention.

Preferably, there are two types of print modes: standard mode and page mode. In standard mode, characters are printed line by line. The line feed space is adjusted based on the font size and the height of images, i.e., barcodes, etc. The standard mode is suitable for printing receipts, or other types of printing that require the paper length to change according to the print space.

In page mode, a print area is set (i.e., defined), data is laid out in it, and the data is printed in a batch operation. For example, characters, images, and barcodes may be laid out in the print area by position coordinates, the resultant print area is then printed in a batch operation.

Figure 22:
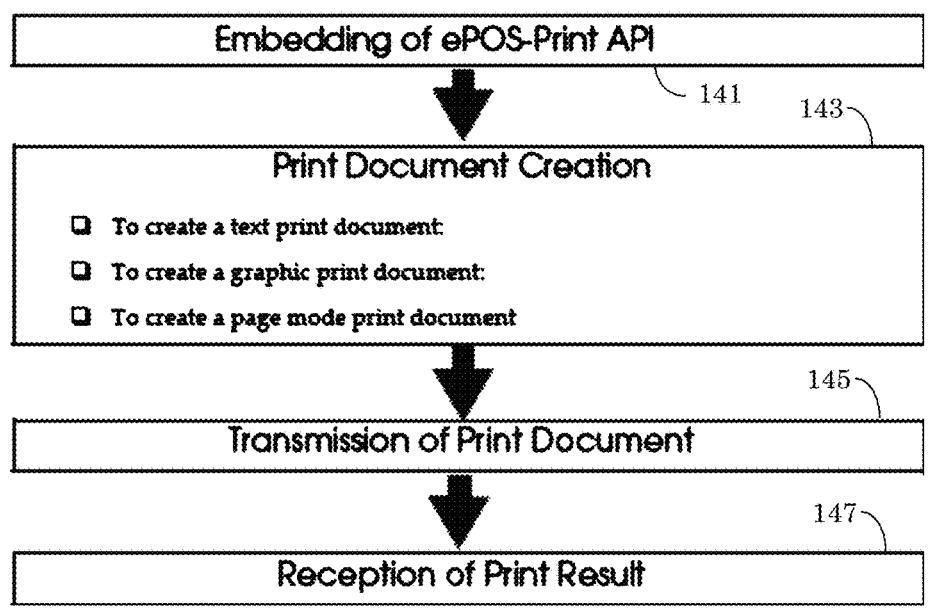
FIG. 22 show a sample work flow for programming using the ePOS-Print API.

FIG. 22 show a sample work flow for programming using the ePOS-Print API. A first step 141 is to embed the ePOS-Print API in a web page. Preferably, the ePOS-Print API is provided as JavaScript, and may follow the following file naming convention: "epos-print-2.x.x.js". That is, the ePOS-Print API is provided so that ePOS-Print can be used as a JavaScript on a client device. The ePOS-Print API is used by embedding epos-print-2.x.x.js into applications (such as web pages). To use the ePOS-Print API, epos-print-2.x.x.js is placed (i.e., provided) on the Web server, and distributed to clients. For example, the ePOS-Print API script may be embedding into a web page by using the HTML <script> tags. FIG. 23 shows an example of using the HTML <script> tag to embed an ePOS-Print API.

The next step 143 is to create the document that is to be printed. A print document may be created using an ePOS-Print Builder object. For example, an ePOS-Print Builder object is created using the constructor for it, and the print document is created using the object's methods. The print document may be acquired using a toString method, or other print API methods/functions, as listed below. FIG. 24 shows an example a program code segment for creating a print document.

To create a text print document, one stores the font settings into the command buffer using text methods and then creates the print document. FIG. 25 illustrates a sample script code for creating a text print document. The sample script code uses a font called FontA, sets a text scale of x4 horizontal and x4 vertical, and sets the style to Bold. The result of the sample script is to create a print document with the text, "Hello World" with the specified text settings.

FIG. 26 provides sample script code creating a graphic print document. More specifically, the sample script code creates a print document for the image file logo.bmp. Basically, it describes one way of printing a raster image. Another method of printing graphics registered in non-volatile memory within a printer is discussed below. To create the graphic print document in the present example, a raster image obtained by rendering an image in HTML5 Canvas is stored into the command buffer using an addImage method.

Another method for creating a print document, as illustrated in step 143 of FIG. 22 is to create a page mode print document. FIG. 27 illustrates sample code for creating a page mode print document. The examples adds the phrase, "Hello world" to a print region. The following example uses an addPageBegin method. When the addPageBegin method is stored in the command buffer, the page mode starts. The print area is stored into the command buffer (by means of an addPageArea method), and the print start position is stored (by means of an addPagePosition method) into the command buffer. The print start position is then specified according to the print data. The methods are then stored into the command buffer to create the print data. For the end of page mode, a PageEnd method is stored into the command buffer.

Returning to FIG. 22, following the print document creation step 143, is a step 145 for transmitting the created print document. FIG. 28 provides sample code for transmission of a print document. In the present example, a print document is sent using an ePOS-Print object. The ePOS-Print object may be created using the constructor and the end point address for the printer to be used for printing as well as the print document may be specified (i.e., input) into a send method to send the document. FIG. 29 provides a table with details about the printer end point address.

Figures 32, 33:
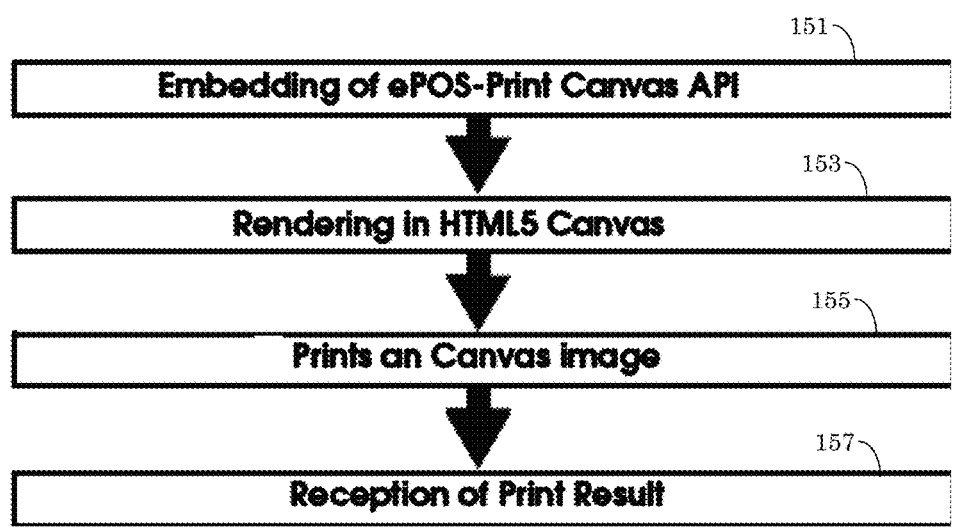
FIG. 32 illustrates the use of the status event notification function to check the printer status without printing.
FIG. 33 illustrates a workflow for programming using ePOS-Print-Canvas API.

As shown in FIG. 22, the last step 147 is reception of the print data. The print result can be received by setting a callback function using an onreceive property (discussed below) of the ePOS-Print object. FIG. 30 provides sample code for implementing a callback function. Examples of the information that may be obtained include the print result, error codes, and printer status. FIG. 31 provides an example of an error handling method for a callback function. FIG. 32 illustrates the use of the status event notification function to check the printer status without printing.

FIG. 33 illustrates a workflow for programming using ePOS-Print-Canvas API, like in the case of ePOS-Print API, ePOS-Print-Canvas API begins with a step 151 of embedding the ePOS-Print-Canvas API into a web page. FIG. 34 shows sample code for embedding an ePOS-Print-Canvas API. For illustration purposes, the ePOS-Print-Canvas API is shown as JavaScript, and preferably follows the naming convention: "epos-print-2.x.x.js". The ePOS-Print-Canvas API may be maintained (i.e., placed/kept/stored) in the web server and then distributed to clients for embedding into their applications (i.e., web pages). As shown in the FIG. 34, the ePOS-Print-Canvas API may be embedded into a web application by using HTML <script> tags.

The next step 153 in FIG. 33 is to render in HTML5-Canvas. FIG. 35 provides sample code for rendering in HTML5-Canvas. The next step 155 is to print the rendered canvas image. FIG. 36 provides sample code for transmitting a print document for printing. To print the content drawn HTML5-Canvas using the ePOS-Print Canvas API, an ePOS-Print Canvas API object is created using the constructor. To use the Print method, one specifies the end point address for the printer to be used for printing as well as the canvas content and whether to select paper cut, and then the document is print.

Figure 37:
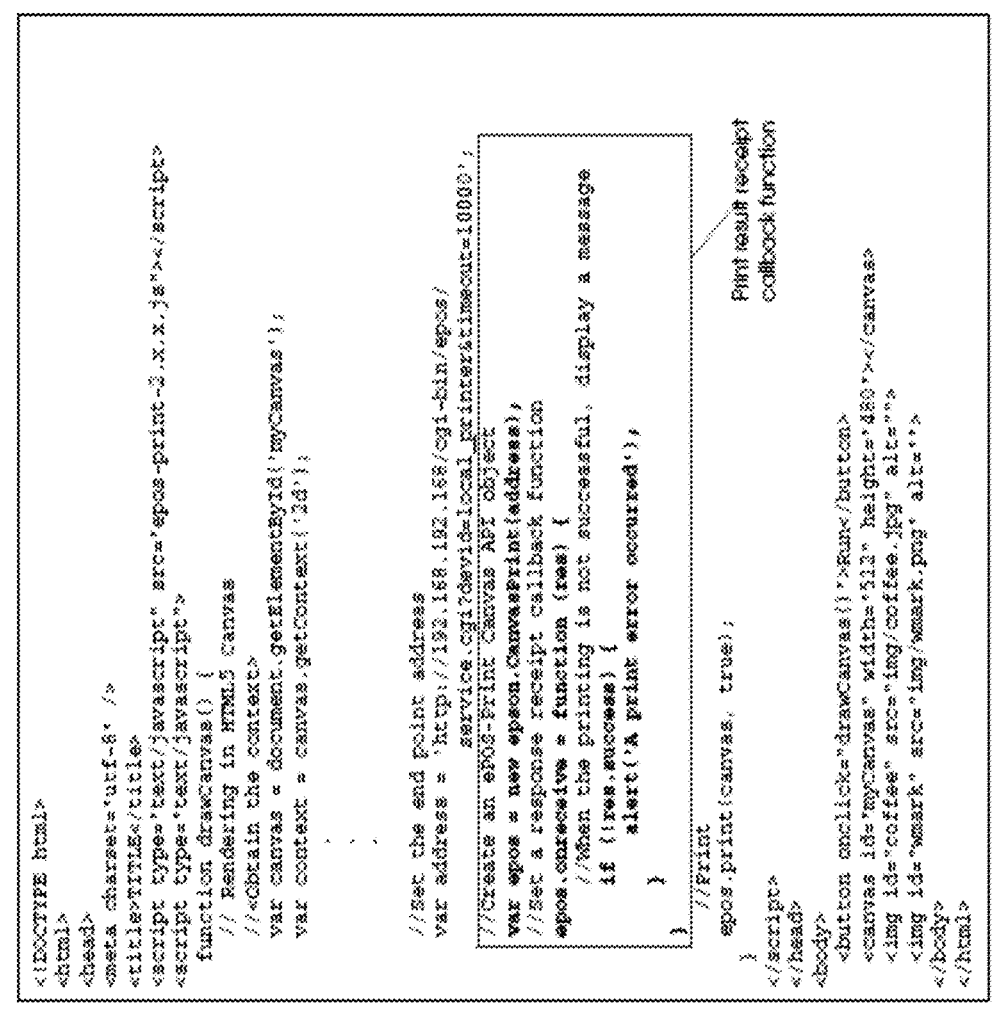

The TM intelligent printer (i.e., the intelligent module) receives the transmission, as indicated by step 157. FIG. 37 shows sample code for printing a result receipt and callback function. As before, the print result can be received by setting a callback function using the onreceive property of the ePOS-Print Canvas API object. In this manner, one can obtain information on the print result, error code and printer status. FIG. 38 provides sample code for error handling by a callback function. Thus, the status event notification function can be used to check the printer status without printing, as shown in the sample code of FIG. 39.

As is mentioned above, the ePOS-Print API provides many methods for creating a print document. FIGS. 40, 41, 42a and 42b list some of the methods and components of the ePOS-Print API as defined by an ePOSBuilder object.

As it would be understood by one versed in the art, a new ePOS-Print Builder object is created and initialized by means of a contractor, an the object can then be used to create a print document for printing control commands that specify strings or graphics to be printed, paper cut, etc. Preferably, this constructor follows the following syntax: "ePOSBuilder( );". FIG. 43 provides sample code for the constructor of an ePOS-Print Builder object.

The syntax for adding text alignment settings to the command buffer may follow syntax: addTextAlign(align), where "align" specifies the type of alignment. FIG. 44 provides examples of types of alignment parameters. FIG. 45 provides the return value for the ePOS-Print Builder object, and FIG. 46 illustrates exception error. FIG. 47 provides sample code illustrating the use of text alignment.

The method to add a line feed space setting to the command buffer preferably follows the syntax: addTextLineSpace(linespc). Parameter "linespc" specifies the line feed space (in dots), and preferably an integer in the range from 0 to 255. FIG. 48 provides sample code to set the line feed space to 30 dots.

The method to add a text rotation setting to the command buffer preferably follows the following syntax: addTextRotate(rotate), where "rotate" is a Boolean that specifies whether to rotate text. FIG. 49 illustrates Boolean values for the rotate parameter. FIG. 50 provides sample code to set text rotation.

The method to add the printing of text to the command buffer preferably follows the syntax: addText(data), where the parameter "data" is the character string to be printed. Nonprintable characters, such as horizontal tab and line feed may use escape sequences, as illustrated in FIG. 51. FIG. 52 provides sample code illustrating the use of addText(data).

The method to add the language setting to the command buffer preferably follows the syntax: addTextLang(lang), where parameter "lang" is a string that specifies the target language. FIG. 53 provides examples of parameter "lang" to designate a target language. FIG. 54 provides sample code illustrating the use of method addTextLang(lang).

The method to add the text font setting to the command buffer preferably follows syntax: addTextFont(font), wherein parameter "font" is a string that specifies a desired font. FIG. 55 illustrates sample values for the font parameter, and FIG. 56 provides sample code illustrating the use of the addTextFont(font) method.

The method to add the smoothing setting to the command buffer preferably follows syntax: addTextSmooth(smooth), where parameter "smooth" is a Boolean that specifies whether to enable smoothing. FIG. 57 illustrates possible values for parameter "smooth", and FIG. 58 provides sample code illustrating the use of method addTextSmooth(smooth).

The method to add the double-sized text setting to the command buffer preferably follows syntax: addTextDouble(dw, dh), where dw is an optional Boolean parameter that specifies the double-sized width and dh is an optional Boolean parameter that specifies the double-sized height. FIG. 59 describes parameter values for dw, and FIG. 60 describes parameter values for dh. FIG. 61 provides sample code to set the text size to double width and double height.

The method to add the text scale setting to the command buffer preferably follows syntax: addTextSize(width, height), where parameter "width" is an optional number parameter that specifies the horizontal scale of text and parameter "height" is an optional number parameter specifies the vertical scale of text. FIG. 62 illustrates possible values for parameter "width" and FIG. 63 illustrates possible values for parameter "height". FIG. 64 shows sample code to set a horizontal scale of x4 and a vertical scale of x4.

The method to add the text style setting to the command buffer preferably follows syntax: addTextStyle(reverse, ul, em, color), where "reverse" is an optional Boolean parameter that specifies whether to inversion the black and white for text, "ul" is an optional Boolean parameter that specifies an underline style, "em" is an optional Boolean parameter that specifies a bold style, and "color" is an optional string parameter that specifies the color. FIG. 65 shows possible values for parameter "reverse". FIG. 66 shows possible values for parameter "ul". FIG. 67 shows possible values for parameter "em". FIG. 68 shows possible values for parameter "color". FIG. 69 provides sample code to set the underline style.

The method to add the horizontal print start position of text to the command buffer preferably follows syntax: addTextPosition(x), where "x" is a number parameter that specifies the horizontal print start position (in dots) and is an integer in the range from 0 to 65535. FIG. 70 shows sample code to set the print position at 120 dots from the left end.

The method to add paper feeding in dots to the command buffer preferably follows syntax: addFeedUnit(unit), where "unit" is a number parameter that specifies the paper feed space (in dots) and is an integer in the range from 0 to 255. FIG. 71 shows sample code to feed paper by 30 dots.

The method to add paper feeding in lines to the command buffer preferably follows syntax: addFeedLine(line), where "line" is an integer number parameter that specifies the paper feed space (in lines) and in the range from 0 to 255. FIG. 72 shows sample code to feed paper by 3 lines.

The method to add a line feed to the command buffer preferably follows syntax: addFeed( ). FIG. 73 shows sample code to start a new line after printing a character string.

The addImage method adds raster image printing to the command buffer, and prints graphics rendered in HTML5-Canvas. The method further converts the specified range in a RGBA full-color image of HTML5-Canvas into raster image data according to the settings of the halftone and brightness properties. It is assumed that one pixel in an image equals to one printer dot, and when an image contains any transparent color, the background color of the image is assumed to be white. Preferably it follows syntax: addImage (context, x, y, width, height, color, mode), where "context" is context parameter that specifies the 2D context of HTML5-Canvas, "x" is an integer number in the range from 0 to 65535 and specifies the horizontal start position in the print area, "y" is an integer number in the range from 0 to 65535 and specifies the vertical start position in the print area, "width" is an integer number in the range from 0 to 65535 and specifies the width of the print area, "height" is an integer number in the range from 0 to 65535 and specifies height of the print area, "color" is an optional string parameter that specifies color (FIG. 74 shows sample values for parameter "color" within the addImage method.), and "mode" is an optional string parameter that specifies the color mode (FIG. 75 shows sample values for parameter "mode" within the addImage method.). FIG. 76 provides sample code to print an image 300 dots wide and 300 dots high in page mode.

The method to add NV logo printing to the command buffer preferably follows syntax addLogo(key1, key2). This method prints a logo that is already registered in the NV memory of a printer. Parameter key1 is a number that specifies a first key code 1 of an NV logo and is preferably an integer in the range from 0 to 255. Parameter key2 is a number that specifies a second key code 2 of an NV logo and is preferably an integer in the range from 0 to 255. FIG. 77 shows sample code illustrating the use of the addLogo method.

The method to add barcode printing to the command buffer preferably follows syntax: addBarcode(data, type, hri, font, width, height). Parameter "data" is string that specifies the barcode data as a string. Parameter "type" is a string that specifies the barcode type. FIGS. 78 to 81 provide examples of barcode types. Parameter "hri" is an optional string parameter that specifies the HRI position. FIG. 82 illustrates some possible values for the hri parameter. Parameter "font" is an optional string that specifies the HRI font. Parameter "width" is an optional integer number that specifies the width of each module in dots and is preferably in the range from 2 to 6. Parameter "height" is an optional integer number that specifies the barcode height in dots and is preferable in the range from 1 to 255. FIG. 83 provides sample code illustrating how to print barcodes.

The method to add two-dimensional symbol printing to the command buffer preferably follows syntax: addSymbol (data, type, level, width, height, size). Parameter "data" is preferably a string that specifies two-dimensional (2D) symbol data as a character string. FIGS. 84 and 85 provide examples of 2D-Code type descriptions for parameter "data" within the addSymbol method. Parameter "type" is string that specifies the two-dimensional symbol type. FIG. 86 provides sample values for parameter "type" within the addSymbol method. Parameter "level" is a string that specifies the error correction level. FIG. 87 provides sample values for parameter "level" within the addSymbol method.

The "width" parameter is an integer number in the range from 0 to 255 that specifies the module width. The "height" parameter is an integer number in the range from 0 to 255 that specifies the module height. The "size" parameter is an integer number in the range from 0 to 65535 that specifies the two-dimensional symbol maximum size. FIG. 88 provides sample code to print two-dimensional symbols.

The method to add horizontal line printing to the command buffer to draw horizontal lines preferably follows syntax addHLine(x1, x2, style), where parameter x1 is an integer number in the range from 0 to 65535 and specifies the start position of the horizontal line (in dots), parameter x2 is an integer number in the range from 0 to 65535 and specifies the end position of the horizontal line (in dots), and parameter style is a string that specifies the line type. FIG. 89 illustrates some style parameters for the addHline method. FIG. 90 shows sample code to draw double horizontal lines at a position between 100 dots and 200 dots from the left end and at a position between 400 dots and 500 dots from the left end.

The method to add the beginning of a vertical line to the command buffer (i.e., to starts the drawing of vertical lines) follows syntax addVLineBegin(x, style), where parameter x is an integer number in the range from 0 to 65535 and specifies the start position of the vertical line (in dots), and parameter "style" is an optional string that specifies the line type. FIG. 91 provides examples of parameter style for the addVLineBegin method. FIG. 92 provides sample code to draw thin vertical lines at 100 dots and 200 dots from the left end.

The method to add the end of a vertical line to the command buffer (i.e., to finish drawing vertical lines) follows syntax addVLineEnd(x, style), where parameter x is an integer number in the range from 0 to 65535 and specifies the end position of the vertical line (in dots), and parameter "style" is an optional string that specifies the type of line one wants to finish drawing. FIG. 91 provides examples of parameter style for the addVLineEnd method. FIG. 94 provides sample code to draw thin vertical lines at 100 dots and 200 dots from the left end.

The method to add the switching to page mode to the command buffer (i.e., to start the page mode process) follows syntax addPageBegin( ). The method to add the end of page mode to the command buffer (i.e., to end the page mode process) follows syntax addPageEnd( ). FIG. 95 shows sample code to print characters "ABCDE" in page mode.

Method addPageArea(x, y, width, height) adds the print area in page mode to the command buffer to specify the print area in page mode (coordinates). After this API function, a print data API function (such as the addText method) should be specified. Parameter "x" is an integer in the range from 0 to 65535 and specifies the origin of the horizontal axis (in dots), where 0 is the left end of the printer's printable area. Parameter "y" is an integer in the range from 0 to 65535 and specifies the origin of the vertical axis (in dots), where 0 is the position in which no paper feed has been performed. Parameter "width" is an integer number from 0 to 65535 that specifies the width of the print area (in dots). FIG. 96 shows sample code to specify the print area with the origin (100, 50), a width of 200 dots, and a height of 30 dots and print the characters "ABCDE".

The method to add the page mode print direction setting to the command buffer (i.e., to specify the print direction in page mode) follows syntax addPageDirection(dir). This function may be omitted if rotation is not required. Parameter "dir" is a string that specifies the print direction in page mode. FIG. 97 provides some examples for parameter "dir" of method addPageDirection. FIG. 98 provides sample code to print characters "ABCDE" by rotating them 90 degrees clockwise.

The method to add the page mode print-position-set area to the command buffer (i.e., to specify the print start position (coordinates) in the area specified by the addPageArea method) has syntax addPagePosition(x, y). Parameter x is an integer number from 0 to 65535 that specifies the horizontal print position (in dots). Parameter y is an integer number from 0 to 65535 that specifies the vertical print position (in dots). FIG. 99 shows sample code to specify (50,30) for the print start position in the area specified by the addPageArea method and print the characters "ABCDE".

The method to add line drawing in page mode to the command buffer (i.e., draws a line in page mode) follows syntax addPageLine(x1, y1, x2, y2, style). Parameter x1 is an integer number from 0 to 65535 that specifies the horizontal start position of the line (in dots). Parameter y1 is an integer number from 0 to 65535 that specifies the vertical start position of the line (in dots). Parameter x2 is an integer number from 0 to 65535 that specifies the horizontal end position of the line (in dots). Parameter y2 is an integer number from 0 to 65535 that specifies the vertical end position of the line (in dots). Parameter "style" is a string that specifies the line type. FIG. 100 provides examples of the "style" parameter in method addPageLine. FIG. 101 provides sample code to draw a thin solid line between start position (100, 0) and end position (500, 0).

The method to add a rectangle drawing in page mode to the command buffer (i.e., to draw a rectangle in page mode) follows syntax addPageRectangle(x1, y1, x2, y2, style). Parameter x1 is an integer number from 0 to 65535 and specifies the horizontal start position of the line (in dots). Parameter y1 is an integer number from 0 to 65535 and specifies the vertical start position of the line (in dots). Parameter x2 is an integer number from 0 to 65535 and specifies the horizontal end position of the line (in dots). Parameter y2 is an integer number from 0 to 65535 and specifies the vertical end position of the line (in dots). Parameter "style" is a string that specifies the line type. FIG. 102 provides examples of the "style" parameter in method addPageRectangle. FIG. 103 shows sample code to draw a rectangle with a thin double line, with the start position (100, 0) and the end position (500, 200) as its vertexes.

The method to add paper cut to the command buffer (i.e., to set/actuate) paper cut) follows syntax addCut(type), where parameter "type" is a string that specifies the paper cut type. FIG. 104 shows sample types for method addCut. FIG. 105 provides sample code to perform a feed cut operation.

The method to add a drawer kick to the command buffer has syntax addPulse(drawer, time). Parameter "drawer" is a string that specifies the drawer kick connector. FIG. 106 shows examples of parameter "drawer" for method addCut. Parameter "time" is an optional parameter string that specifies the ON time (i.e., duration) of the drawer kick signal. FIG. 107 shows examples of parameter "time" for method addCut. FIG. 108 show sample code to send a 100 msec pulse signal to pin "2" of a drawer kick connector.

The method to add the turning ON of the buzzer to the command buffer (i.e., to set the buzzer) follows syntax addSound(pattern, repeat). Parameter "pattern" is an optional string that specifies the buzzer pattern. FIG. 109 show examples of buzzer patterns. Parameter "repeat" is an optional string specifies the number of repeats. FIG. 110 shows examples of how to set parameter "repeat" in method addSound. FIG. 111 shows sample code to repeat a sound pattern "A" three times.

The method to add commands to the command buffer (i.e., to send ESC/POS commands) has syntax addCommand (data), where "data" is an optional string that specifies ESC/POS command as a character string.

The method to obtain a print document generated by an ePOS-Print Builder object has syntax toString( ). FIG. 112 shows sample code illustrating the use of method to String( ).

A halftone property is implemented by means of a halftone processing method, whose object type is "string". FIG. 113 shows the specifying of the halftone processing method to be applied to monochrome (two-tone) printing. The default value is HALFTONE_DITHER. FIG. 114 shows sample code to set the halftone type as error diffusion.

Brightness correction may be set by setting a gamma value. A gamma value in the range 0.1 to 10.0 is specified (i.e., available) for the brightness correction value. FIG. 115 provides sample code to set brightness as 2.2.

Commands, which are usually added by methods of the ePOS-Print Builder object, can be operated directly from this property for addition or deletion. FIG. 116 provides sample code to clear the command buffer and reset it to the initial state.

The constructor for an ePOS-Print object creates a new ePOS-Print object and initializes it. The method to send a print document created using an ePOS-Print Builder object to control the printer and monitor the transmission result or the communication status has syntax ePOSPrint(address), where "address" is a optional string that specifies the URL (i.e., network address) of the printer to which a print document is sent. FIG. 117 provides sample code illustrating the use of ePOSPring(address).

The send method sends a print document created using an ePOS-Print Builder object. It has syntax send(request), where "request" is a string that specifies print document. FIG. 118 provides sample code illustrating the use of the send(request) method.

The open method enables status event operation. It sends the status of the printer specified by the address property using an event, and updates the status at the interval specified by an interval property. It has the syntax open( ). FIG. 119 provides sample code illustrating the use of the open( ) method.

The close( ) method disables status event operation. FIG. 120 provides sample code illustrating the use of the close( ) method.

The address property is used to specify URL of the printer to be used for printing. FIG. 121 provides an example of the use of the address property.

The enabled property is a Boolean value that retains the enabled/disabled setting for status event operation. The enabled/disabled setting for status event operation is retained using a logical value. This is read-only. The default value is false. FIG. 122 provides an example of using the enabled property.

The interval property specifies the interval of upgrading the status. The interval of upgrading the status is specified in milliseconds. It has a default value of 3000 ms (three seconds), and a minimum value of 1000 ms (one second or longer). When an invalid value is specified, it is assumed to be 3000 ms. FIG. 123 provides an example of using the interval property.

The status property provides the status of a printer. This is the status last obtained from the printer, and is read-only. FIG. 124 provides an example of using the status property.

An onreceive event is a property that registers the callback function and obtains a response message receipt event. It has syntax: Function(response). The parameter of the callback function include: a response as a parameter, response message as name and object as object type. FIG. 125 shows some properties of the response object. FIG. 126 shows value of success. FIG. 127 shows value of code. FIG. 128 shows value of status. FIG. 129 shows sample code to create and send a print document, and to display the print result in a message box.

The onerror event property registers the callback function and obtains a communication error event. It has syntax: Function (error). FIG. 130 lists some properties of the error object. FIG. 131 shows sample code to create and send a print document and to display the HTTP status code in a message box when a communication error occurs.

The onstatuschange event registers a callback function to obtain a status change event. It has syntax: Function (status). FIG. 132 provides an example of using the onstatuschange property.

The ononline event registers a callback function to obtain an online event. It has syntax: Function ( ). FIG. 133 provides an example of using the ononline property.

The onoffline event registers a callback function to obtain an offline event. Its syntax is also Function ( ). FIG. 134 provides an example of using the onoffline property.

The onpoweroff event registers a callback function to obtain a non-response event. Its syntax is also Function ( ). FIG. 135 provides an example of using the onpoweroff event.

The oncoverok event registers a callback function to obtain a cover close event. Its syntax is also Function ( ). FIG. 136 provides an example of using the oncoverok event.

The oncoveropen event registers a callback function to obtain a cover open event. Its syntax is also Function ( ). FIG. 137 provides an example of using the oncoveropen event.

The onpaperok event registers a callback function to obtain a paper remaining event. Its syntax is also Function ( ). FIG. 138 provides an example of using the onpaperok event.

The onpapernearend event registers a callback function to obtain a paper near end event. Its syntax is also Function ( ). FIG. 139 provides an example of using the onpapernearend event.

The onpaperend event registers a callback function to obtain a paper end event. Its syntax is also Function ( ). FIG. 140 provides an example of using the onpaperend event.

The ondrawerclosed event registers a callback function to obtain a drawer close event. Its syntax is also Function ( ). FIG. 141 provides an example of using the ondrawerclosed event.

The ondraweropen event registers a callback function to obtain a drawer open event. Its syntax is also Function ( ). FIG. 142 provides an example of using the ondraweropen event.

The following a discussion of some ePOS-Print-Canvas API functions. FIG. 143 provides a list of some components of the ePOS-Print-Canvas API.

The ePOS-Print-Canvas API object prints a print image rendered in HTML5-Canvas and monitors the print result or the communication status. A constructor for an ePOS-Print Canvas API object is used to create a new ePOS-Print Canvas API object and initializes it. The syntax is CanvasPrint(address), where "address" is an optional string that specifies an address property (URL of printer to be used for printing). FIG. 144 is sample code illustrating the creation of a new ePOS-Print-Canvas API object.

The print method prints an image rendered in HTML5-Canvas. It converts a specified range in an RGBA full-color image of HTML5-Canvas into a raster image data according to the settings of the halftone and brightness properties. One pixel in an image equals to one printer dot. When an image contains any transparent color, the background color of the image is assumed to be white. The print method has syntax: print(canvas, cut, mode). Parameter "canvas" specifies the HTML5-Canvas object to be printed. Parameter "cut" is an optional Boolean that sets whether to cut paper. FIG. 145 shows examples of parameter "cut". Parameter "mode" is an optional string that specifies the color mode. FIG. 146 shows examples of parameter "mode". FIG. 147 provides sample code to print Canvas(ID='myCanvas').

The open method Enables status event operation. It sends the status of the printer specified by the address property using an event, and updates the status at an interval specified by an interval property. It has syntax open( ). FIG. 148 is sample code illustrating the use of the open( ) method.

The close method disables status event operation. It has syntax: close( ). FIG. 149 is sample code illustrating the use of the close( ) method.

The address property specifies the URL of the printer to be used for printing. FIG. 150 is sample code illustrating the use of the address property.

The enabled property retains the enabled/disabled setting for status event operation. It is a Boolean type, and the enabled/disabled setting for status event operation is retained using the logical Boolean value. This is read-only, and the default value is false. FIG. 151 is sample code illustrating the use of the enabled property.

The interval property specifies the interval of upgrading the status. The interval of upgrading the status is specified in milliseconds. The default value is 3000 ms (three seconds), and it has a minimum value of 1000 ms (one second or longer). When an invalid value is specified, it is assumed to be 3000 ms, by default. FIG. 152 is sample code illustrating the use of the interval property.

The status property provides the status of the printer. This is the status last obtained from the printer. It is read-only, and has a default value of 0. FIG. 153 is sample code illustrating the use of the status property.

The halftone processing method specifies the halftone property applied to monochrome (two-tone) printing. The default value is HALFTONE_DITHER. FIG. 154 illustrates some halftone properties. FIG. 155 is sample code illustrating the use of the halftone property.

The brightness property is set using a gamma value. More specifically, a gamma value in the range 0.1 to 10.0 is specified as a brightness correction value. The default value is 1.0. FIG. 156 is sample code illustrating the setting of the brightness property.

The onreceive event is a property that registers the callback function and obtains a response message receipt event. It has syntax: Function(response). The parameter of the callback function include: a response as a parameter, response message as name and object as object type. FIG. 157 shows some properties of the response object. FIG. 158 shows value of success. FIG. 159 shows value of code. FIG. 160 shows value of status. FIG. 161 shows sample code to print Canvas(ID=myCanvas), and to display the print result in a message box.

The onerror event property registers the callback function and obtains a communication error event. It has syntax: Function (error). FIG. 162 lists some properties of the error object. FIG. 163 shows sample code to print Canvas (ID=myCanvas), and to display the HTTP status code in a message box when a communication error occurs.

The onstatuschange event registers a callback function to obtain a status change event. It has syntax: Function (status). FIG. 164 is sample code illustrating the use of onstatuschange event.

The ononline event registers a callback function to obtain an online event. It has syntax: Function ( ). FIG. 165 provides an example of using the ononline property.

The onoffline event registers a callback function to obtain an offline event. Its syntax is also Function ( ). FIG. 166 provides an example of using the onoffline property.

The onpoweroff event registers a callback function to obtain a non-response event. Its syntax is also Function ( ). FIG. 167 provides an example of using the onpoweroff event.

The oncoverok event registers a callback function to obtain a cover close event. Its syntax is also Function ( ). FIG. 168 provides an example of using the oncoverok event The oncoveropen event registers a callback function to obtain a cover open event. Its syntax is also Function ( ). FIG. 169 provides an example of using the oncoveropen event.

The onpaperok event registers a callback function to obtain a paper remaining event. Its syntax is also Function ( ). FIG. 170 provides an example of using the onpaperok event.

The onpapernearend event registers a callback function to obtain a paper near end event. Its syntax is also Function ( ). FIG. 171 provides an example of using the onpapernearend event.

The onpaperend event registers a callback function to obtain a paper end event. Its syntax is also Function ( ). FIG. 172 provides an example of using the onpaperend event.

The ondrawerclosed event registers a callback function to obtain a drawer close event. Its syntax is also Function ( ). FIG. 173*a* provides an example of using the ondrawerclosed event.

The ondraweropen event registers a callback function to obtain a drawer open event. Its syntax is also Function ( ). FIG. 173*b* provides an example of using the ondraweropen event.

Preferably, the present invention further incorporates an ePOS-Print editor. The following discussion describes how to use an ePOS-Print editor in accord with the present invention. This tool allows one to create an ePOS-Print API, and sample code at will. The following ePOS-print editor may be used to develop web applications in accord with the present invention.

Preferably, the present ePOS Print editor operates within a web browser environment. It is preferred that the web browser support HTML5-Canvas in order to make use of all available print API method/objects. It is therefore preferred that the web browser is selected from among the following (or similar) web browsers: Windows Internet Explorer 9 or later, Mozilla Firefox 13 or later, Google Chrome 19 or later, Apple Safari 5.1.7 or later, and iPad Safari in iOS 5.1 or later.

If desired, the ePOS Print editor is maintained in (i.e., stored and accessed from) a server, or an intelligent module (as described above), or a TM intelligent printer. For example to access the main page (i.e., "index.html", or home page) of present ePOS Print editor on an IP network, one may enter in a web browser the editor's network address such as: http://[(Web Server IP address), or (Intelligent module IP address), or (TM intelligent printer IP address)]/editor/index.html. Thus, if one has access to an intelligent module or TM intelligent printer, either can function to provide text editing (more specifically ePOS print editing) to create a web page application with embedded print API, as described above.

Using the ePOS Print editor, one can describe the functionality desired for a customized ePOS-Print API or customized ePOS-Print-Canvas by using a graphics user interface, i.e., GUI, to select the functions desired, and let the editor generate the necessary script code automatically. The editor may also be used by using the GUI to "draw" or depict in graphical form a stencil or layout of how a printout should look, and again the editor may generate the necessary script code to achieve the look and function of the desired result.

FIG. 174 provides a sample main page (i.e., index.html, or home page) for an ePOS Print editor in accord with the present invention. Preferably, the ePOS Print editor is accessed via web browser 161 by entering the IP address of the ePOS Print editor 195 in the address field 163 of web browser 161. The main page of the ePOS Print editor includes multiple tabs 165*a* to 165*f* that categorize the editor's capabilities by function type. For example, tab 165*a* selects "Edit" functions, which brings up a Main Edit area, or window, 167. Tab 165*b* provides "Preview" functions to preview how a project one is currently working one will execute. The API tab 165*c* may display model API code that may be built upon to achieve a user's needs. Alternatively, the API tab may provide a selection of multiple, pre-defined print APIs accommodating common user needs. Still alternatively, "API" 165*c* may bring up a window displaying script code for a current project. Tab 165*d* is labeled "XML" and may be used to view and edit XML print files. For example, if one is previewing a project, XML tab 165*d* may bring an XML print document of the current project. Still alternatively, one may import an existing XML print document for further editing. Besides showing scripting code generated by the present ePOS Print editor, in an alternate embodiment either of API tab 165*c* or XML tab 165*d* may further permit a user to manually edit the code. The print tab 165*e* brings up print options to print the current work, or to test the current work by generating a print-out of a mock execution of the current code viewable on the screen or sent to a connected printer. The Setting tab 165*f* permits one to enter needed settings for execution, such as the models of target printers, the IP address of the intelligent module or TM intelligent printer, the device ID of a target printer, time out settings, and/or option choices such as choosing whether or not to monitor a printer's status.

Main Edit area 167 provides a selection of different edit function choices (i.e., selectable via function icons or software "buttons") that may be programmed into a print API in accord with the present invention. These functions are further sub-categorized.

For example, a first sub-category 169 provides the most common operations that most print document may use. This first sub-category is labeled "Common", and includes functions such as "Align", "Linespc" and "Rotate". The Align function specifies a desired alignment for text and/or graphics (such as left-align, center-align, right-align, and customized-align). The Linespc function permits one to specify desired line spacing in dots or in units of measure, such as inches and/or centimeters. The Rotate function specifies a desired rotation orientation for text and/or graphics. The Rotate functions may be divided into fixed choices, such as 90°, 180° or 270° or may be user specified within a range from 0° to 360°.

A second sub-category 171 provides text-related functions and is labeled "Text". The Text sub-category includes functions such as "Lang", "Font", "Position", "Smooth", "Size", "Double", "Style" and "Text". The Lang function serves to specify a specific language for printouts. For example one may select from among Japanese, English, Spanish, German, etc. The Font function specifies a specific font from a library of installed font options. The Position function specifies how far from the left border (or right border or top border or bottom border [if printing on fixed-sized sheets of paper]) text printing should start. As it is known, text may take on a pixilated look depending on the size of a specific font choice. The Smooth function removes this jagged pixilated look and provides smooth edges to text. The Size function specifies a size for specific text. The Double function provides a quick way of specifying that specific text that should be printed in double size. The Style function specifies a specific text style, i.e., underline, bold, italics, color-invert, etc. The Text function specifies regions for printing specified text and/or specifies the text to be printed.

The third sub-category 173 provides paper-feed-related functions and is labeled "Paper Feed". The Paper-Feed sub-category includes functions such as "By Unit", "By Line", and "LF". The "By Unit" function specifies an amount of paper feeding by unit of measure, such as dots, inches, and/or centimeters. The "By Line" function specifies an amount of paper feeding by number of lines (i.e., in per line increments). The "LF" function provides a new line (i.e., increments by one line in a manner similar to the carriage-return function typing).

The fourth sub-category 175 provides image related functions and is labeled "Image". The Image sub-category includes functions such as "Image" and "NV Logo". The "Image" function provides for the insertion of user-provided images, and may also provide functions for a user to create (i.e., define) a new image using drawing software tools including basic shapes, such a lines, circles, rectangles, etc. The "NV Logo" function relies on addressable images already stored in a printer, and calls up a selected one of those images by address, or local ID. That is, the address of NV Logo images may be an ID code that identifies a specific stored image within a local (i.e., internal) memory space of (preferably) non-volatile memory within a printer. Typically, NV Logo images are images of company logos, but they are not restricted to logos alone.

The fifth sub-category 177 provides bar code related functions and is labeled "Bar Code". The Bar Code sub-category includes functions such as "Barcode" and "Symbol". The "Barcode" function encodes linear barcodes (of user-specified type). That is, a user may provide information to be encoded, and select the "Barcode" function to generate a linear barcode that encodes the provided information. The Barcode function may further include options such as size and position of a defined linear barcode. The "Symbol" function encodes matrix (i.e., 2-dimensional) barcodes of a specific type, such as a QR Code. Again, the user may provide information (text and/or graphic) to be encoded, and select the "Symbol" function to generate a matrix barcode that encodes the provided information. The Symbol function may further include options such as size and position of a defined matrix barcode.

The sixth sub-category 179 provides page-mode related functions and is labeled "Page Mode". The Page Mode sub-category includes functions such as "Start", "Area", "Direction", "Position", and "End". The "Start" function may specify the beginning position of a page mode area, and the "End" function may specify the ending position of the page mode area. The "Position" function may specify a position within a printing area where the page mode printing area should be located. The "Area" function may specify a specify area (i.e., 2-dimensional size) for the page mode area. Finally, the "Direction" function may specify an orientation for the depicted contents of the page mode area. For example, if the page mode contains text arranged horizontally, the "Direction" function may be used to print the same text along a vertical direction.

A seventh sub-category 181 may group together all remaining functions not included in the first through sixth sub-categories, and is labeled "Other". In the present example, the "Other" sub-category includes functions such as "Cut", "Drawer", Buzzer, and "Cmd". The "Cmd" function specifies commands to be sent to a printer. Assuming that the printer is a POS printer having a paper cutter, drawer and buzzer, the "Cut" command issues a command to cut the print medium (i.e., paper) on which the printer prints, the drawer option inserts a command to kick open the printer's drawer (may individually identify specific drawer latch connectors to be actuated), and the buzzer defines a command for the printer to actuate its buzzer in a specific buzzer pattern for a specified duration and a specified number of repeated buzzing operations.

FIG. 175 shows the Setting screen resulting from selection of the "Setting" tab 165f of the ePOS Print editor 195 in accord with the present invention. The Setting screen provides a printer-model field 183 to enter or select the model of a target printer. Also provided is an IP-Address field 185 to enter the IP address of the intelligent module or TM intelligent printer. Device-ID field 187 receives the device ID of the target printer, which may be an ID name assigned to the target printer. In Print-Timeout field 189 one may set a timeout (in milliseconds) for attempted print operations. Also provides a selection button 191 to choose whether or not to monitor a printer's status. FIG. 176 provides a table summarizing some of the options provided by the Setting screen.

FIG. 177 provides another, but smaller, view of the Edit screen of the ePOS Print editor in accord with the present invention. The present Edit screen is similar to that of FIG. 174 with the exception that FIG. 177 additionally shows an Edit Area 193. Main Menu area 167 displays the available functions, as explained above. One may "click an icon" (i.e., select a software button from Main Menu area 167) to add it to the bottom of Edit Area 193. One may also drag (or move) an icon to insert it anywhere in Edit Area 193. The location of the icon within Edit Area 193 specifies the location (i.e., the order) of the relevant code within the final script code file. After placing a function icon (or element), one configures it as needed. For example, if the NV logo is added to Edit Area 167, then it is configured by entering the key code that identifies the image to be selected. It is to be understood that one may have multiple instances of the same function icon within Edit Area 193. Thus, Edit Area 193 displays the functions (i.e., elements) selected in the menu area. At any time, these elements may be dragged up or down within Edit Area 193 to change its order of execution. Each element is given an "X" button at its right-side, and any element can be deleted using its "X" button. An import option 197, ePOS-Print Editor can import XML data stored in the past. The Clear option 199 deletes the edited details within Edit Area 193.

Selecting Preview tab 165b, as shown in FIG. 174 provides a preview image. FIG. 178 shows a sample preview image of the ePOS Print editor in accord with the present invention. This provides a preview 101 of a printed document.

If a printer is connected, then an actual printing may be made to test the code by selecting Print tab 165e. FIG. 179 provides a sample view of the present ePOS-Print editor with the Print tab selected. Print tab 165e may be used to view an XML print document of a preview image, or may be used to import an XML print document. For example one may open an existing XML print document using the Print tab 165e, and may save the contents of the XML print document, such as by copying. The ePOS-Print XML document is displayed in the Data to be sent (ePOS-Print XML) section. Selecting the Send option sends data to a printer and performs printing. The Information section displays the print status. Selecting the Clear option deletes the content in the Information box.

FIG. 180 shows an import screen in accord with the present invention. The ePOS-Print XML print document to be imported is pasted and checked in the "Data to be import (ePOS-Print XML)" section. Selecting the "Apply" option imports the ePOS-Print XML print document. The information section displays any import/needed information. The "Close" option closes the import screen.

In a preferred embodiment of present invention, selecting API tab 165c, as shown in FIG. 174, provides ePOS-Print sample code. FIG. 181 provides a sample view of the present ePOS-Print editor with the API tab selected. A user may make use of the sample code by copying it into their own code file or Edit Area.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A method of controlling a terminal that has access to a printer and a web server in which a web application is maintained, the method comprising steps of:
　acquiring, by the terminal, the web application from the web server, the web application having an embedded application program interface (API) configured to control printing without interfacing with a web browser's print function, the API including:
　　(i) an address property-element designating a network address of the printer,
　　(ii) an open method-element that enables a status event operation that checks a device status,
　　(iii) an add-commands method-element that adds commands into a command buffer for creating, within the web application, a command document executable by the printer, and
　　(iv) a send method-element that sends the command document to the printer over the network;
　wherein the terminal uses a status event notification function to check, without transmitting a status query through the web server, a status of the printer without printing, the status event notification function comprising processes that include:
　　setting the address property-element of the API to designate a network address of the printer;
　　enabling the status event operation by use of the open method-element; and
　　obtaining a status event of the printer designated by the address property-element, after the open method-element enables the status event operation; and
　wherein the terminal is configured to transmit the command document to the printer, without transmitting the command document through the web server, by performing steps that include:
　　creating the command document by use of the add-commands method-element; and
　　sending the created command document by use of the send method-element to the printer having the network address designated by the address property-element.

2. The method of claim 1, wherein the printer has a cover, the method further comprising:
　obtaining a status event indicating that the cover is open, after the open method-element enables a cover open event as the status event operation.

3. The method of claim 1, wherein the printer has a cover, the method further comprising:
　obtaining a status event indicating that the cover is closed, after the open method-element enables a cover close event as the status event operation.

4. The method of claim 1, wherein a drawer is connected to the printer, the method further comprising:
　creating a kick-open document instructing the printer to kick open its connected drawer by adding a drawer kick command into the command buffer by use of the add-commands method-element;
　sending the kick-open document to the printer by use of the send method-element; and
　obtaining a status event indicating that the drawer is open, after the open method-element enables a drawer open event as the status event operation.

5. The method of claim 1, further comprising:
　obtaining a status event indicating that the printer is powered off, after the open method-element enables a non-response event as the status event operation.

6. The method of claim 1, further comprising:
　obtaining a status event indicating that one or more statuses of the printer have changed, after the open method-element enables a status change event as the status event operation.

7. The method of claim 1, wherein the API further includes a close method-element that disables the status event operation, the method further comprising:
　disabling the status event operation by use of the close method-element.

8. The method of claim 1, wherein the API further includes an interval property-element specifying a time interval for spacing an upgrading of the status of the printer, the method further comprising:
　setting the time interval for upgrading of the status of the printer by use of the interval property-element.

9. The method of claim 1, wherein the API further includes a status property-element specifying the status last obtained from the printer.

10. A non-transitory computer-readable medium encompassing computer-readable instructions executing the method of claim 1.

11. A terminal having access to a printer and a web server in which a web application is maintained, the terminal comprising:
　an input device configured to receive input instructions from a user;

an image display;
a computing module configured to acquire, responsive to the input instructions received by the input device, the web application from the web server and to display a user interface of the web application on the image display, the web application having an embedded application program interface (API) configured to control printing without interfacing with a web browser's print function, the API including:
  (i) an address property-element that designates a network address of the printer,
  (ii) an open method-element that enables a status event operation that checks a device status,
  (iii) an add-commands method-element that adds commands into a command buffer for creating, within the web application, a command document executable by the printer, and
  (iv) a send method-element that sends the command document to the printer over the network;
wherein the terminal is configured to execute a status event notification function to check, without transmitting a status query through the web server, a status of the printer without printing, the status event notification function comprising processes that include:
  setting the address property-element of the API to designate a network address of the printer;
  enabling the status event operation by use of the open method-element; and
  obtaining a status event of the printer designated by the address property-element, after the open method-element enables the status event operation; and
wherein the terminal is configured to transmit the command document to the printer, without transmitting the command document through the web server, by performing processes that include:
  creating the command document by use of the add-commands method-element, and
  sending the created command document by use of the send method-element to the printer having the network address designated by the address property-element.

12. The terminal of claim 11, wherein:
the printer has a cover; and
the computing module is further configured to obtain a status event indicating that the cover is open, after the open method-element enables a cover open event as the status event operation.

13. The terminal of claim 11, wherein:
the printer has a cover; and
the computing module is further configured to obtain a status event indicating that the cover is closed, after the open method-element enables a cover close event as the status event operation.

14. The terminal of claim 11, wherein:
a drawer is connected to the printer; and
the computing module is further configured to:
  create a kick-open document for instructing the printer to kick open its connected drawer by adding a drawer kick command into the command buffer by use of the add-commands method-element,
  send the kick-open document to the printer by use of the send method-element, and
  obtain a status event indicating that the drawer is open, after the open method-element enables a drawer open event as the status event operation.

15. The terminal of claim 11, wherein:
the computing module is configured to obtain a status event indicating that the printer is powered off, after the open method-element enables a non-response event as the status event operation.

16. The terminal of claim 11, wherein:
the computing module is configured to obtain a status event indicating one or more statuses of the printer are changed, after the open method-element enables a status change event as the status event operation.

17. The terminal of claim 11, wherein:
the API further includes a close method-element that disables the status event operation; and
the computing module is configured to disable the status event operation by use of the close method-element.

18. The terminal of claim 11, wherein:
the API further includes an interval property-element specifying a time interval for spacing an upgrading of the status of the printer; and
the computing module is configured to set the time interval for upgrading the status of the printer by use of the interval property-element.

19. The terminal of claim 11, wherein the API further includes a status property-element specifying the status last obtained from the printer.

20. The terminal of claim 11, wherein the computing module is configured to display the status of the printer on the image display.

* * * * *